United States Patent
King et al.

(10) Patent No.: US 10,211,857 B2
(45) Date of Patent: *Feb. 19, 2019

(54) FRONT-END ARCHITECTURE THAT SUPPORTS UPLINK CARRIER AGGREGATION AND SIMULTANEOUS MIMO USING SWITCH COMBINING

(71) Applicant: SKYWORKS SOLUTIONS, INC., Woburn, MA (US)

(72) Inventors: Joel Richard King, Newbury Park, CA (US); David Richard Pehlke, Westlake Village, CA (US); John Chi-Shuen Leung, Foothill Ranch, CA (US)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/125,708

(22) Filed: Sep. 9, 2018

(65) Prior Publication Data

US 2019/0007073 A1    Jan. 3, 2019

Related U.S. Application Data

(63) Continuation of application No. 15/652,234, filed on Jul. 17, 2017, now Pat. No. 10,075,199.

(60) Provisional application No. 62/363,275, filed on Jul. 17, 2016.

(51) Int. Cl.
| | |
|---|---|
| *H04B 1/44* | (2006.01) |
| *H04B 1/00* | (2006.01) |
| *H04L 5/00* | (2006.01) |
| *H04B 7/08* | (2006.01) |
| *H04L 27/00* | (2006.01) |

(52) U.S. Cl.
CPC ......... *H04B 1/0057* (2013.01); *H04B 7/0868* (2013.01); *H04L 5/001* (2013.01); *H04L 27/0002* (2013.01)

(58) Field of Classification Search
CPC ............. H04B 1/0057; H04B 1/0458; H04B 2001/0408; H04B 1/0475; H04B 1/44; H04B 1/006; H04B 15/00; H04B 1/525; H04B 1/0064; H04B 1/18; H04B 1/005; H04B 7/0413; H04B 1/0082; H04B 1/0483; H04B 1/40; H04B 1/50; H04B 1/1018
USPC ......................................... 455/78
See application file for complete search history.

(56) References Cited

U.S. PATENT DOCUMENTS

| | | | |
|---|---|---|---|
| 9,628,136 B2* | 4/2017 | Braun ................ | H04B 1/401 |
| 2014/0038675 A1* | 2/2014 | Khlat ................. | H03F 1/0227 |
| | | | 455/574 |
| 2014/0227982 A1* | 8/2014 | Granger-Jones ..... | H04B 7/0404 |
| | | | 455/77 |

* cited by examiner

*Primary Examiner* — Ajibola A Akinyemi
(74) *Attorney, Agent, or Firm* — Chang & Hale LLP

(57) ABSTRACT

Described herein are front-end architectures that use switch-combining in a MIMO module to provide uplink carrier aggregation and simultaneous MIMO operations in a plurality of band combinations. The front-end architectures include a combination of low-band, mid-band, high-band, MIMO, and uplink carrier aggregation modules to provide the described functionality. To provide certain band combinations, one or more of the modules can implement switch-plexing to provide the targeted functionality.

20 Claims, 66 Drawing Sheets

FRONT-END ARCHITECTURE THAT SUPPORTS UPLINK CARRIER AGGREGATION AND SIMULTANEOUS MIMO USING SWITCH COMBINING

CROSS-REFERENCE TO RELATED APPLICATIONS

This application is a continuation of U.S. application Ser. No. 15/652,234 filed Jul. 17, 2017 and entitled "Uplink Carrier Aggregation Front-End Architecture That Supports Simultaneous MIMO," which claims priority to U.S. Provisional Application No. 62/363,275 filed Jul. 17, 2016 and entitled "4-Antenna Uplink Carrier Aggregation Front-End Architecture That Supports Simultaneous 4×4 MIMO," each of which is expressly incorporated by reference herein in its entirety.

BACKGROUND

Field

The present disclosure relates to front-end architectures for wireless applications.

Description of Related Art

In wireless applications, a signal to be transmitted is typically generated by a transceiver, amplified by a power amplifier, filtered by a filter, and routed to an antenna by a switch network. Such a signal transmitted through the antenna has a relatively high power.

In a generally reverse manner, a relatively weak signal received through an antenna is typically routed from the antenna by a switch network, filtered by a filter, amplified by a low-noise amplifier, and provided to the transceiver. In some applications, the amplification can be achieved in close proximity to the antenna to reduce loss of the relatively weak signal.

SUMMARY

According to a number of implementations, the present disclosure relates to a front-end architecture for wireless communication comprising a first module having a low-band power amplifier with integrated duplexer, a second module having a power amplifier with integrated duplexer and configured to provide uplink carrier-aggregation, and a plurality of third modules each having a power amplifier with integrated duplexer for a mid-low-band or higher frequency band.

A front-end architecture is provided for wireless application that includes a first mid-band amplifier system configured to amplify transmit and receive signals in a first mid-band; and a second mid-band amplifier system configured to amplify at least a transmit signal in a second mid-band, such that the front-end architecture is capable of simultaneous uplink operations in the first mid-band and the second mid-band.

A wireless device is provided that includes a transceiver configured to generate a plurality of transmit signals and process a plurality of received signals; a plurality of antennas configured to facilitate transmission of the transmit signals and reception of the received signals; and a front-end system implemented between the transceiver and the plurality of antennas, and including a first module having a low-band power amplifier with integrated duplexer, a second module having a power amplifier with integrated duplexer and configured to provide uplink carrier-aggregation, and a plurality of third modules each having a power amplifier with integrated duplexer for a mid-low-band or higher frequency band, the front-end system further including a first power management unit implemented to provide supply voltage for each of the first module and the second module, and a second power management unit implemented to provide supply voltage for each of the plurality of third modules.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

DETAILED DESCRIPTION OF SOME EMBODIMENTS

Figure 1:
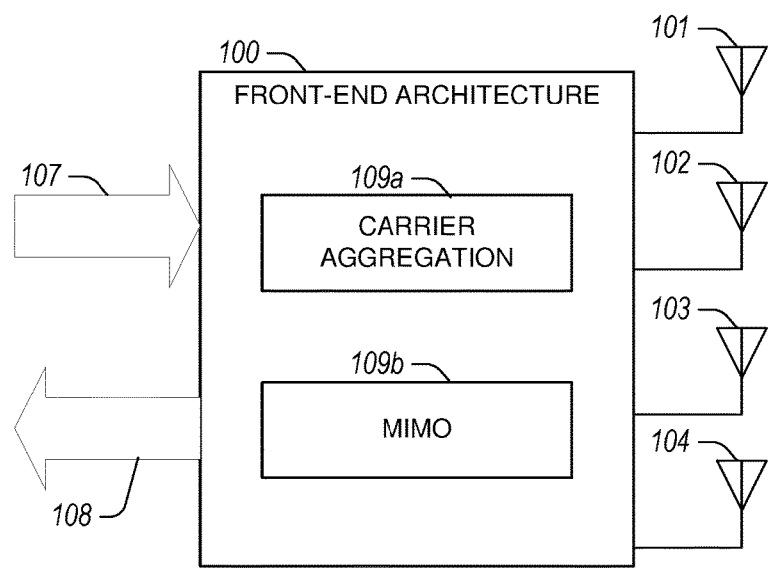
FIG. 1 illustrates a front-end architecture having one or more features as described herein, and configured to support multiple antennas.

The headings provided herein, if any, are for convenience only and do not necessarily affect the scope or meaning of the claimed invention.

Introduction

Described herein are various examples related to radio-frequency (RF) front-end architectures for operations of a wireless device having multiple antennas. For example, such a wireless device can include four antennas. Although various examples are described in the context of four antennas, it will be understood that one or more features of the present disclosure can also be implemented for wireless devices having other numbers of antennas. It will also be understood that not all of such four antennas necessarily need to be utilized when one or more features of the present disclosure is/are implemented in the wireless device.

Cellular specifications for uplink cellular radio-frequency (RF) specify that front-end architectures should support uplink carrier-aggregation (UL CA) simultaneous with midband (MB) 4×4 MIMO (multiple-input and multiple-output) as well as UL CA simultaneous with 4×4 high-band (HB) MIMO in all combinations of bands. UL CA combines two or more wireless (e.g., LTE) signals (component carriers), transmitted (uplinked) from a single user device to a wireless base station, dramatically increasing the speed with which a user can upload content and files. MIMO uses multiple antennas at both the source (transmitter) and the destination (receiver). The antennas at each end of the communications circuit are combined to reduce or minimize errors and to enhance or optimize data speed Current front-end architectures may not be well-suited to provide functionality that conforms with these specifications. Connectivity may be difficult to achieve for flexible support of all use cases. A particular challenge is avoiding simultaneous UL transmit (TX) carriers from being merged onto a common RF path where switch linearity becomes a limitation to overall intermodulation distortion (IMD). A further challenge is power management unit (PMU) connectivity of the various supply voltages to the TX power amplifiers to support the separate TX signal flow.

In some implementations, the present disclosure involves front-end architectures for wireless communication that supports all intended combinations of UL CA and simultaneous 4×4 MIMO. Embodiments can include a separate MB primary PAiD and a separate HB primary PAiD, and can establish various numbers of antenna outputs from these modules to connect to available diplexers or triplexers in selected ways to cover all intended use cases. Duplication of filters, duplexers, and/or quadplexers is reduced or minimized by re-using filtering in a selectively designed MB/HB MIMO DRx module that supports a minimum number of switch-combined TX filters. A UL CA PAM (power amplifier module) makes use of that module, as well as the re-use of available filters in the MB primary PAiD. In some cases, to support HB-HB UL CA, a HB TX PA engine in the UL CA PAM is enabled by routing signal paths through the filtering of the primary HB PAiD as well.

Multiple outputs from each PAiD and the MB/HB MIMO DRx modules are then connected in selected ways to diplexers and/or triplexers that then interface to two available primary antennas. Two similarly band support defined diversity antennas on the far side of a user equipment (UE) are connected to a L/M/H/U diversity RX (receive) chain, and the second M/H/U antenna connected to a M/H/U DRx module. MB/HB CA diplexers can be configured to combine, for example, B41/B7 and MB, as well as, for example, a B40/B30 and MB CA extractor filter and can be designed to reduce or minimize insertion losses with enhanced or optimized out-of-band attenuation/isolation in CA.

FIG. 1 depicts a front-end architecture 100 having one or more features as described herein, and configured to support multiple antennas. More particularly, the front-end architecture 100 is shown to be coupled to four antennas 101, 102, 103, 104. Each of such antennas can facilitate transmit (TX) and/or receive (RX) operations through the front-end architecture 100.

For transmit operations, the front-end architecture 100 can be in communication with, for example, a transceiver to receive, process, and route one or more transmit signals to one or more of the antennas 101, 102, 103, 104. The one or more transmit signals are collectively depicted as an arrow 107.

For transmit operations, the front-end architecture 100 can receive one or more signals from one or more of the antennas 101, 102, 103, 104, process such signal(s), and route such processed signal(s) to, for example, a transceiver which may or may not be the same as the foregoing transceiver associated with the transmit operations. The one or more received signals are collectively depicted as an arrow 108.

The front-end architecture 100 can also include a carrier aggregation (CA) functionality provided by one or more modules collectively referred to as carrier aggregation architecture 109a. Such a carrier aggregation functionality can include an uplink (UL) carrier aggregation (UL CA) functionality and/or a downlink (DL) carrier aggregation (DL CA) functionality. For the purpose of description, it will be understood that in a given CA functionality, a plurality of signals associated with the CA functionality may or may not share a common antenna or a common signal path. The front-end architecture 100 can also include a multiple input multiple output (MIMO) functionality provided by one or more modules collectively referred to as MIMO architecture 109b.

For the purpose of description, the following assumptions can be made. First, a given platform solution can be assumed to support full hot-swapping that enables a front-end architecture to be desirably configured for connectivity and active path selection. For example, primary component carrier(s) (PCC) can be supported by an uplink carrier aggregation (UL CA) module or component, and secondary component carrier(s) (SCC) can be supported by a primary module or component, or vice versa. In another example, transmit (TX) and receive (RX) operations do not necessarily need to share the same path (e.g., TX can be from an UL CA module, RX can be from the UL CA module, primary module, or a secondary RX module).

Second, four antennas are assumed to be available with the following defined band support listed in Table 1.

TABLE 1

| Antenna | Band support |
|---|---|
| Ant 1 | MB/HB/UHB/eLAA |
| Ant 2 | LB/MB/MLB/HB/UHB/eLAA |
| Ant 3 | MB/HB/UHB/eLAA |
| Ant 4 | LB/MB/MLB/HB/UHB/eLAA |

Table 2 lists examples of frequency ranges referenced in Table 1. It will be understood that one or more features of the present disclosure can also be implemented with other frequency ranges of the various example bands.

TABLE 2

| Band | Example frequency range |
|---|---|
| LB (low-band) | 698-960 MHz |
| MLB (mid-low-band) | 1427-1518 MHz |
| MB (mid-band) | 1710-2200 MHz |
| HB (high-band) | 2300-2690 MHz |
| UHB (ultra-high-band) | 3400-3800 MHz |
| eLAA (enhanced LAA) | 5150-5925 MHz |

For the purpose of description, low, mid and high bands are referred to herein as LB, MB and HB, or simply as L, M and H, respectively. The latter set of abbreviations are utilized herein for combinations of bands. For example, LM refers to a combination of LB and MB, LMH refers to a combination of LB, MB and HB, MM refers to a combination of MB and MB, etc.

In some embodiments, a front-end architecture or system having one or more features as described herein can include some or all of the following. First, in some embodiments, a system can be configured for simultaneous operations of LM UL CA and 4×4 MB MIMO; simultaneous operations of LM UL CA and 4×4 HB MIMO; simultaneous operations of LH UL CA and 4×4 MB MIMO; simultaneous operations of LH UL CA and 4×4 HB MIMO; simultaneous operations of MM UL CA and 4×4 MB MIMO; simultaneous operations of MM UL CA and 4×4 HB MIMO; simultaneous operations of MH UL CA and 4×4 MB MIMO; simultaneous operations of MH UL CA and 4×4 HB MIMO; simultaneous operations of HH UL CA and 4×4 MB MIMO; and simultaneous operations of HH UL CA and 4×4 HB MIMO.

Second, in some embodiments, a single module can be configured to flexibly support all possible or targeted UL CA operations.

Third, in some embodiments, flexible support of 4×4 and higher order MIMO for bands greater than 1710 MHz can be implemented.

Fourth, in some embodiments, support end-to-end user equipment (UE) antenna swap and/or antenna switch diversity for at least one antenna.

Fifth, in some embodiments, duplication of filtering/RX paths can be minimized or reduced for smallest or reduced size and/or cost. In such a configuration, TX-only filtering in an UL CA module (e.g., as opposed to full duplexers and/or quadplexers) can be implemented. Also, lower cost and/or smaller size UL CA solutions can be realized, as well as considerable reductions in TX insertion loss (IL) for UL CA path(s).

Sixth, in some embodiments, insertion loss across all targeted band support and CA support configurations can be reduced or minimized.

Seventh, in some embodiments, maximal or increased use of antenna isolation for enhanced performance in CA combinations can be realized.

In some embodiments, one or more features of the present disclosure can be implemented in various connectivity configurations. Eight non-limiting examples are described herein.

In addition, aspects of the various connectivity configurations are implemented in example architecture embodiments that are described herein. Some architectural embodiments include MB and HB MIMO DRx modules employing MB/HB switch-combined filters. Various architectural embodiments include MB and HB MIMO DRx not employing MB/HB switch combining. Certain architectural embodiments leverage MB/MB switch-combining in the MB/HB MIMO DRx module. Variations on these architectural embodiments can include, for example and without limitation, placement of LB duplexing after an antenna switch (e.g., a mPnT switch) for advantages in harmonic margin of the harmonically related CA cases, at a slight penalty in insertion loss for that specific antenna path.

Connectivity Example 1

In some embodiments, a front-end architecture can include two power management units (PMUs) that deliver supply voltage to integrated power amplifier (PA) modules and that can be utilized to adjust the power of two active TX paths independently for overall power efficiency. By way of examples, partitioning of power supply connectivity can be as follows: PMU #1 powers LB PAiD/UL CA PAiD, PMU #2 powers MLB PAiD/MB PAiD/HB PAiD/UHB PAiD.

It is noted that PAiD in the description and figures herein refers to a power amplifier with integrated duplexer, and additional details concerning example embodiments of PAiDs are described herein. However, it will be understood that integration of a duplexer with a power amplifier is not necessarily required in a front-end architecture having one or more features as described herein.

It is also noted that a given PMU can be configured to support an envelope tracking (ET) operation or an average power tracking (APT) operation in a corresponding power amplifier. In the latter case, the APT operation can include a high-voltage (HV) APT operation.

Connectivity Example 2

In some embodiments, advanced phones required to support 4×4 DL MIMO (multiple-input multiple-output) can include four antennas. One or more features of the present disclosure can be configured to optimize or enhance connectivity to these available antennas. Some designs can include a multi-throw high isolation/high linearity switch for antenna selection. Front-end architectures disclosed herein can establish enhanced or optimal diplexing or triplexing of signal paths to support all targeted UL CA and MIMO use cases. These architectures can also bypass the diplexer and/or triplexer to reduce insertion loss in single band operation.

Connectivity Example 3

In some embodiments, front-end architectures disclosed herein can be implemented to establish reduced or minimal TX filtering in the MB/HB MIMO DRx module for reduced cost and/or smaller size. Such architectures can be configured to leverage the re-use of existing TX filters, duplex filters, switch-combined filters, and/or ganged filters in the MB and HB primary PAiD, thereby reducing or minimizing filter duplication of the overall architecture.

Connectivity Example 4

In some embodiments, front-end architectures disclosed herein can be configured to support 1) using MB/HB switch-combined filter implementations in the MB/HB MIMO DRx module, or 2) no MB/HB switch-combined filter implementations in the MB/HB MIMO DRx module. Such architectures can be configured to employ MB/MB switch-combining in the MB/HB MIMO DRx module.

Connectivity Example 5

In some embodiments, front-end architectures disclosed herein can be configured to enable LB diplexing before or after a mPnT switch. This can enhance or optimize trade-offs between harmonic margin in harmonically related CA and insertion loss for the signal paths supported by the LB antenna.

Connectivity Example 6

In some embodiments, front-end architectures disclosed herein can be configured to support LB antenna swapping and harmonic filtering for harmonically-related CA performance with a diplexer following an antenna swap switch. In such embodiments, both sides of the diplexer can be flexibly connected to poles of that antenna swap switch.

Connectivity Example 7

In some embodiments, front-end architectures disclosed herein can be configured to integrate TX filtering that can be ganged with RX filtering or TX filtering that can be switch-combined with RX filtering that is implemented in the MB/HB MIMO DRx module. In such embodiments, the UL CA power amplifier module and the MIMO DRx module can be separate modules.

Connectivity Example 8

In some embodiments, front-end architectures disclosed herein can be configured to integrate the UL CA power amplifier with the TX filtering and RX filtering of the MB/HB MIMO DRx module using a single module (e.g., a UL CA PAM+MIMO DRx module).

Front-End Architectures for Uplink Carrier Aggregation and Simultaneous MIMO

Figure 2:
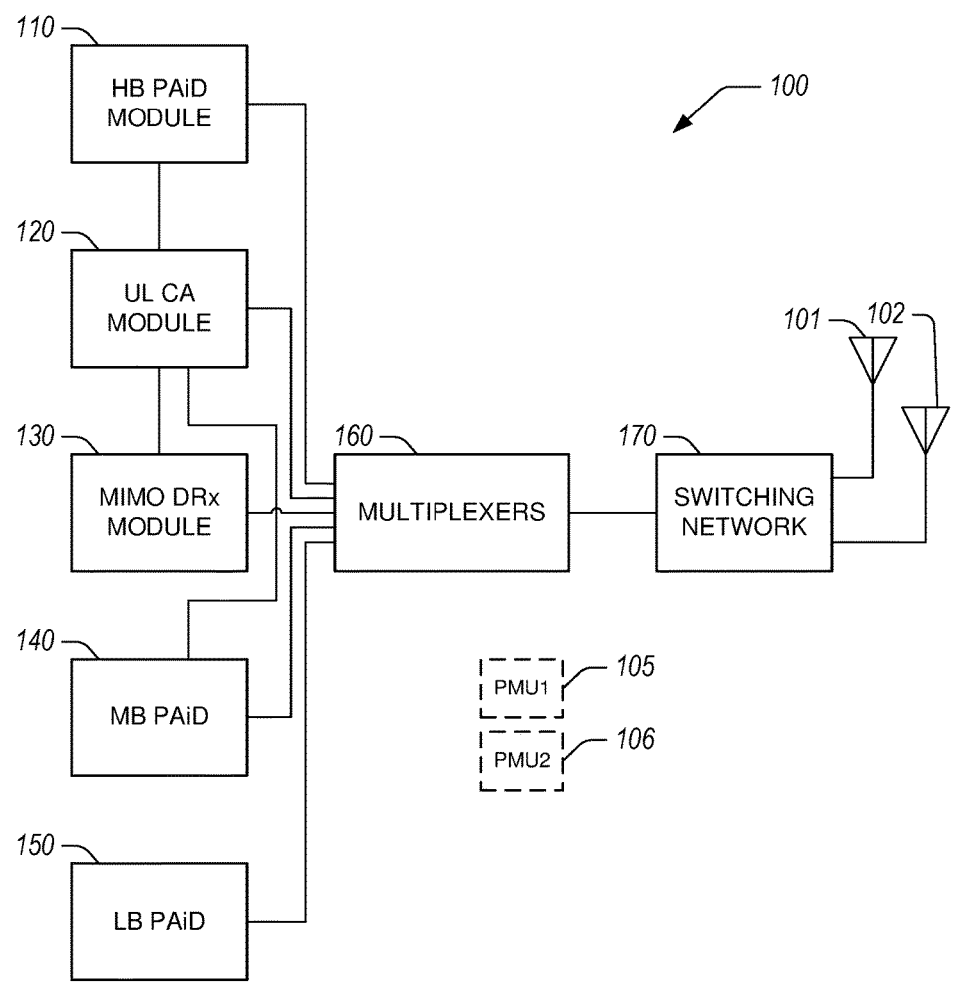
FIGS. 2, 3, and 4 illustrate block diagrams of example front-end architectures configured for uplink carrier aggregation and simultaneous MIMO.

FIG. 2 illustrates an example front-end architecture 100 configured for UL CA and simultaneous MIMO. The front-end architecture includes two separate PMUs 105, 106. The first PMU 105 is configured to supply power amplifiers and this can be provided using envelope tracking (ET) and/or average power tracking (APT) operations. For example, a HB PAiD module or component 110 can be provided with supply voltage from the first PMU 105 for one or more power amplifiers therein for high-band operations. In another example, MB PAiD module or component 140 can be provided with supply voltage from the first PMU 105 for one or more power amplifiers therein for mid-band operations.

The second PMU 106 is configured to supply power amplifiers and this can be provided using ET or APT operations. For example, an LB PAiD module or component 150 can be provided with supply voltage from the second PMU 122 for one or more power amplifiers therein for low-band operations. In another example, a UL CA module or component 120 can be provided with ET supply voltage from the second PMU 106 for one or more power amplifiers therein for high- and/or mid-band carrier aggregation.

Diversity receive (DRX) operations can be achieved through either or both of first and second antennas 101, 102. Such DRX operations can be facilitated by a MB/HB/UHB MIMO DRx module 130 having MIMO functionality.

The HB PAiD module 110 can be configured to include a high-band amplification functionality. The HB PAiD module can be coupled to the UL CA module 120 to enable re-using filters. An amplified high-band signal can be output and coupled to a first antenna 101 or a second antenna 102 through a switching network 170, such as an antenna switch module. Signals can also be selected and filtered using diplexers, triplexers, quadplexers, extractors, band-pass filters, low-pass filters, high-pass filters, notch filters, or the like, collectively referred to as multiplexers 160.

The HB PAiD module 110 can be further configured to process received signals in a plurality of high-bands. Each high-band signal can be received from the first antenna 101 or the second antenna 102 through the switch 170 and be amplified by a low-noise amplifier (LNA). The HB PAiD module 110 can be configured to provide frequency-division duplexing (FDD) functionality or time-division duplexing (TDD) functionality.

The MB PAiD module 140 can be configured to include a mid-band amplification functionality. An amplified mid-band signal can be output and coupled to the first antenna 101 or the second antenna 102 through the switch 170. The MB PAiD module 140 can be further configured to process received signals in a plurality of mid-bands. Each mid-band signal can be received from the first antenna 101 or the second antenna 102 through the switch 170 and be amplified by a low-noise amplifier (LNA). A mid-band module can include separate PA/LNA pairs for each of a plurality of mid-bands.

The LB PAiD module 150 can be configured to include a low-band amplification functionality. An amplified low-band signal can be output and coupled to the second antenna 102. The LB PAiD module 150 can be further configured to process received signals in a plurality of low-bands. Each low-band signal can be received from the second antenna 102 and be amplified by a low-noise amplifier (LNA).

The example UL CA MB module 120 can be configured to process received signals in a plurality of mid-bands and/or high-bands. Each mid- or high-band signal can be received from the first antenna 101 or the second antenna 102 through the switch 170 and be amplified by a low-noise amplifier (LNA).

The first antenna 101 can be configured to support mid, high and ultra-high band operations. The first antenna 101 is capable of being coupled to each of the HB PAiD module 110, the MB PAiD module 140, the UL CA module 120, and the DRX module 130 through the switch 170 and multiplexers 160 for mid- and high-band operations.

The second antenna 102 can be configured to support low, mid-low, mid, high and ultra-high band operations. Accordingly, the LB PAiD module 150 as described herein is shown to be coupled to the second antenna 102 through multiplexers 160 configured to direct low band signals to the second antenna 102. The second antenna 102 is also shown to be capable of being coupled to each of the HB PAiD module 110, the MB PAiD module 140, the UL CA module 120, and the MIMO DRX module 130 through the switch 170 and multiplexers 160 for mid- and high-band operations.

Figure 3:
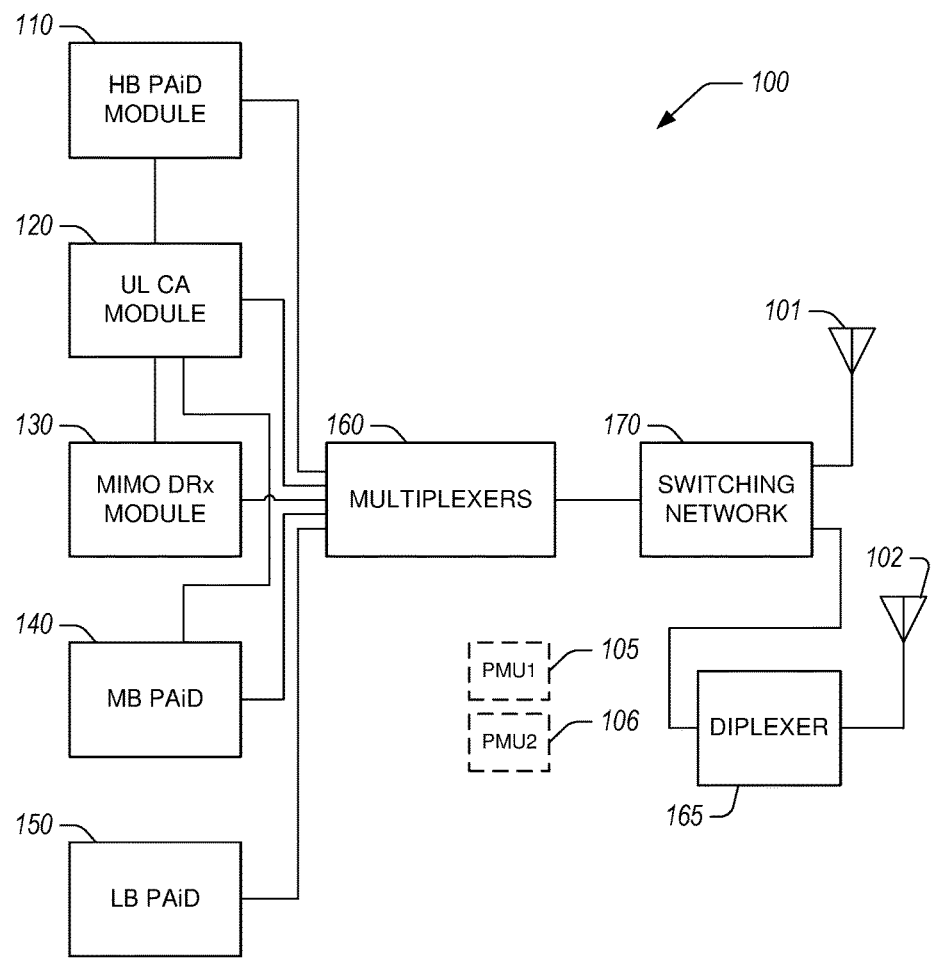
Figure 4:
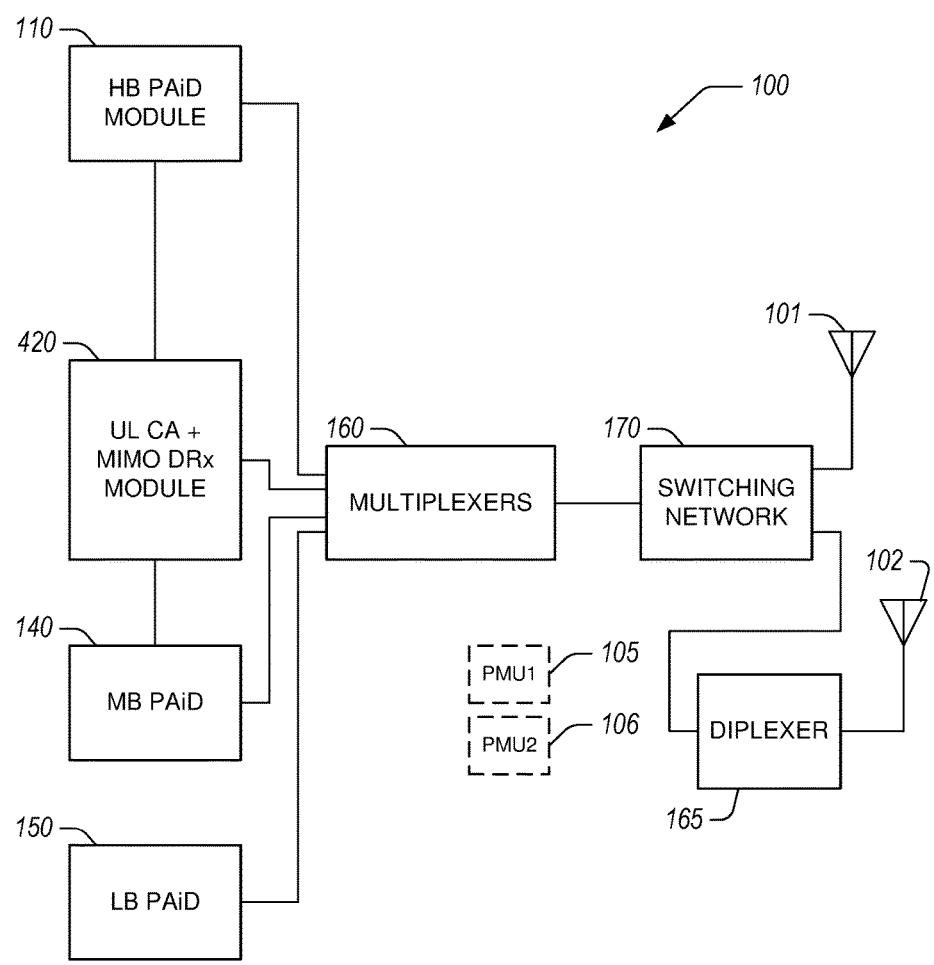

The architecture 100 is configured for UL CA operation and 4×4 MIMO. Similarly, FIG. 3 illustrates another example front-end architecture 100 with this capability that includes an additional diplexer after the switching network 170. This can improve insertion loss and linearity performance of the architecture. Moreover, FIG. 4 illustrates yet another example front-end architecture 100 with this capability that integrates the UL CA module and the MIMO DRx module into a single combination module 420. This can decrease costs and size as well as improve performance through the re-use of integrated filters and duplexers.

Example 1 of a Front-End Architecture

Examples 1-5 provide various front-end architecture configurations. Examples 1, 2, and 3 provide MB Tx and HB Rx duplexing using a CA diplexer and/or extractor that is outside the MIMO DRx module. Examples 4 and 5 provide MB Tx and HB Rx support via switch combining inside the MIMO module. Examples 1-5 are not configured to provide M MIMO in HH UL CA or H MIMO in HH UL CA. However, Examples 6 and 7 provide these capabilities.

Examples 1-5 can have the LB LPF placed between the antenna switch (e.g., switch 570, 770, 870, or 970) and antenna (e.g., antenna 101, 102) to relax the ASM harmonic requirement. Examples 4 and 5 demonstrate superior performance in MIMO Rx performance due at least in part to MB TX and HB Rx switch-combining that reduces or eliminates the CA diplexer/extractor loss.

Figure 5A:
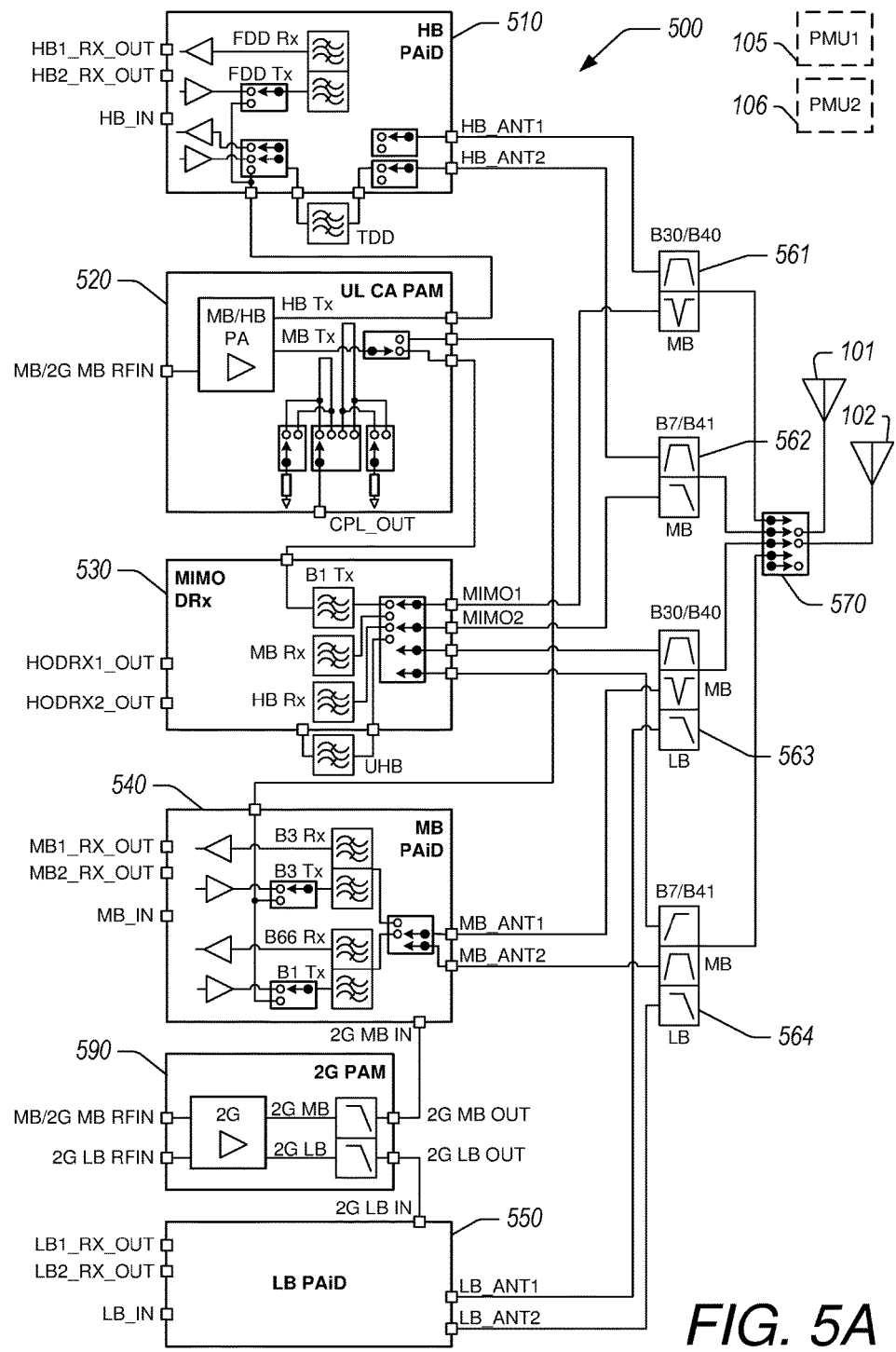
FIG. 5A illustrates an example front-end architecture wherein there is no MB/HB switch combining in a MIMO DRx module and where a LB diplexer is positioned before an antenna switch module.

FIG. 5A illustrates an example front-end architecture 500 wherein there is no MB/HB switch combining in a MIMO DRx module and where a LB diplexer is positioned before an antenna switch module. PMU1 105 is configured to provide power to the MB PAiD module 540 and/or the HB PAiD module 510. PMU2 106 is configured to provide power to the UL CA module 520 and/or the LB PAiD module 550.

The components herein mirror those described herein with respect to FIGS. 2-4. Accordingly, their functionality will not be described again. However, an optional 2G PAM module 590 is included in the example architecture to illustrate additional functionality. The 2G PAM module 590 can be configured to include amplification functionality for a 2G low-band and a 2G mid-band. Accordingly, a MB/2GMB_RFIN pin can be provided to receive a 2G mid-band signal for amplification. Similarly, a 2GLB_RFIN pin can be provided to receive a 2G low-band signal for amplification. The amplified 2G mid-band signal can be output through a pin 2G_MB_OUT which can be coupled to a 2G_MB_IN pin of the MB PAiD module 540. Accordingly, the amplified 2G mid-band signal can be routed to the first antenna 101 or the second antenna 102 through the switch 570. Similarly, the amplified 2G low-band signal can be output through a pin 2G_LB_OUT which can be coupled to a 2G_LB_IN pin of the LB PAiD module 550. Accordingly, the amplified 2G low-band signal can be further routed to the second antenna 102. A 2G module 590 can utilize portions of the mid- and low-band modules 540, 550 to route amplified 2G signals to respective antennas.

The modules are illustrated with a combination of filters and switches as well as amplifiers (e.g., power amplifiers and low noise amplifiers) to provide amplification and filtering functionalities. As illustrated, various architectures and configurations provide the re-use of filters (e.g., through connections between the UL CA PAM 520, the HB PAiD 510, the MIMO DRx 530, and the MB PAiD 540). Switches can selectively direct signals to appropriate modules and appropriate filters within those modules to achieve targeted filtering and/or duplexing.

The architecture 500 includes a B30/B40 and MB diplexer 561, a B7/B41 and MB diplexer 562, a B30/B40 and MB and LB triplexer 563, and a B7/B41 and MB and LB triplexer 564. These diplexers and triplexers are configured to selectively direct signals from the antennas 101, 102 to appropriate modules to achieve UL CA and 4×4 MIMO (with other MIMO functionality being provided by additional antennas and secondary modules, not shown). To illustrate these configurations, FIGS. 5B-5I illustrate various operational modes of the front-end architecture 500 of FIG. 5A.

Figure 5B:
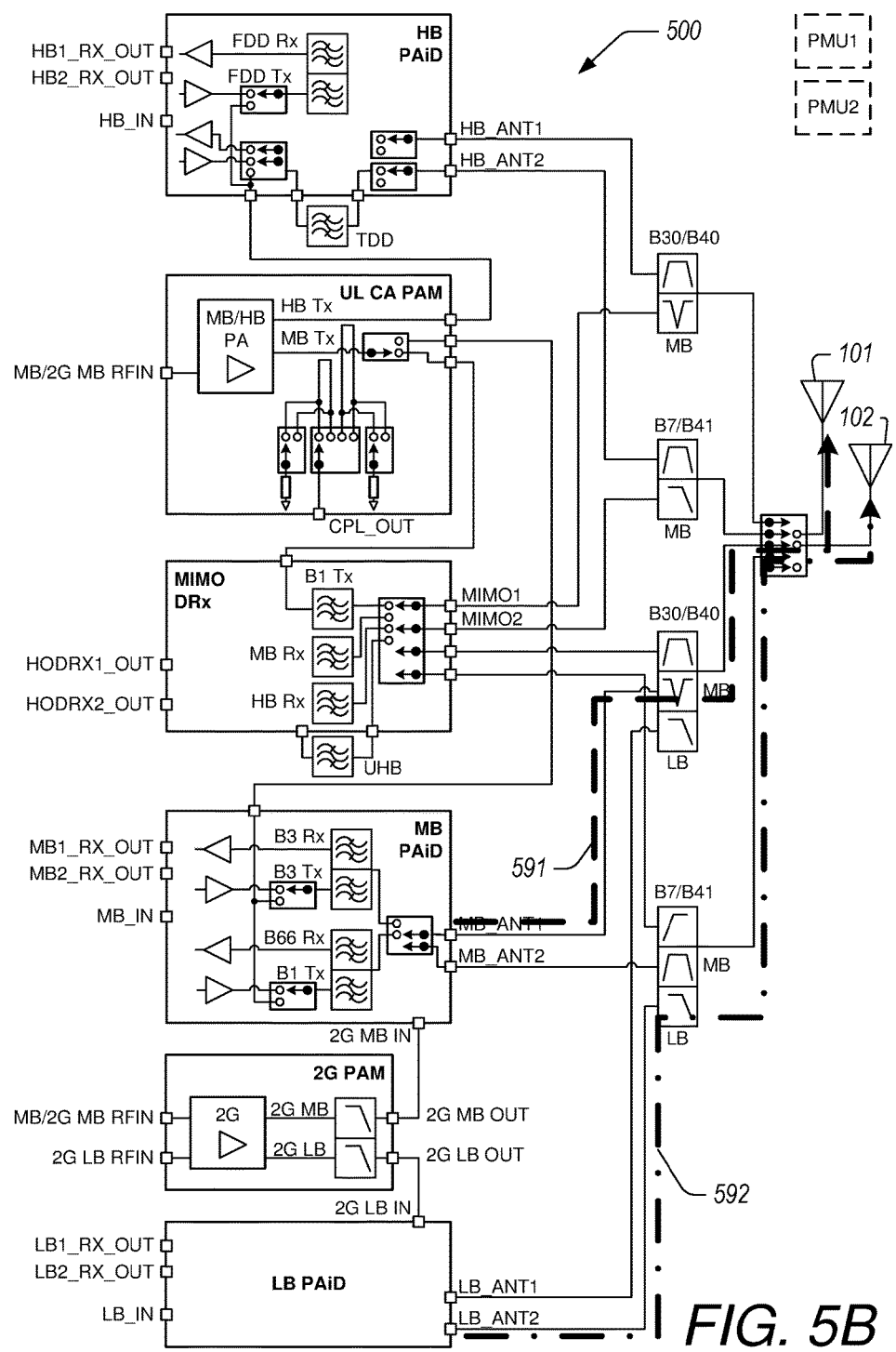
FIGS. 5B, 5C, 5D, 5E, 5F, 5G, 5H, and 5I illustrate various operational modes of the front-end architecture of FIG. 5A.

FIG. 5B illustrates a configuration for LM UL CA+MB MIMO. ANT1 101 is coupled to a primary PAiD 540 that provides MB TX, MB RX (e.g., signal path 591). ANT2 102 is coupled to the primary LB Module 550 that provides LB TX, LB RX (e.g., signal path 592). A disadvantage of this configuration is that it cannot support MB MIMO because MB MIMO is connected to the MH CA diplexer/extractor and the MH CA diplexer/extractor is not connected to the antenna.

Figure 5C:
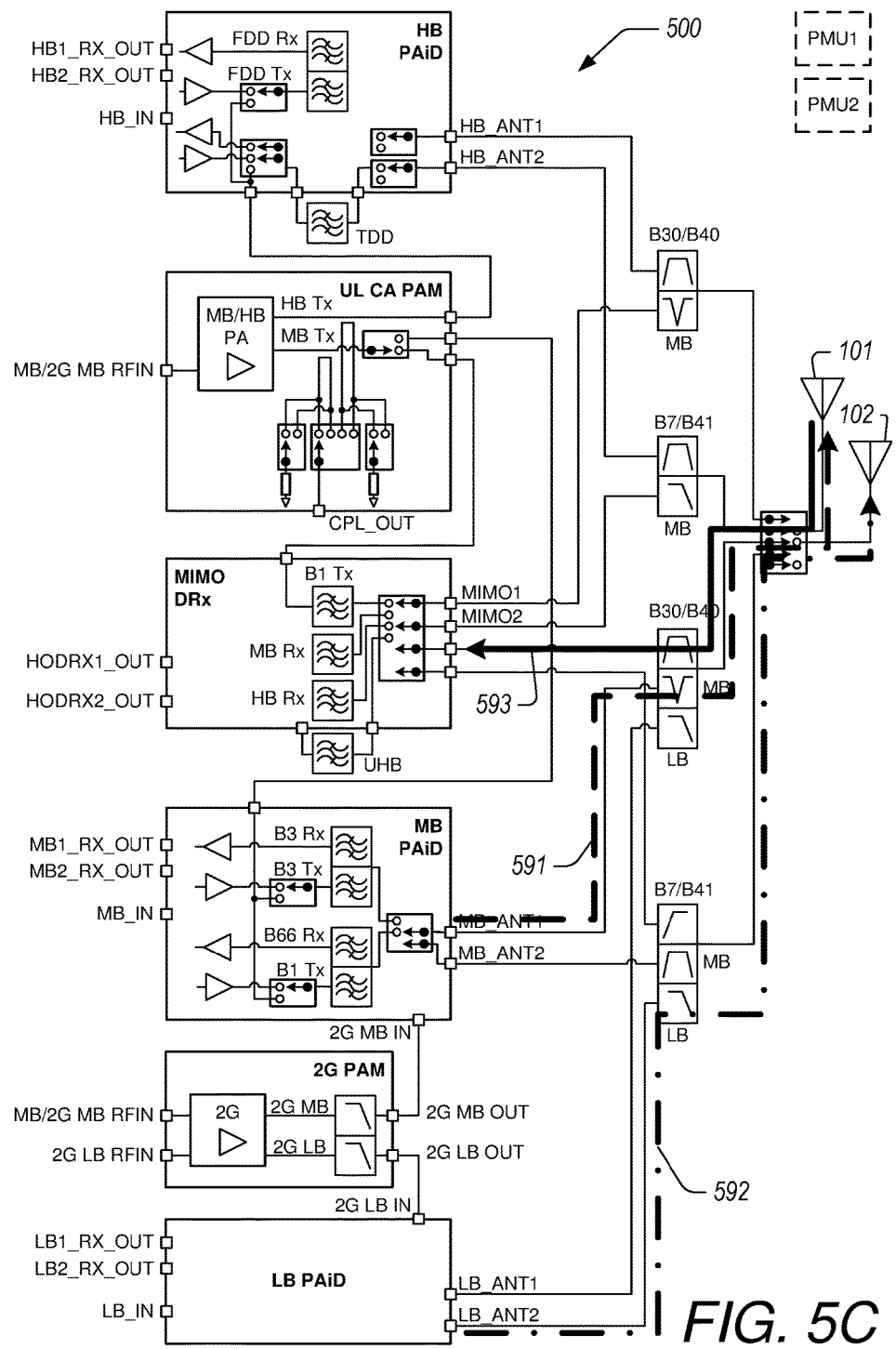

FIG. 5C illustrates a configuration for LM UL CA+HB MIMO. ANT1 101 is coupled to a primary PAiD 540 that provides MB TX, MB RX (e.g., signal path 591) and also provides HB RX MIMO (e.g., signal path 593). ANT2 102 is coupled to a primary LB Module 550 that provides LB TX and LB RX (e.g., signal path 592). A disadvantage of this configuration is that it cannot support HB RX because HB RX is connected to the MH CA diplexer/extractor and the MH CA diplexer/extractor is not connected to the antenna.

Figure 5D:
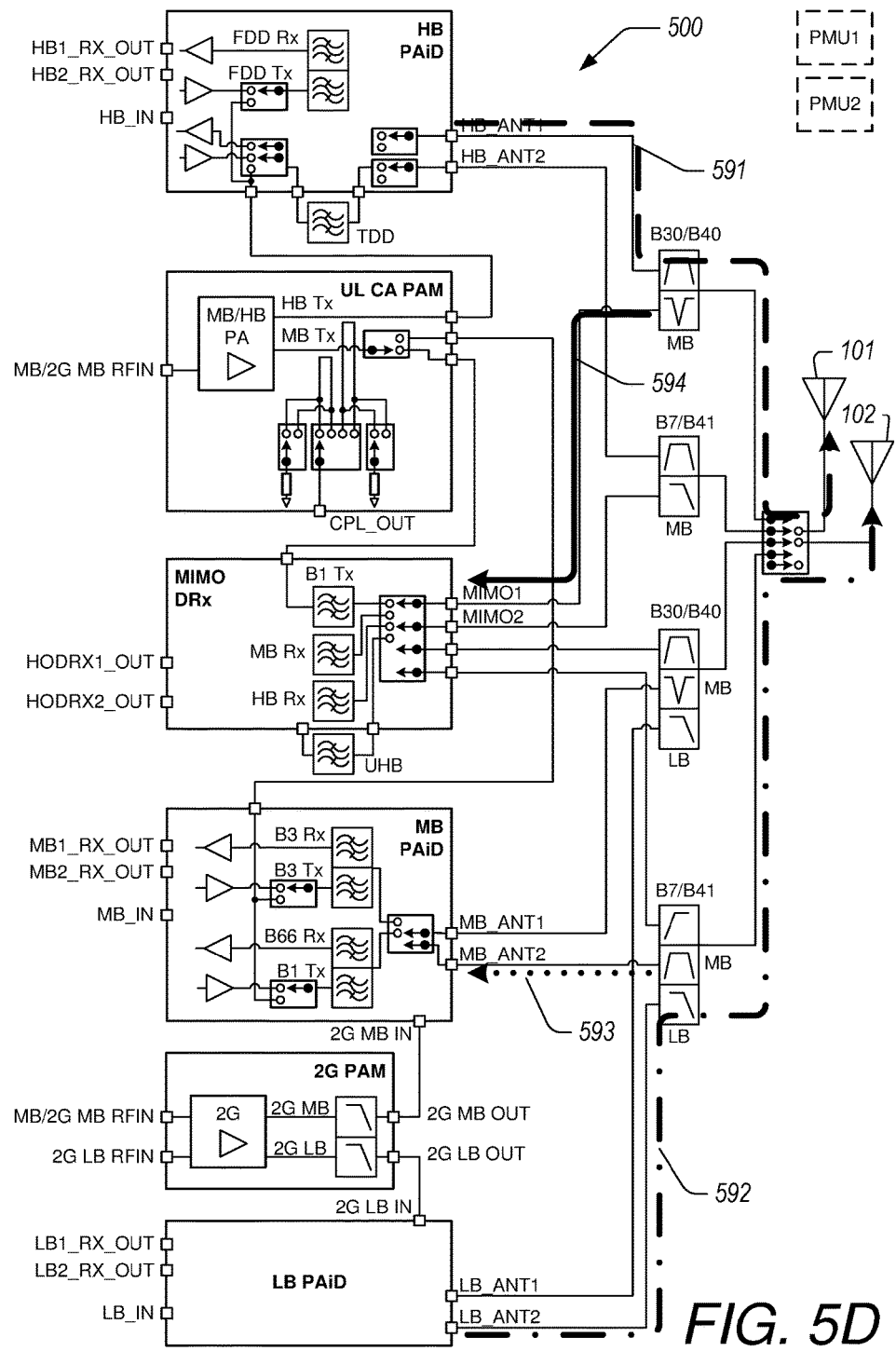

FIG. 5D illustrates a configuration for LH UL CA+MB MIMO. ANT1 101 is coupled to a primary PAiD 510 that provides HB TX and HB RX (e.g., signal path 591) and to the MIMO DRx 530 that provides MB RX MIMO (e.g., signal path 594). ANT2 102 is coupled to a primary LB Module 550 that provides LB TX and LB RX (e.g., signal path 592) and to the MB PAiD 540 that provides MB RX (e.g., signal path 593).

Figure 5E:
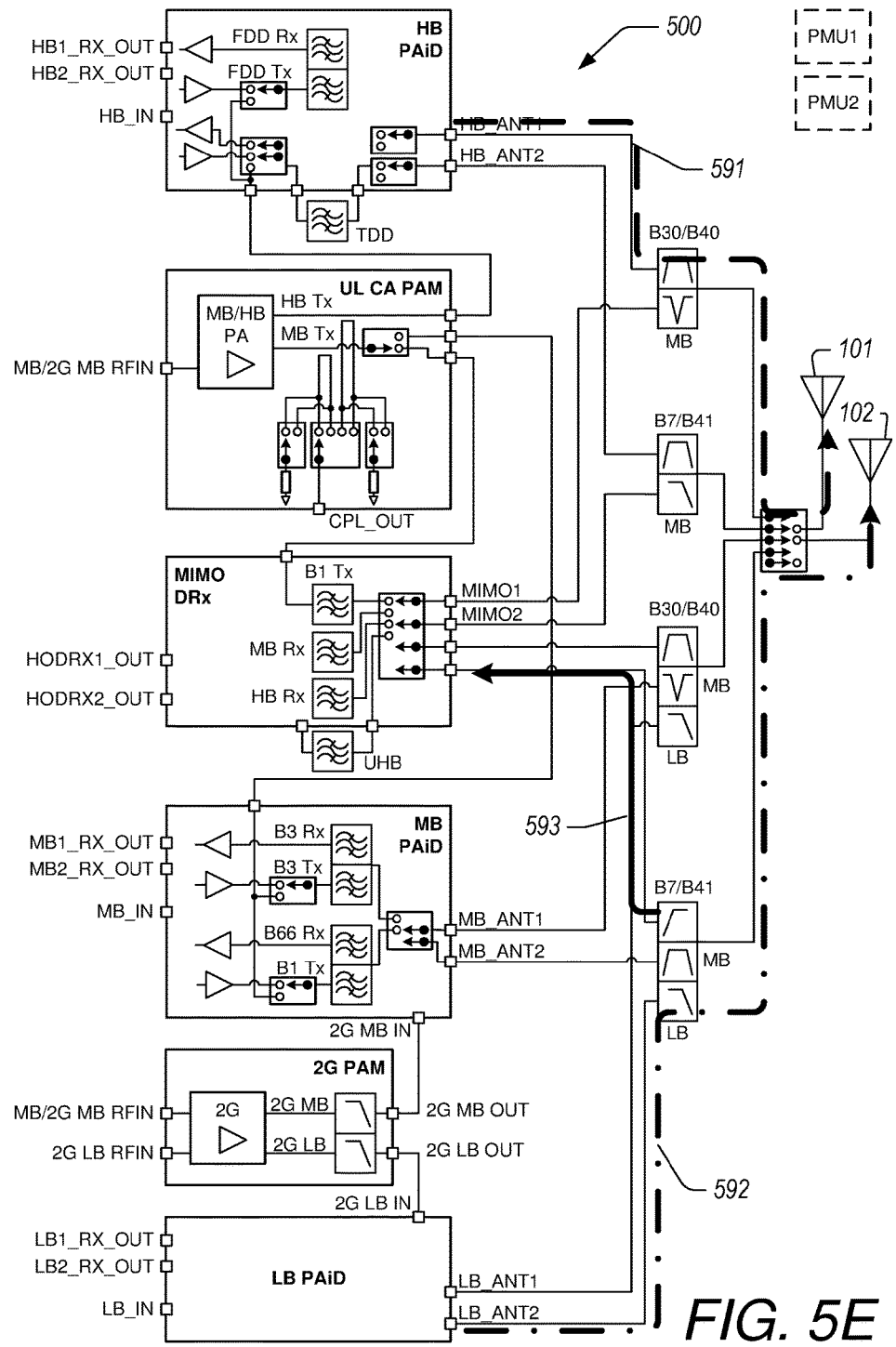

FIG. 5E illustrates a configuration for LH UL CA+HB MIMO. ANT1 101 is coupled to a primary PAiD 510 that provides HB TX, HB RX (e.g., signal path 591). ANT2 102 is coupled to a primary LB Module 550 that provides LB TX, LB RX (e.g., signal path 592) and to the MIMO DRx 530 that provides HB RX MIMO (e.g., signal path 593).

Figure 5F:
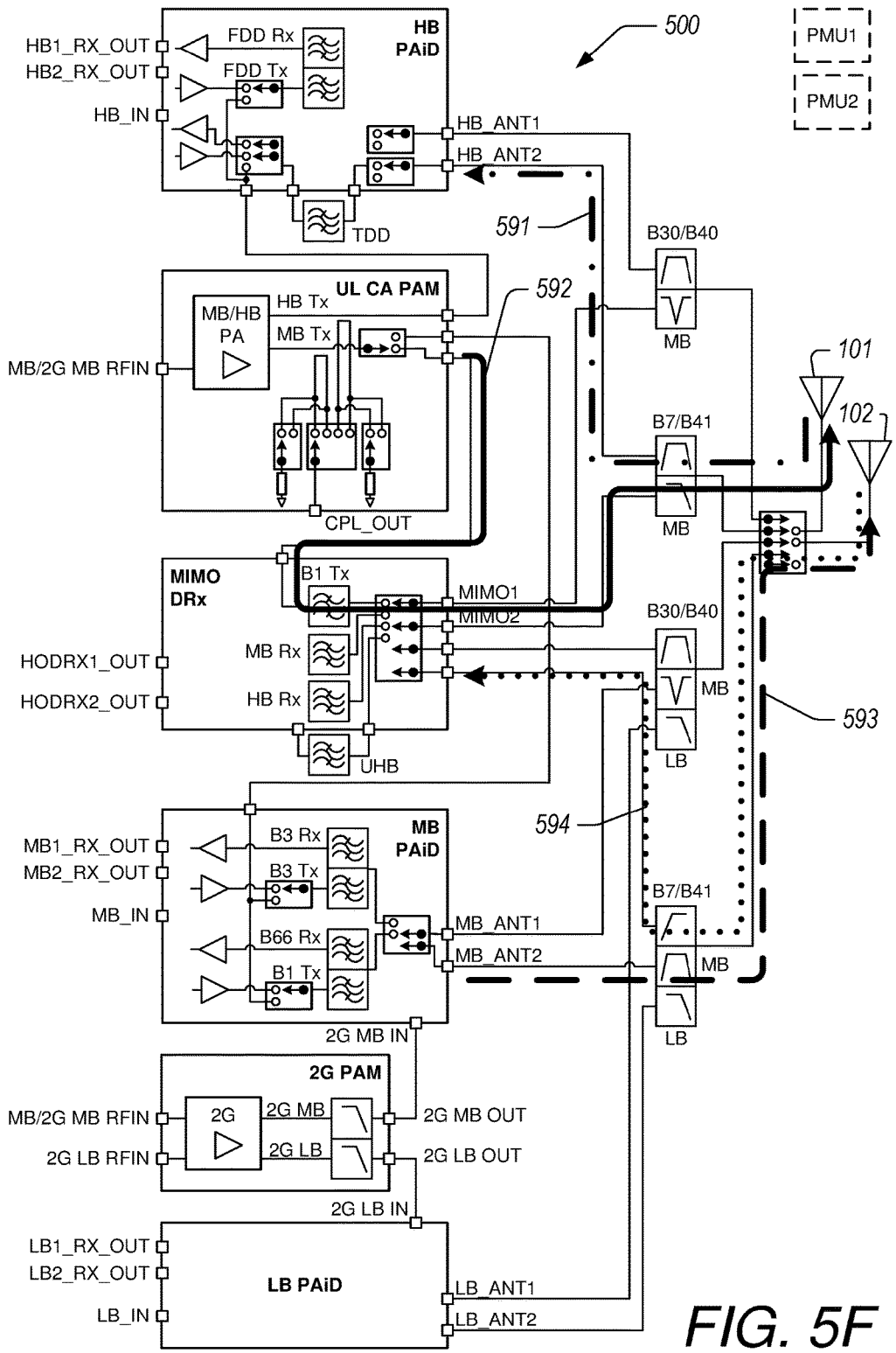
Figure 5G:
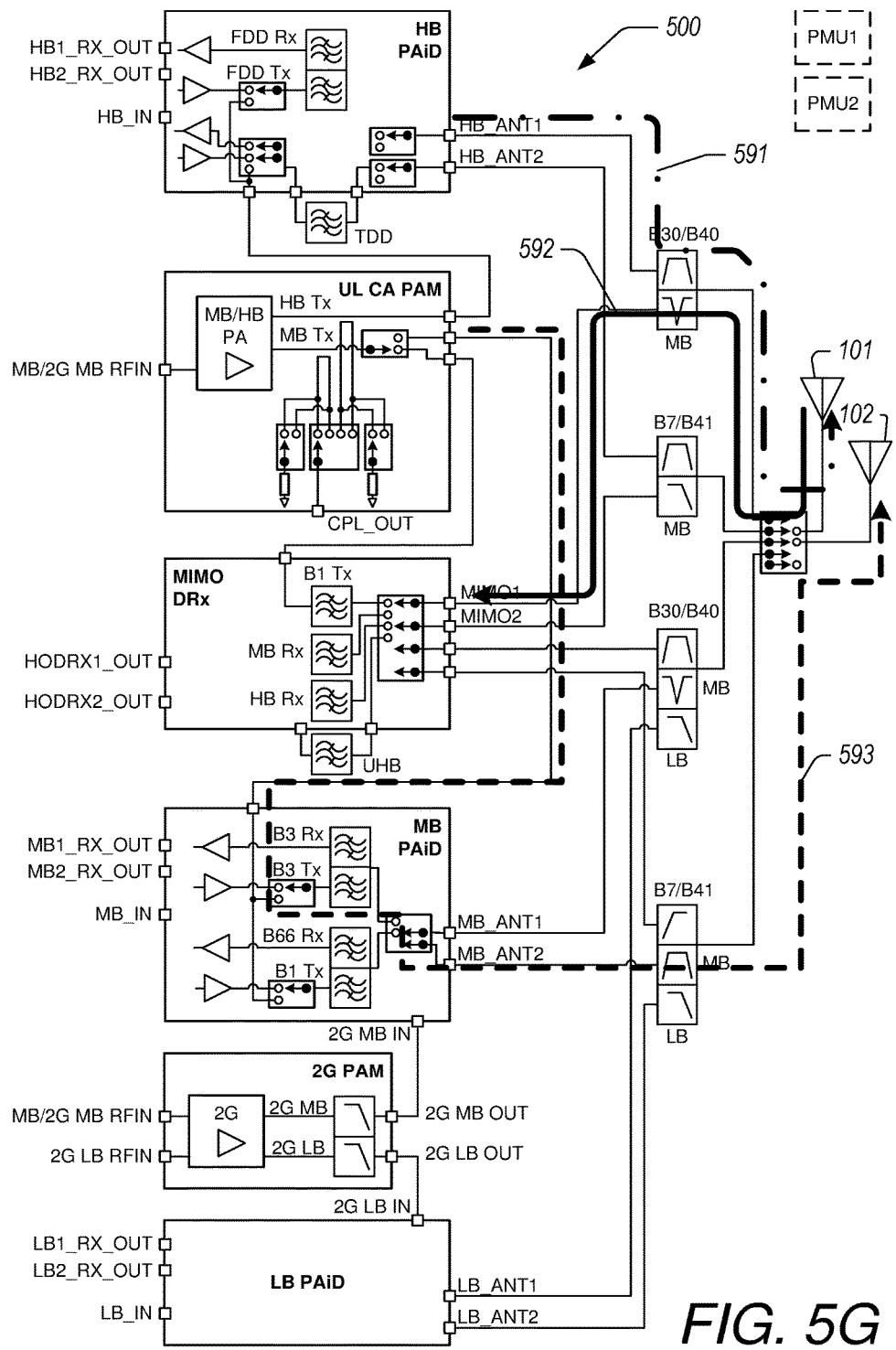
Figure 5H:
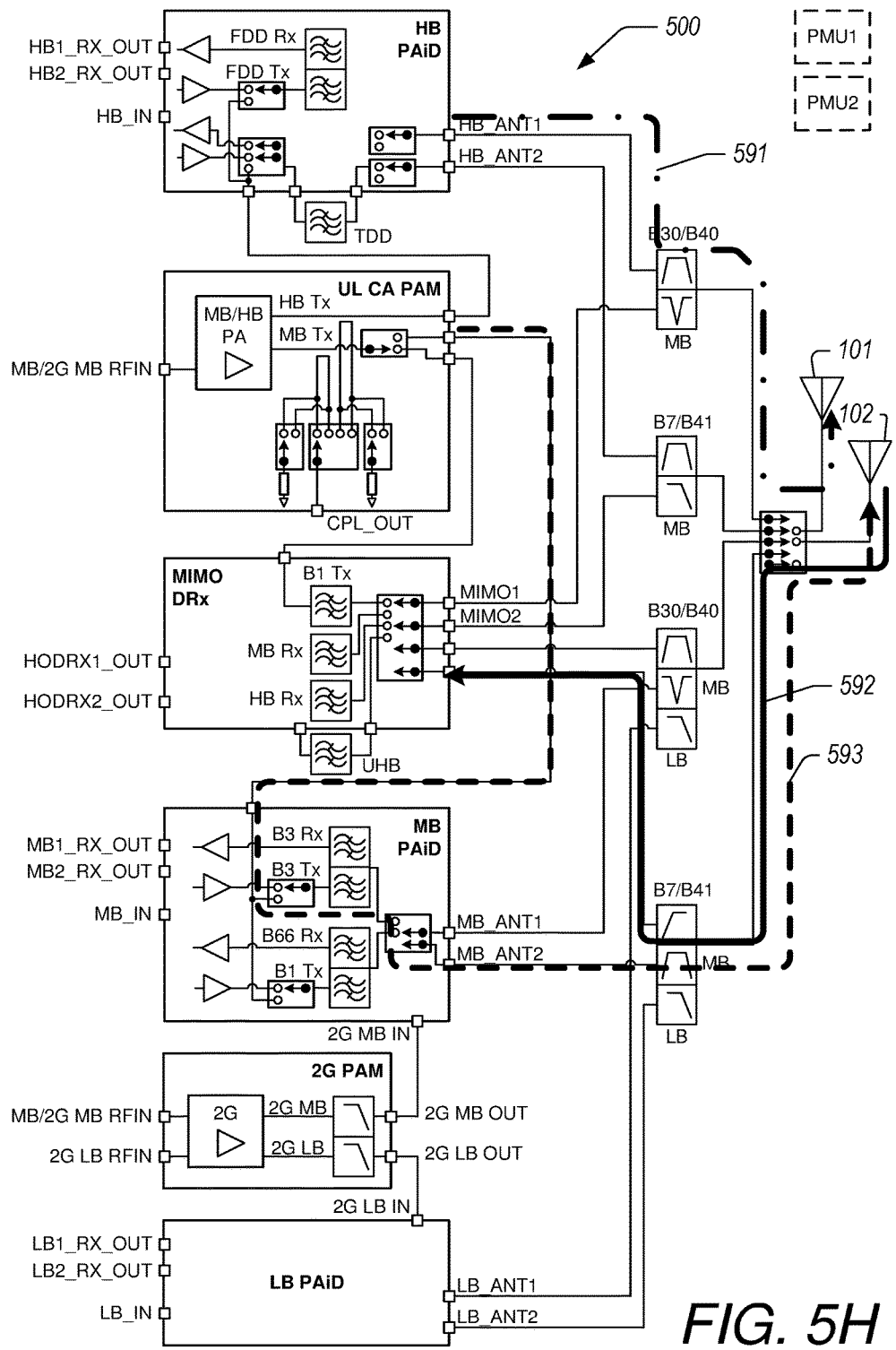
Figure 5I:
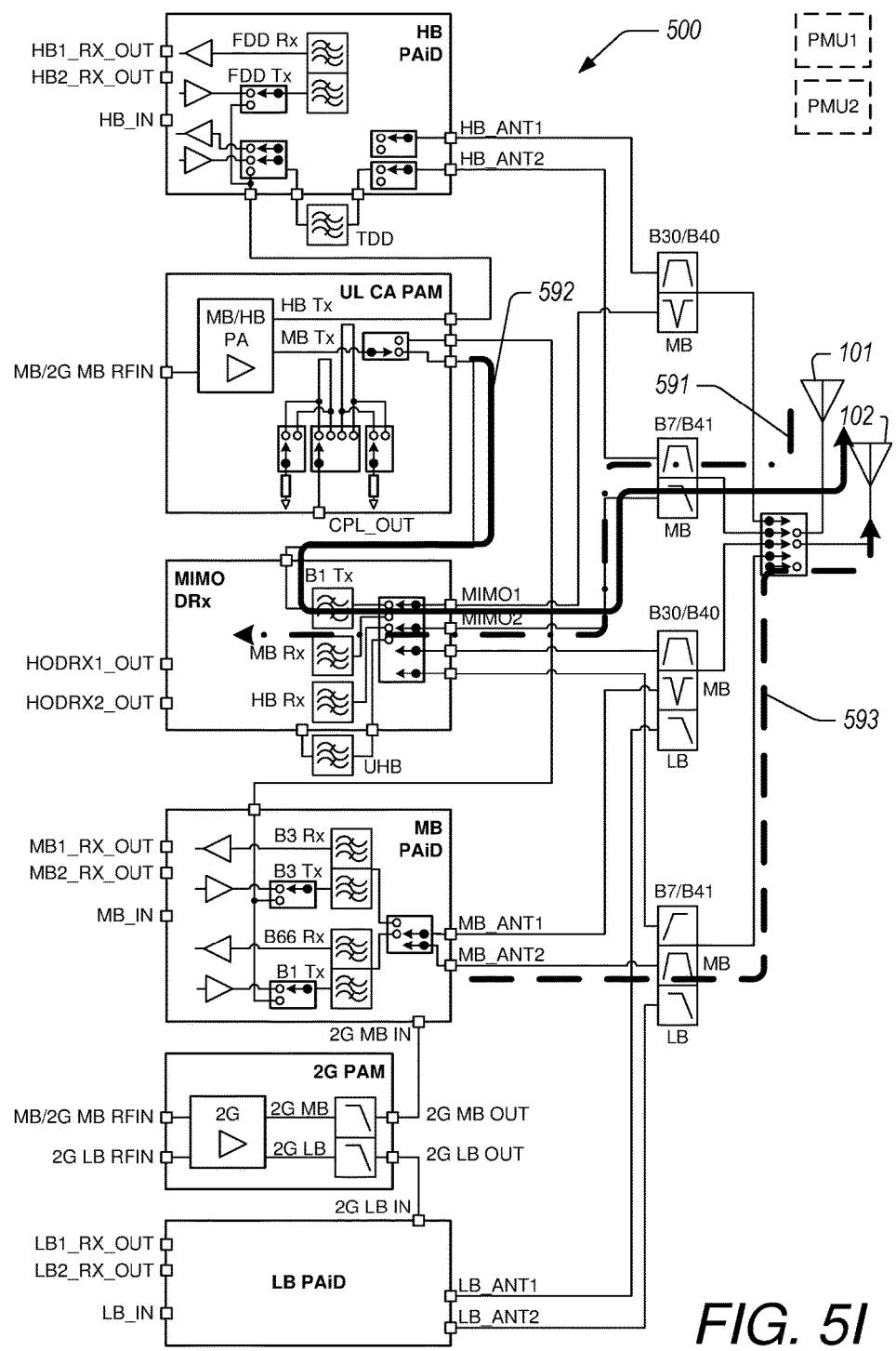

FIG. 5I illustrates a configuration that provides MM UL CA+MB MIMO. ANT2 102 is coupled to a primary PAiD 540 that provides MB TX1, MB RX1, MB RX2 (e.g., signal path 593). ANT1 101 is coupled to the UL CA Module 520 that provides MB TX2 (e.g., signal path 592) and to the MIMO DRx 530 that provides MB RX2 MIMO (e.g., signal path 591) via switchplexing. This configuration uses switch combining in the MIMO module 530 (e.g., B1 TX and B66 RX/B3 Rx, B2 TX and B2 RX/B66 RX).

FIG. 5F illustrates a configuration that provides MM UL CA+HB MIMO. ANT2 102 is coupled to a Primary PAiD 540 that provides MB TX1, MB RX1, MB RX2 (e.g., signal path 593) and HB RX (e.g., signal path 594). ANT1 101 is coupled to the UL CA Module 520 that provides MB TX2 (e.g., signal path 592) and to the MIMO DRx 530 that provides HB RX MIMO (e.g., signal path 591).

FIG. 5G illustrates a configuration that provides MH UL CA+MB MIMO. ANT1 101 is coupled to a Primary PAiD 510 that provides HB TX, HB RX (e.g., signal path 591) and MB RX MIMO (e.g., signal path 592). ANT2 102 is coupled to the UL CA Module 520 that provides MB TX, MB RX (e.g., signal path 593).

FIG. 5H illustrates a configuration that provides MH UL CA+HB MIMO. ANT1 101 is coupled to a primary PAiD 510 that provides HB TX, HB RX (e.g., signal path 591). ANT2 102 is coupled to the UL CA Module 520 that provides MB TX, MB RX (e.g., signal path 593) and to the MIMO DRx 530 that provides HB RX MIMO (e.g., signal path 592).

Figure 6A:
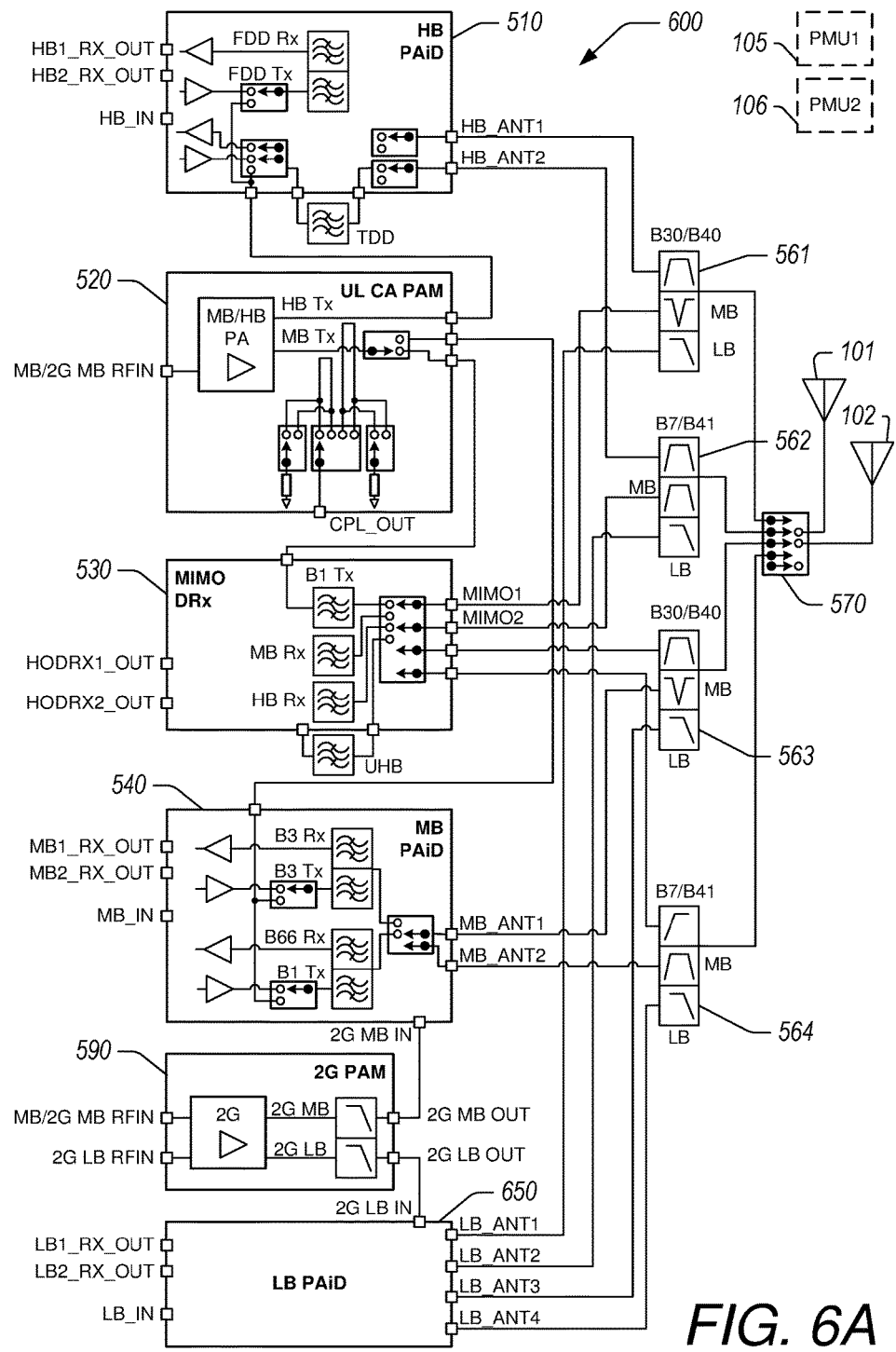
FIG. 6A illustrates a variation of the front-end architecture of FIG. 5A wherein the LB PAiD includes four output ports.
Figure 6B:
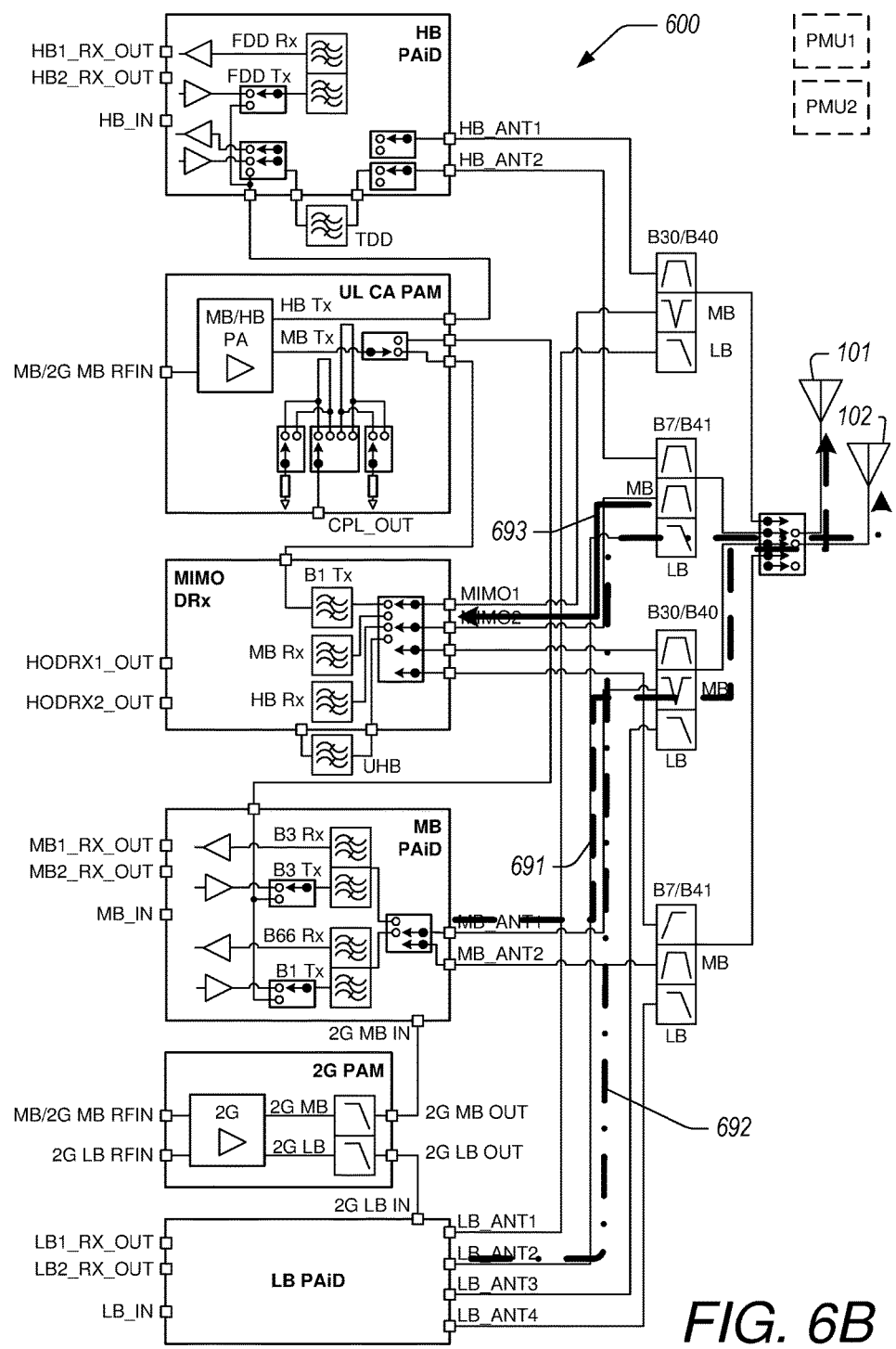
FIGS. 6B and 6C illustrate various operational modes of the front-end architecture of FIG. 6A.
Figure 6C:
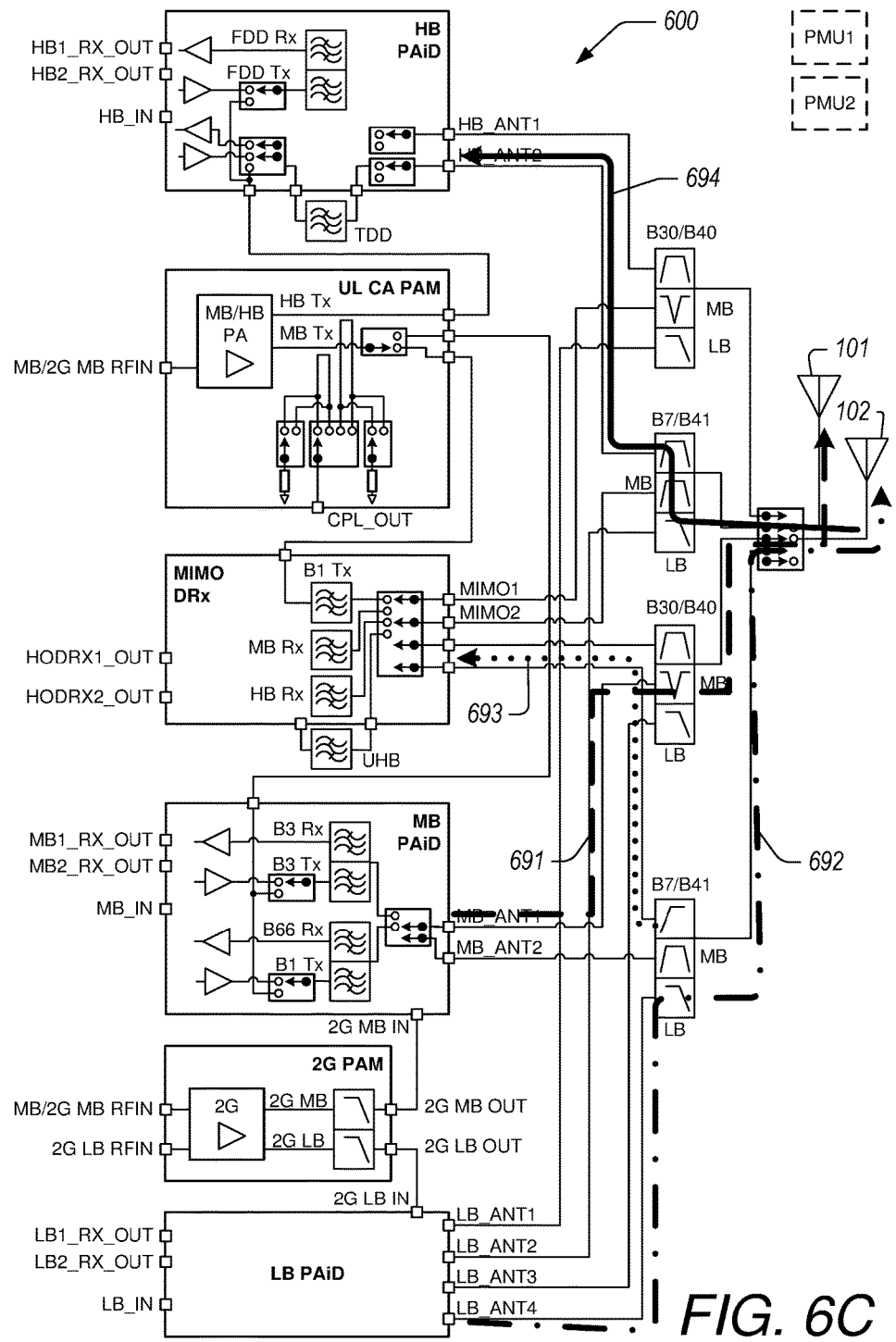

FIG. 6A illustrates a variation of the front-end architecture 500 of FIG. 5A wherein the LB PAiD includes four output ports. FIGS. 6B and 6C illustrate various operational modes of the front-end architecture 600 of FIG. 6A.

FIG. 6B illustrates a configuration that provides LM UL CA+MB MIMO. ANT1 101 is coupled to a primary PAiD 540 that provides MB TX, MB RX (e.g., signal path 691). ANT2 102 is coupled to the primary LB Module 550 that provides LB TX, LB RX (e.g., signal path 692) and to the MIMO DRx 530 that provides MB RX MIMO (e.g., signal path 693). A disadvantage of this configuration is LPF loading loss and an increase of LB output ports.

FIG. 6C illustrates a configuration that provides LM UL CA+HB MIMO. ANT1 101 is coupled to a primary PAiD 540 that provides MB TX, MB RX (e.g., signal path 691) and to the HB PAiD 510 that provides HB RX (e.g., signal path 694). ANT2 102 is coupled to the primary LB Module 550 that provides LB TX, LB RX (e.g., signal path 692) and to the MIMO DRx 530 that provides HB RX MIMO (e.g., signal path 693). A disadvantage of this configuration is LPF loading loss and an increase of LB output ports.

Example 2 of a Front-End Architecture

Figure 7A:
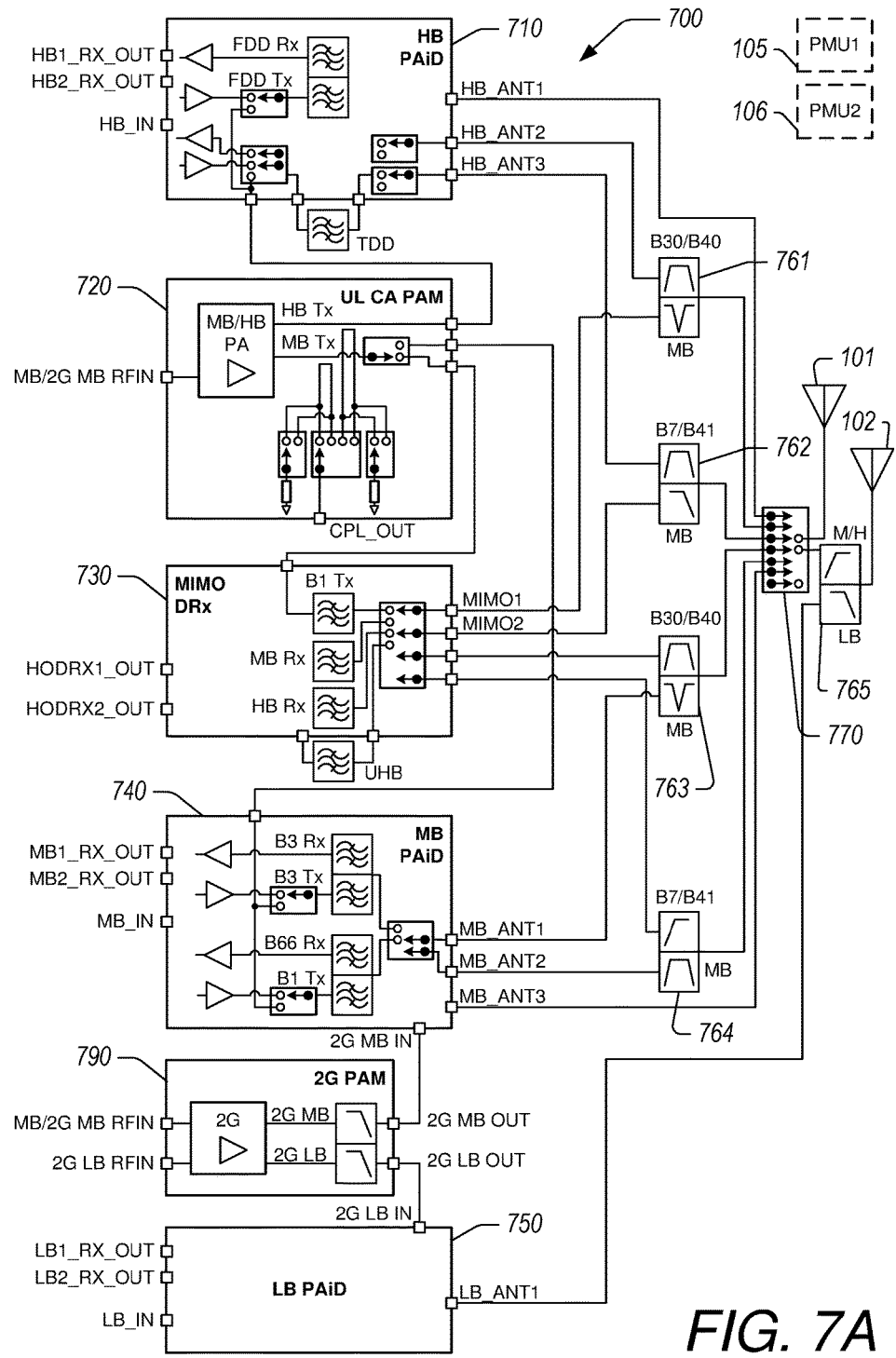
FIG. 7A illustrates another variation of a front-end architecture wherein there is no MB/HB switch combining in a MIMO DRx module, where a LB diplexer is positioned after an antenna switch module, and where a L-M/H diplexer is positioned between an antenna and the antenna switch module.

FIG. 7A illustrates another variation of a front-end architecture 700, similar to the front-end architecture 500, wherein there is no MB/HB switch combining in a MIMO DRx module, where a LB diplexer is positioned after an antenna switch module, and where a L-M/H diplexer is positioned between an antenna and the antenna switch module. The switch 770 enables MB and HB bypass. There is also a L-M/H diplexer 765 between the switch 770 ASM and antenna 102 to support L-M UL CA+M/H MIMO and to relax linearity requirements. This also improves insertion loss performance by eliminating use of triplexers. FIGS. 7B-7I illustrate various operational modes of the front-end architecture 700 of FIG. 7A.

Figure 7B:
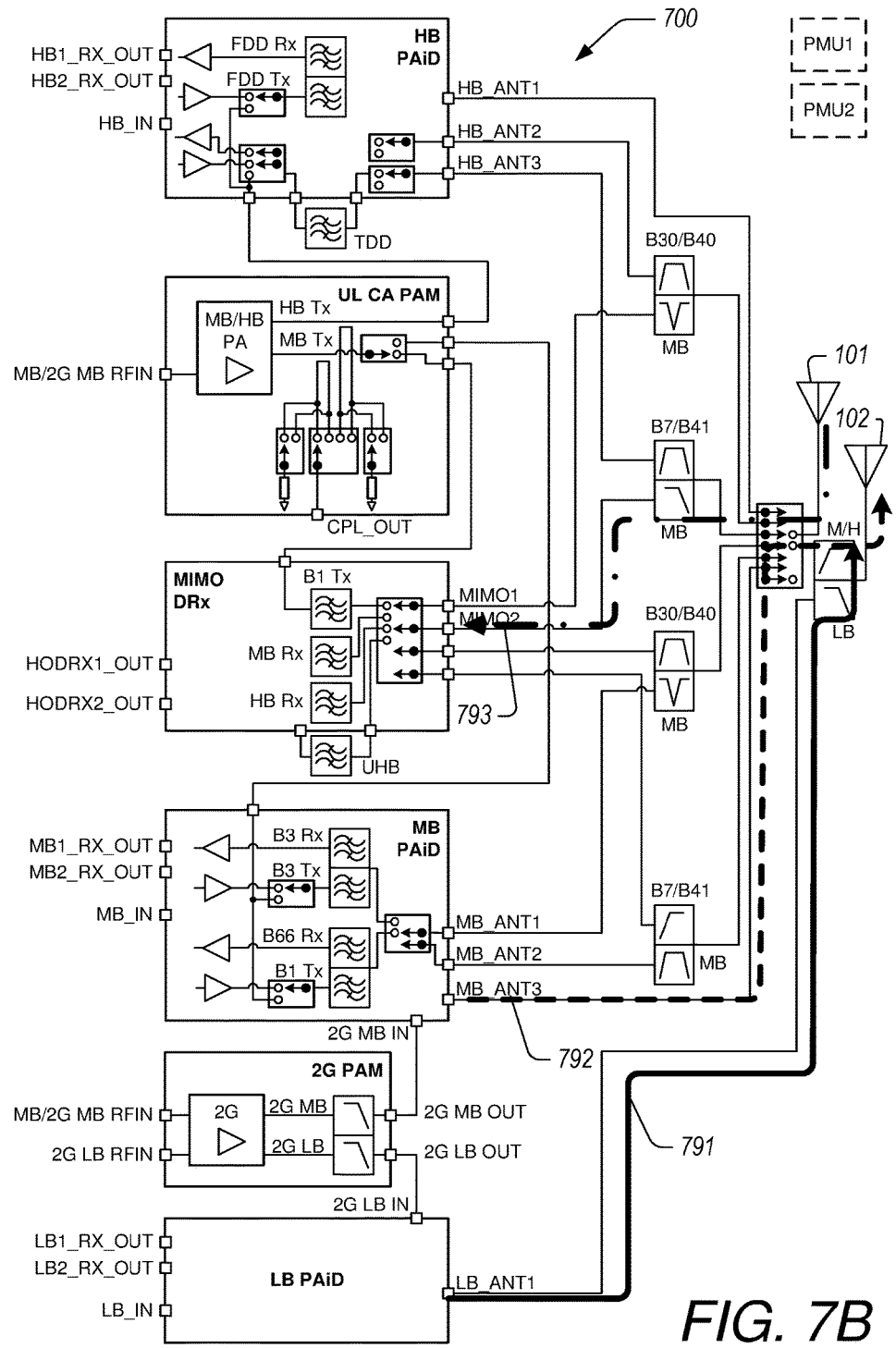
FIGS. 7B, 7C, 7D, 7E, 7F, 7G, 7H, and 7I illustrate various operational modes of the front-end architecture of FIG. 7A.

FIG. 7B illustrates a configuration that provides LM UL CA+MB MIMO. ANT1 101 provides MB MIMO RX (e.g., signal path 793) through the MIMO DRx 730. ANT2 102 is coupled to a primary MB Module 740 that provides MB TX, MB RX (e.g., signal path 792) and to a primary LB Module 750 that provides LB TX, LB RX (e.g., signal path 791). The MIMO DRx module 730 includes B66/B25/B3/B39 RX filters.

Figure 7C:
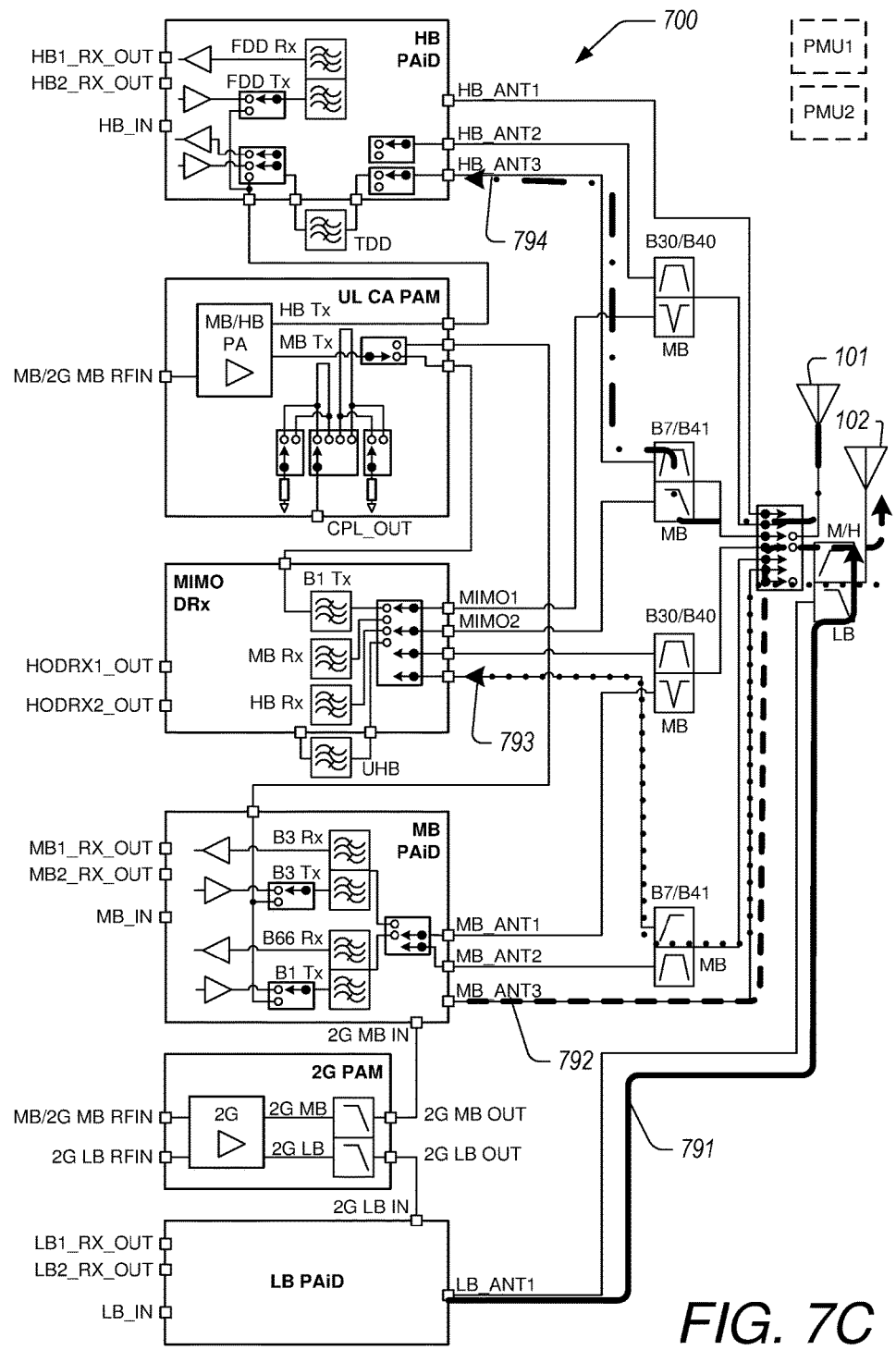

FIG. 7C illustrates a configuration that provides LM UL CA+HB MIMO. ANT1 101 provides HB RX (e.g., signal path 794). ANT2 102 provides HB MIMO RX (e.g., signal path 793) through the MIMO DRx 730 and is coupled to the primary MB Module 740 that provides MB TX, MB RX (e.g., signal path 792) and to a Primary LB Module 750 that provides LB TX, LB RX (e.g., signal path 791). The MIMO DRx module 730 includes B7/B30/B40/B41 RX filters.

Figure 7D:
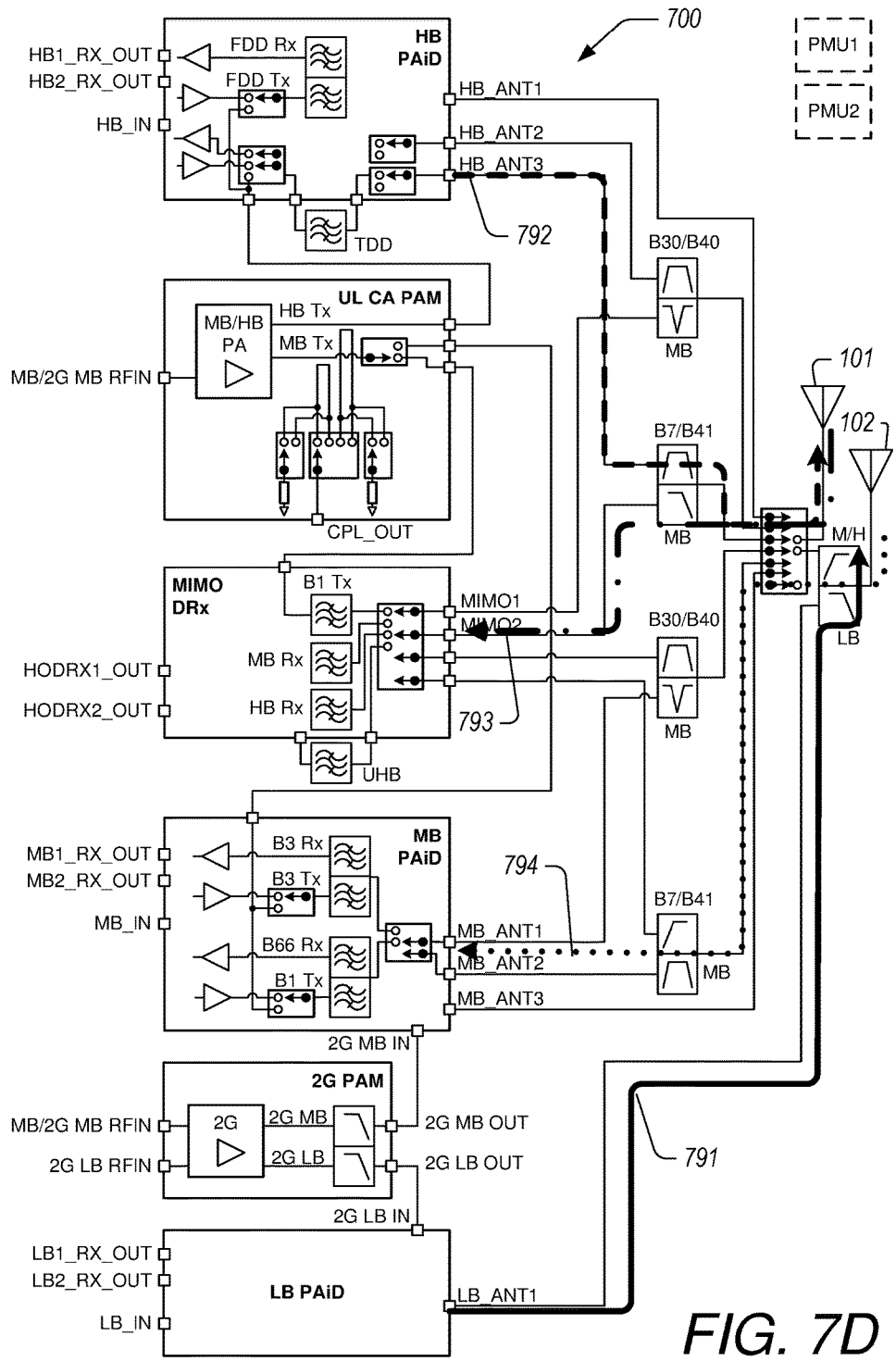

FIG. 7D illustrates a configuration that provides LH UL CA+MB MIMO. ANT1 101 provides MB RX MIMO (e.g., signal path 793) through the MIMO DRx 730 and is coupled to a Primary PAiD 710 that provides HB TX, HB RX (e.g., signal path 792). ANT2 102 is coupled to the MB PAiD 740 that provides MB RX (e.g., signal path 794) and is coupled to a Primary LB Module 750 that provides LB TX, LB RX (e.g., signal path 791). B66/B25/B3/B39 RX filters are included inside the MIMO DRx module 730.

Figure 7E:
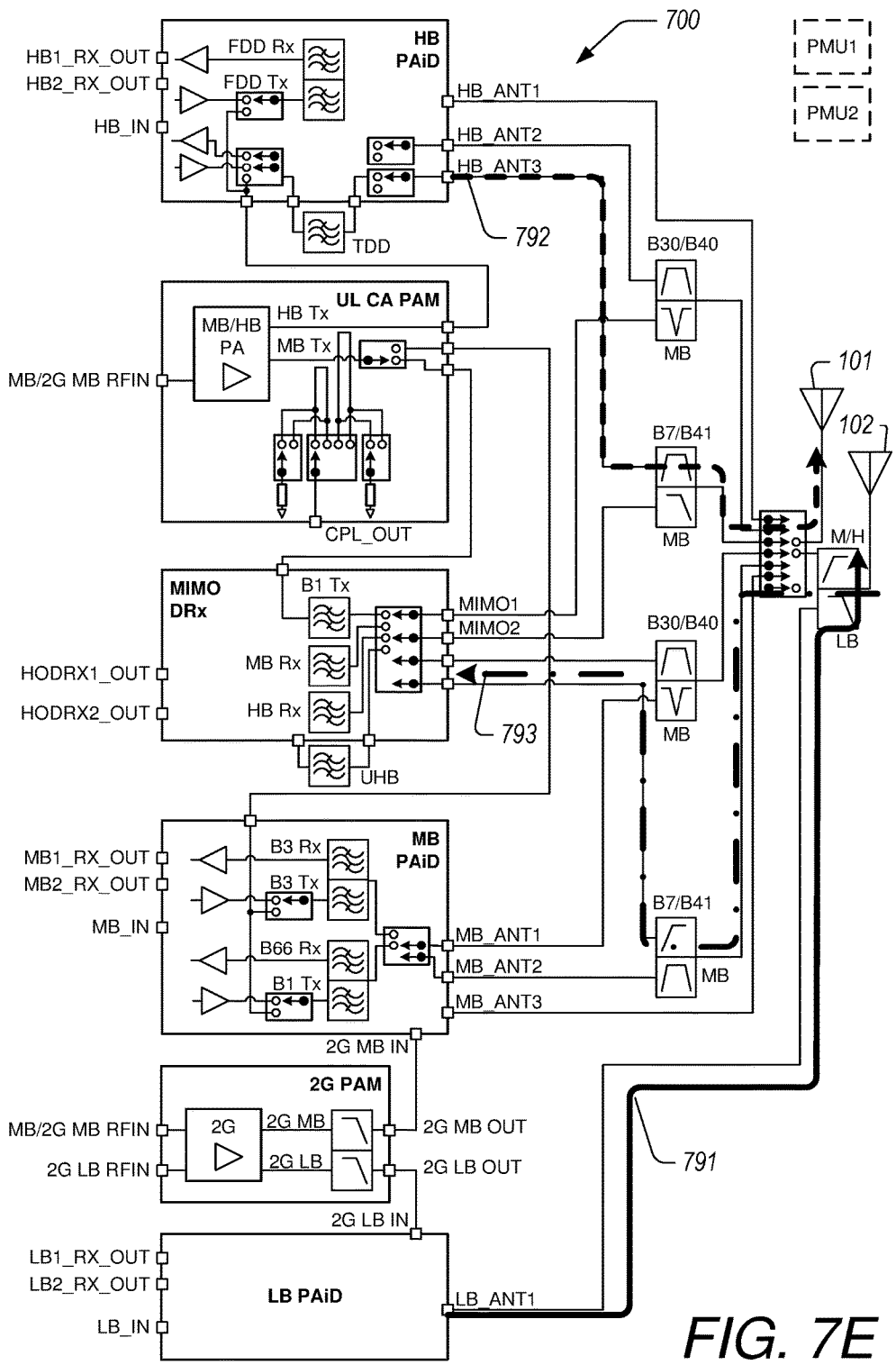

FIG. 7E illustrates a configuration that provides LH UL CA+HB MIMO. ANT1 101 is coupled to the Primary PAiD 710 that provides HB TX, HB RX (e.g., signal path 792). ANT2 102 is coupled to the MIMO DRx 730 that provides HB RX MIMO (e.g., signal path 793), and is coupled to the Primary LB Module 750 that provides LB TX, LB RX (e.g., signal path 791). B66/B25/B3/B39 RX filters are included inside the MIMO DRx module 730.

Figure 7F:
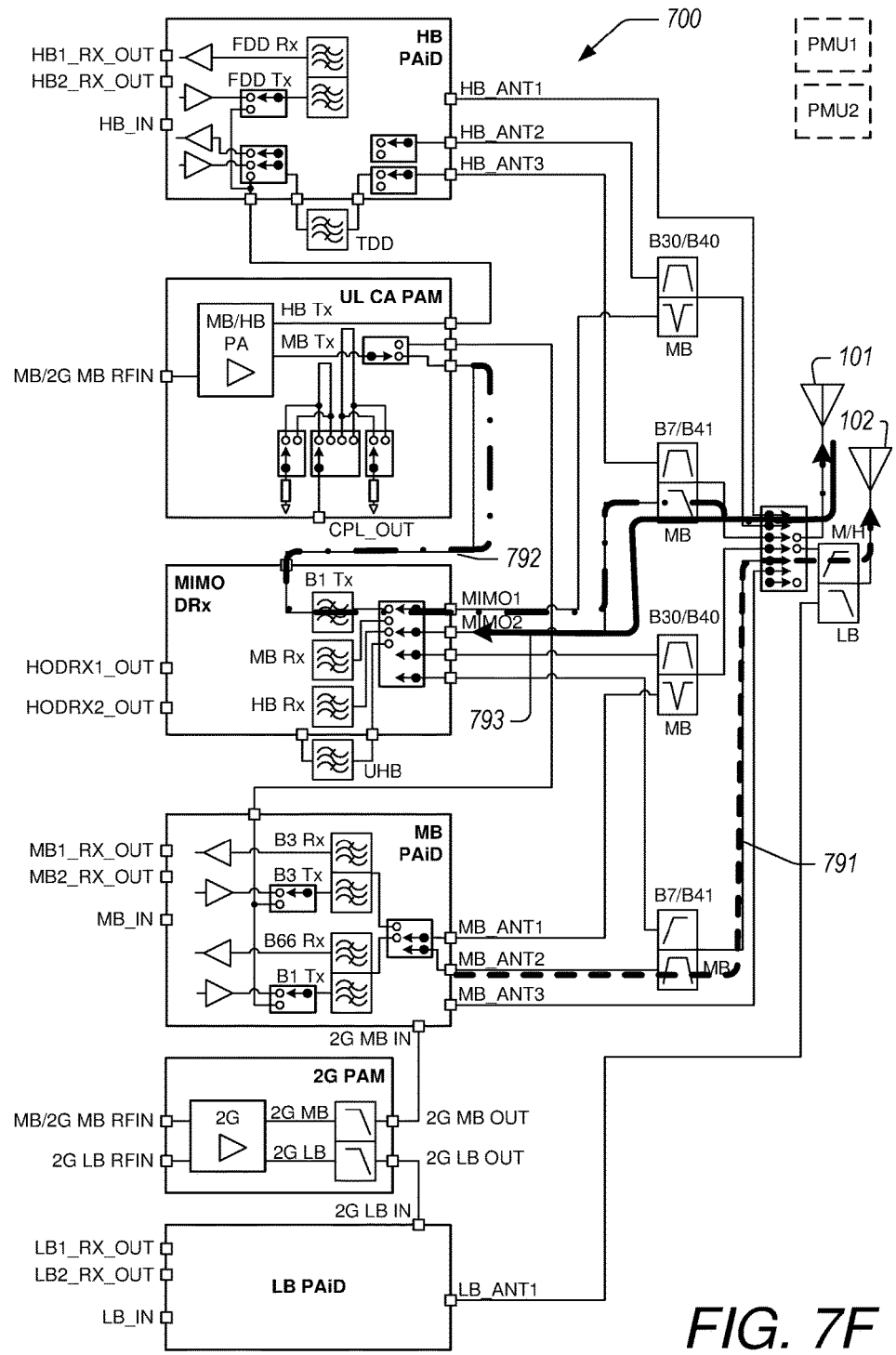

FIG. 7F illustrates a configuration that provides MM UL CA+MB MIMO. ANT2 102 is coupled to the Primary PAiD 740 that provides MB TX1, MB RX1, MB RX2 (e.g., signal path 791). ANT1 101 is coupled to the UL CA Module 720 that provides MB TX2 (e.g., signal path 792), and is coupled to the MIMO DRx 730 that provides MB RX2 (e.g., signal path 793) MIMO via switchplexing. In this configuration, switch combining is required in the MIMO module 730 and includes, for example, B1 TX and B66 RX/B3 Rx switch combining and B2 TX and B2 RX/B66 RX switch combining.

Figure 7G:
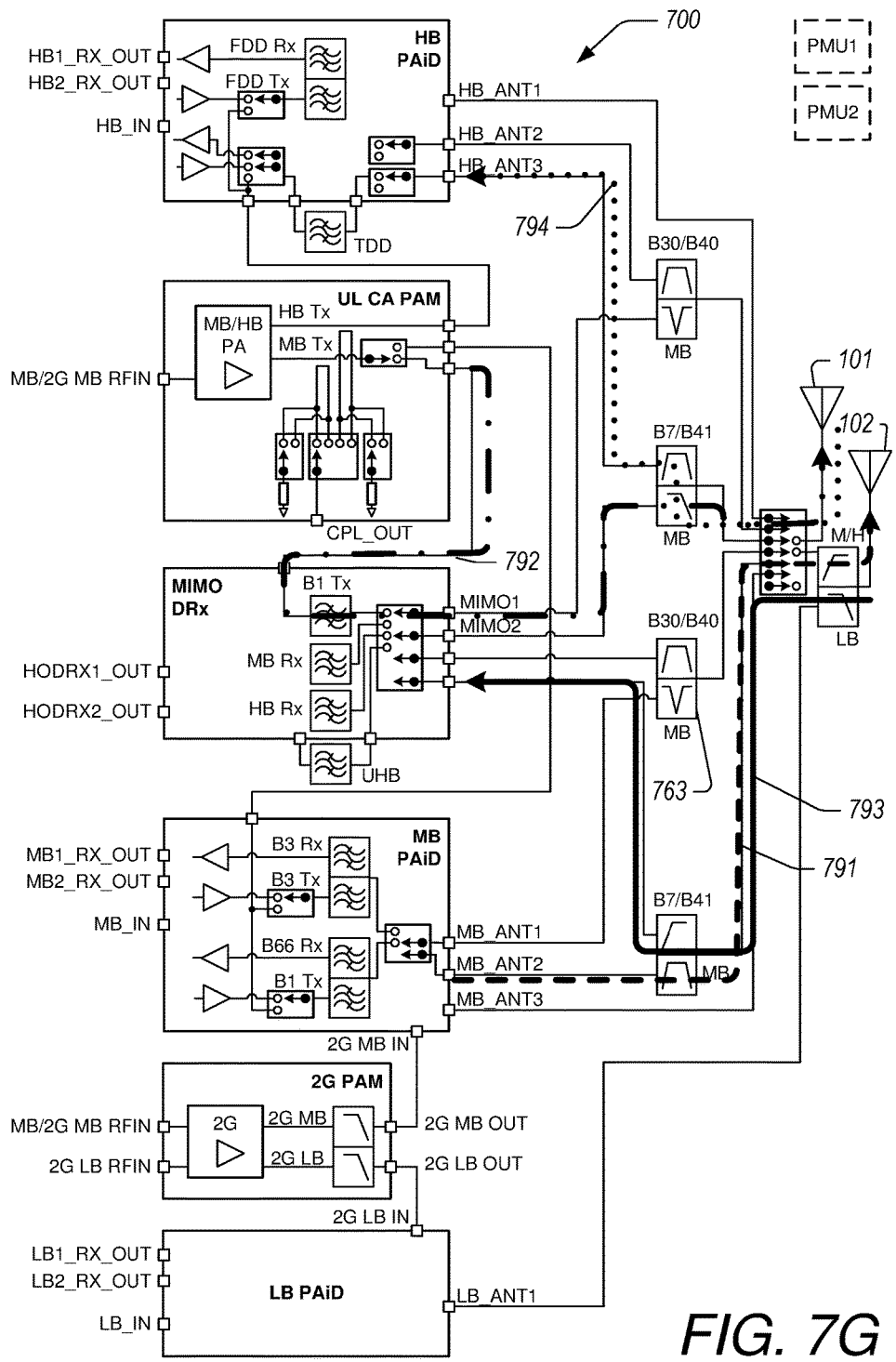

FIG. 7G illustrates a configuration that provides MM UL CA+HB MIMO. ANT2 102 is coupled to the MIMO DRx 730 that provides HB RX (e.g., signal path 793), and is coupled to the Primary PAiD 740 that provides MB TX1, MB RX1, MB RX2 (e.g., signal path 791). ANT1 101 is coupled to the HB PAiD 710 that provides HB RX MIMO (e.g., signal path 794), and is coupled to the UL CA Module 720 that provides MB TX2 (e.g., signal path 792). In this configuration, B1 and B2 MB TX filters are utilized as well as 4 HB RX filters.

Figure 7H:
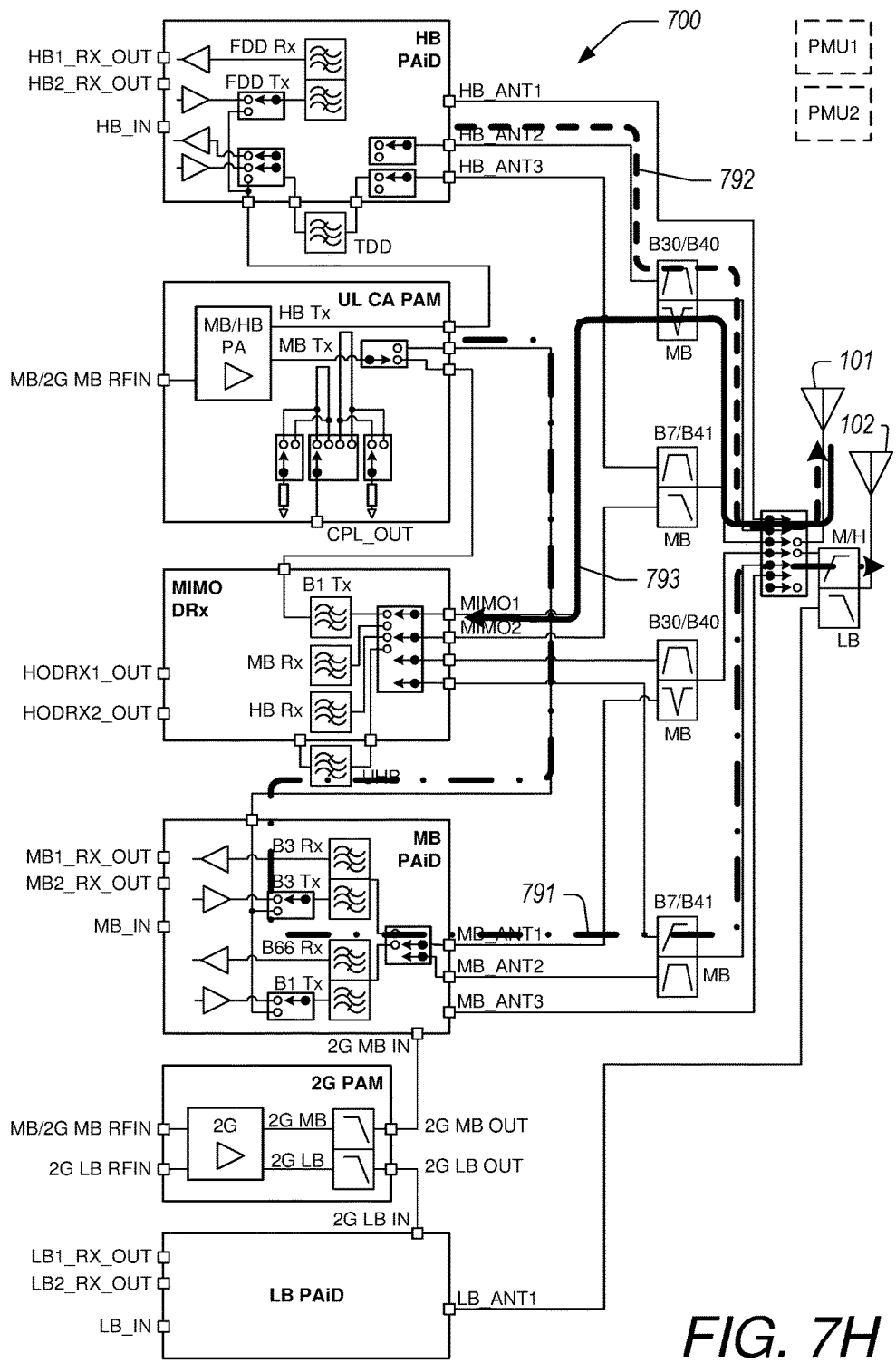

FIG. 7H illustrates a configuration that provides MH UL CA+MB MIMO. ANT1 101 is coupled to the MIMO DRx 730 that provides MB RX MIMO (e.g., signal path 793), and is coupled to the Primary PAiD 710 that provides HB TX, HB RX (e.g., signal path 792). ANT2 102 is coupled to the UL CA Module 720 that provides MB TX, MB RX (e.g., signal path 791). B66/B25/B3/B39 RX filters are included inside the MIMO DRx module 730.

Figure 7I:
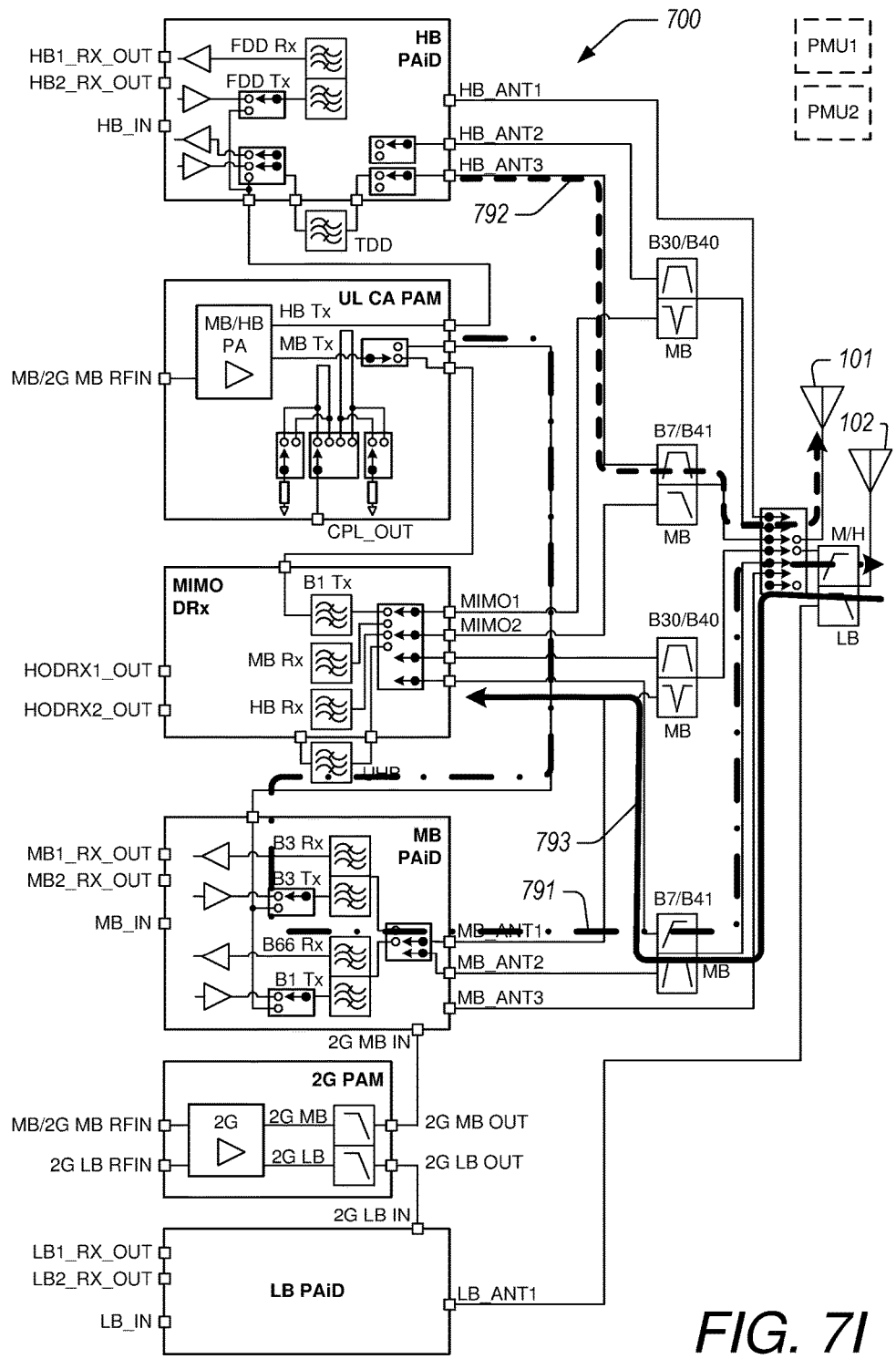

FIG. 7I illustrates a configuration that provides MH UL CA+HB MIMO. ANT1 101 is coupled to the Primary PAiD 710 that provides HB TX, HB RX (e.g., signal path 792). ANT2 102 is coupled to the MIMO DRx 730 that provides HB RX MIMO (e.g., signal path 793), and is coupled to the UL CA Module 720 that provides MB TX, MB RX (e.g., signal path 791).

Example 3 of a Front-End Architecture

Figure 8A:
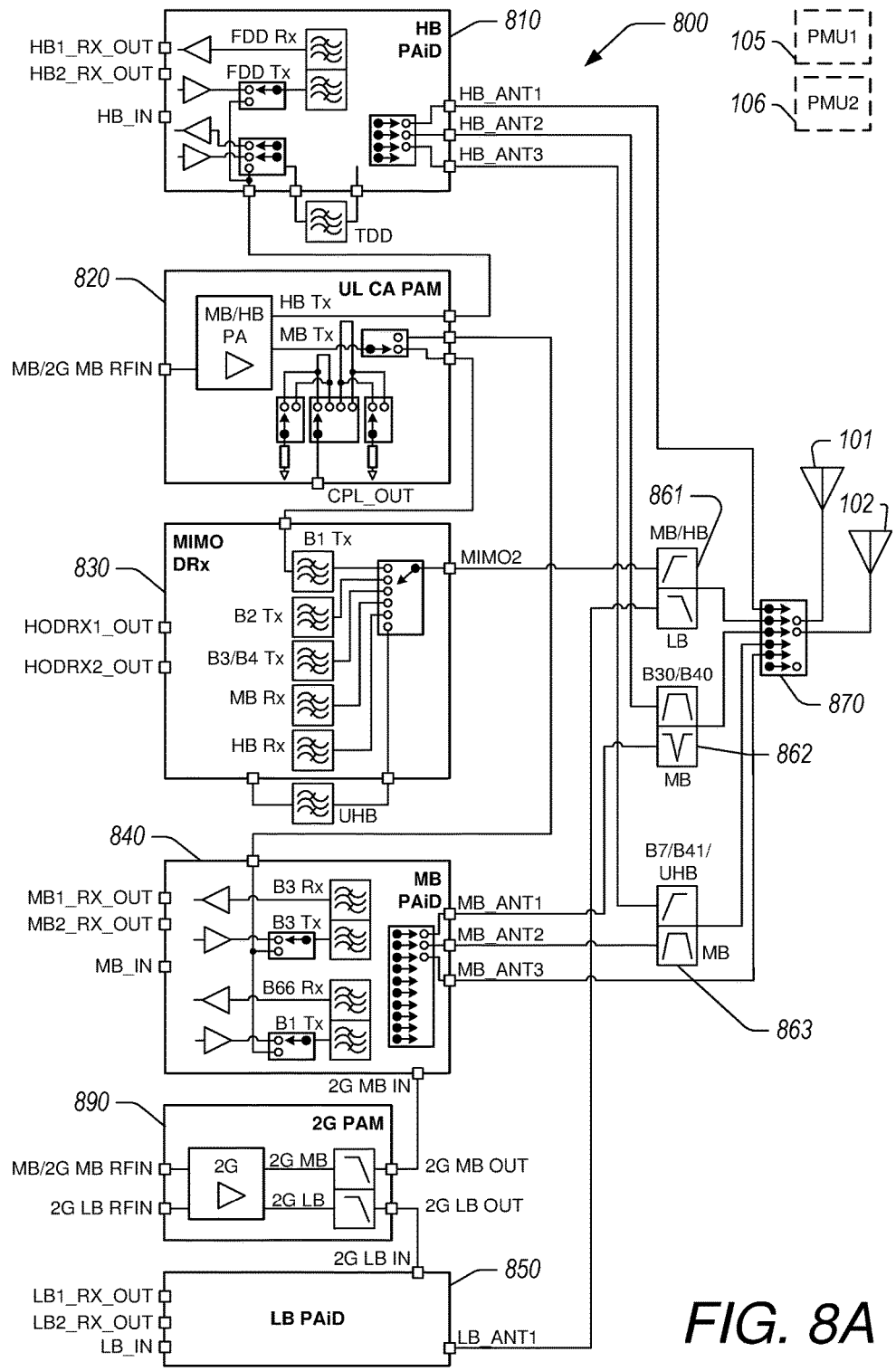
FIG. 8A illustrates another example front-end architecture wherein there is MB/HB switch combining in a MIMO DRx module and where a LB diplexer is positioned before an antenna switch module.

FIG. 8A illustrates another example front-end architecture 800 wherein there is MB/HB switch combining in a MIMO DRx module and where a LB diplexer is positioned before an antenna switch module.

In the front-end architecture 800, bypass is important for single band performance vs. MB/HB combined PAiD. In the front-end architecture 800, LB is diplexed before the mPnT switch. In the front-end architecture 800, diplex bypass enables low single band insertion loss.

In the front-end architecture 800, PMU1 105 provides power to the MB/HB modules, and PMU2 105 provides power to the ULCA/LB modules.

FIGS. 8B-8I illustrate various operational modes of the front-end architecture 800 of FIG. 8A.

Figure 8B:
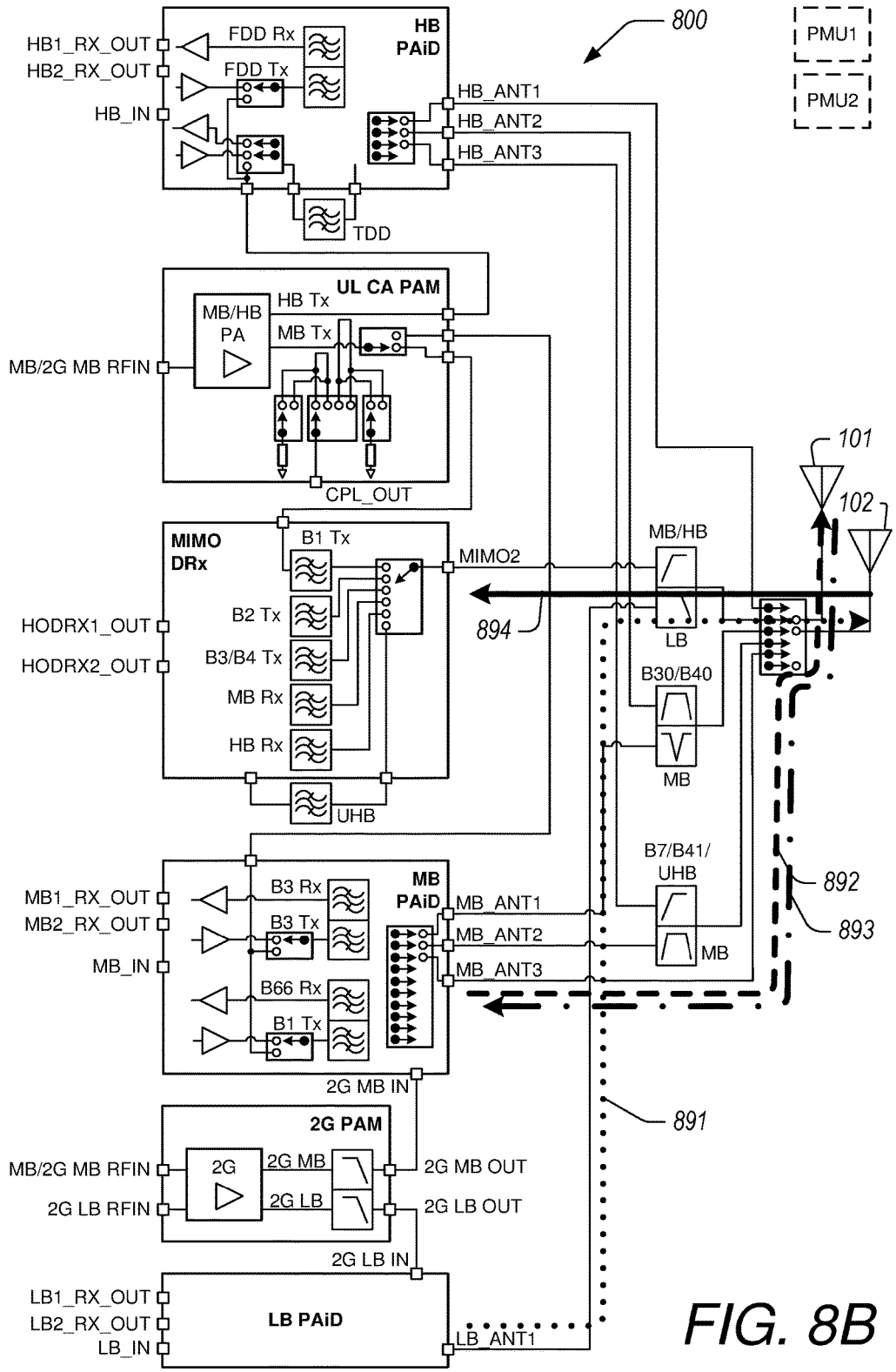
FIGS. 8B, 8C, 8D, 8E, 8F, 8G, 8H, and 8I illustrate various operational modes of the front-end architecture of FIG. 8A.

FIG. 8B illustrates a configuration that provides LM UL CA+MB MIMO. ANT1 101 is coupled to the Primary MB PAiD 840 that provides MB TX (e.g., signal path 892), MB RX (e.g., signal path 893). ANT2 102 is coupled to the MB/HB MIMO DRx 830 that provides MB RX MIMO (e.g., signal path 894), and is coupled to the Primary LB Module 850 that provides LB TX, LB RX (e.g., signal path 891).

Figure 8C:
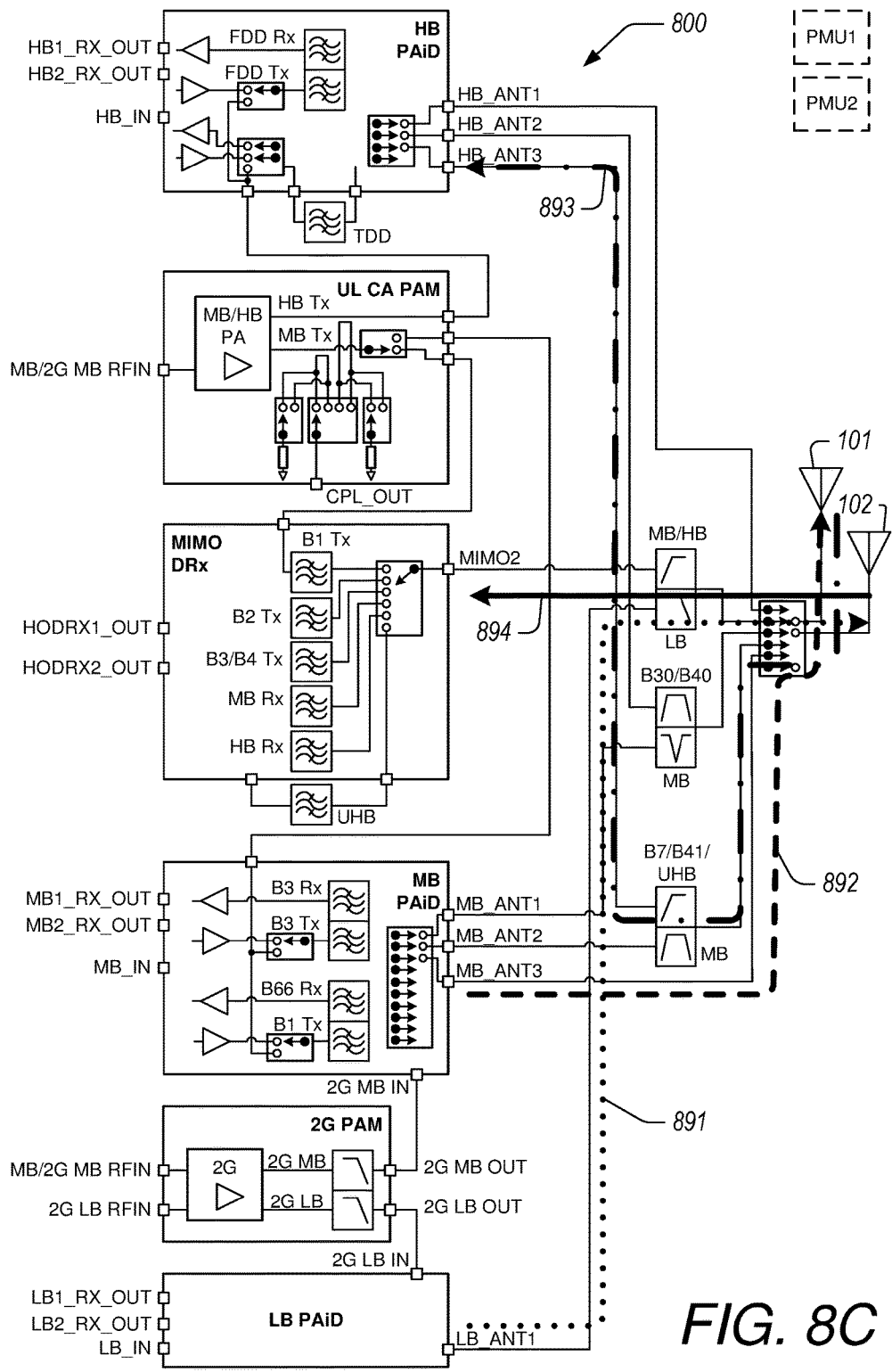

FIG. 8C illustrates a configuration that provides LM UL CA+HB MIMO. ANT1 101 is coupled to the Primary HB PAiD 810 that provides HB RX MIMO (e.g., signal path 893), and is coupled to the Primary MB PAiD 840 that provides MB TX, MB RX (e.g., signal path 892). ANT2 102 is coupled to the MB/HB MIMO DRx 830 that provides HB RX MIMO (e.g., signal path 894), and is coupled to the Primary LB Module 850 that provides LB TX, LB RX (e.g., signal path 891).

Figure 8D:
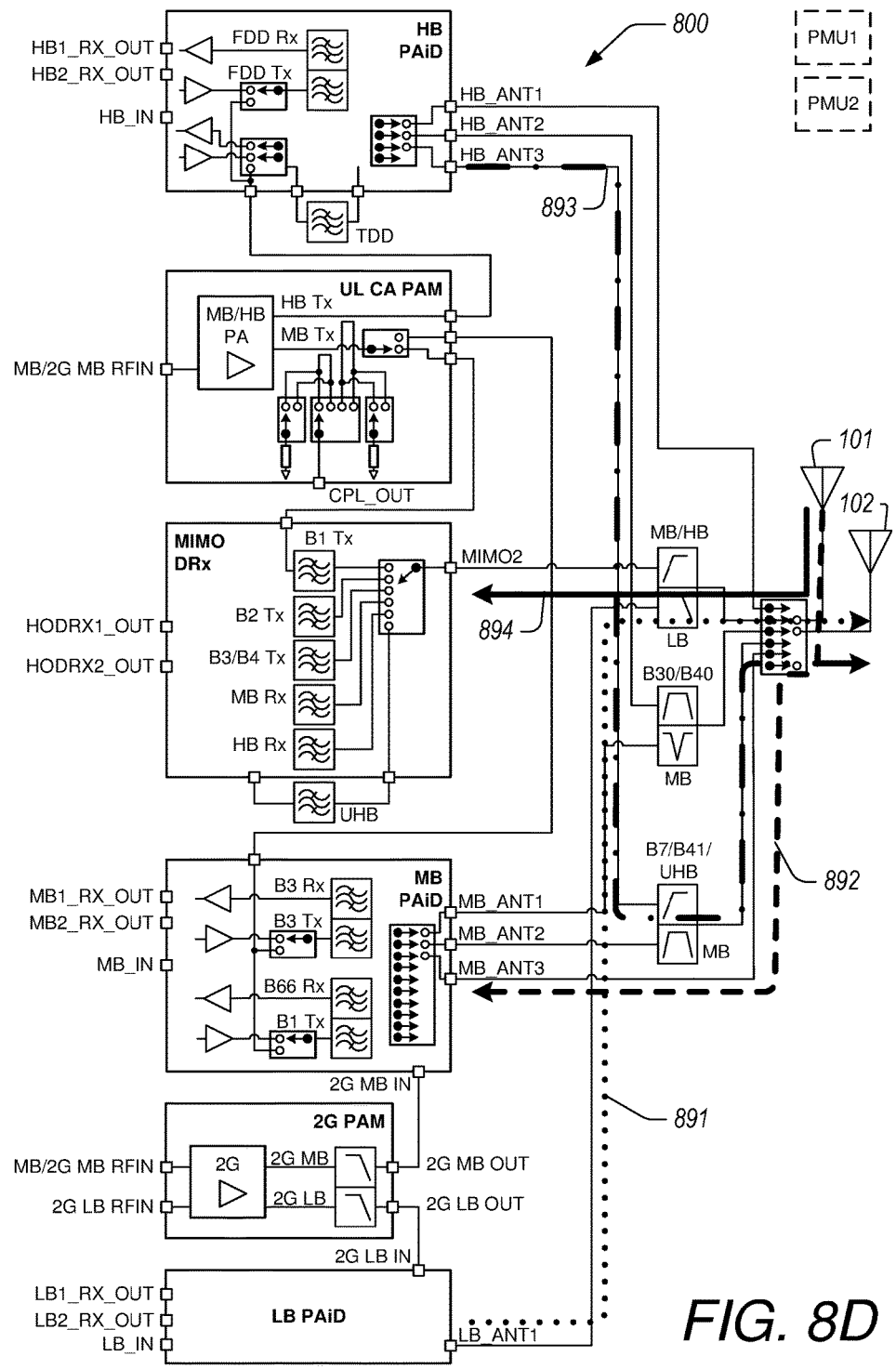

FIG. 8D illustrates a configuration that provides LH UL CA+MB MIMO. ANT1 101 is coupled to the MB/HB MIMO DRx 830 that provides MB RX MIMO (e.g., signal path 894), and is coupled to the Primary PAiD 810 that provides HB TX, HB RX (e.g., signal path 893). ANT2 102 is coupled to the MB Primary PAiD 840 that provides MB RX (e.g., signal path 892), and is coupled to the Primary LB Module 850 that provides LB TX, LB RX (e.g., signal path 891).

Figure 8E:
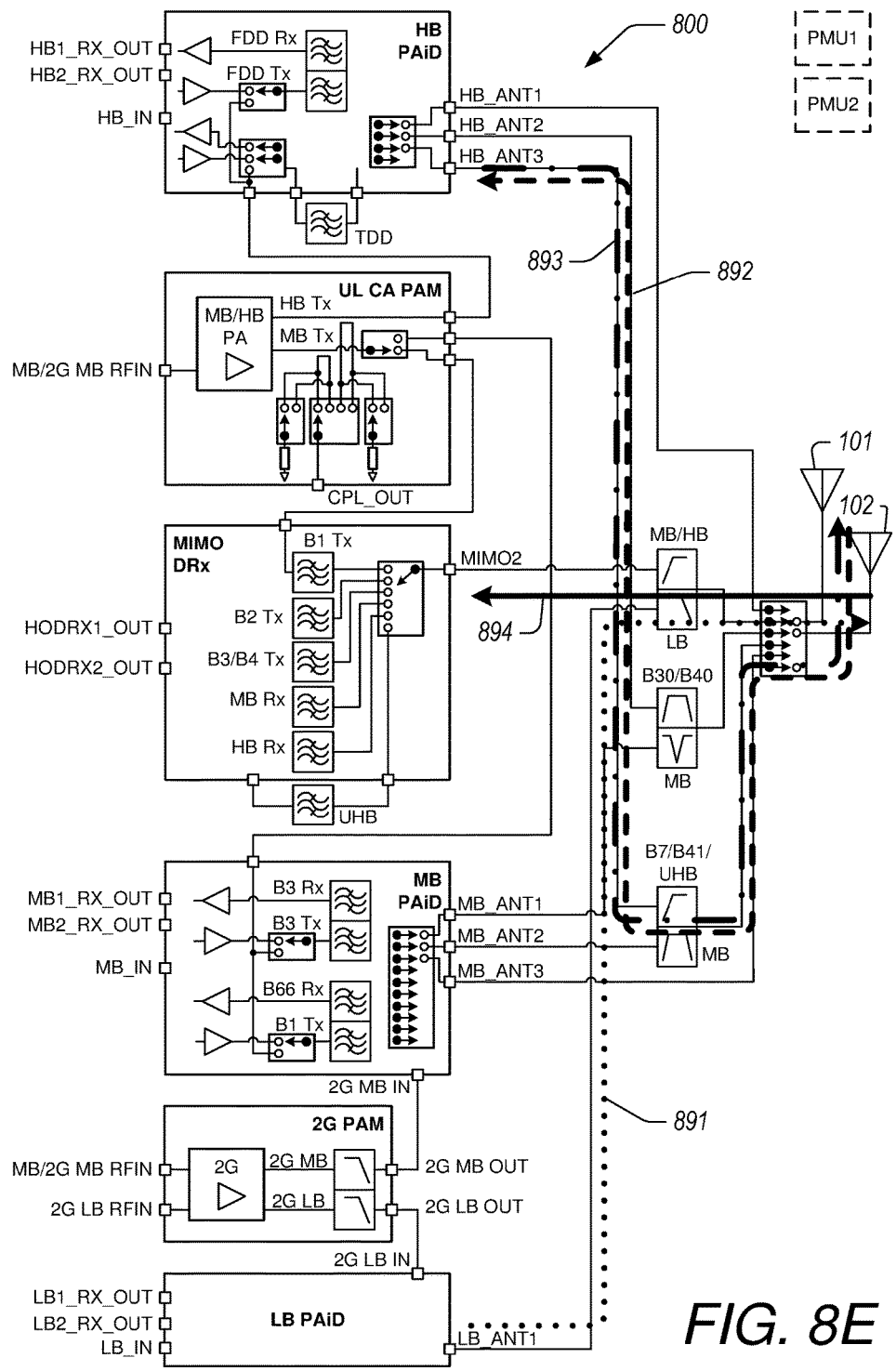

FIG. 8E illustrates a configuration that provides LH UL CA+HB MIMO. ANT1 101 is coupled to the Primary HB PAiD 810 that provides HB MIMO RX (e.g., signal path 893), and the Primary HB PAiD 810 also provides HB TX (e.g., signal path 892). ANT2 102 is coupled to the MB/HB MIMO DRx 830 that provides HB MIMO RX (e.g., signal path 894), and is coupled to the Primary LB Module 850 that provides LB TX, LB RX (e.g., signal path 891).

Figure 8F:
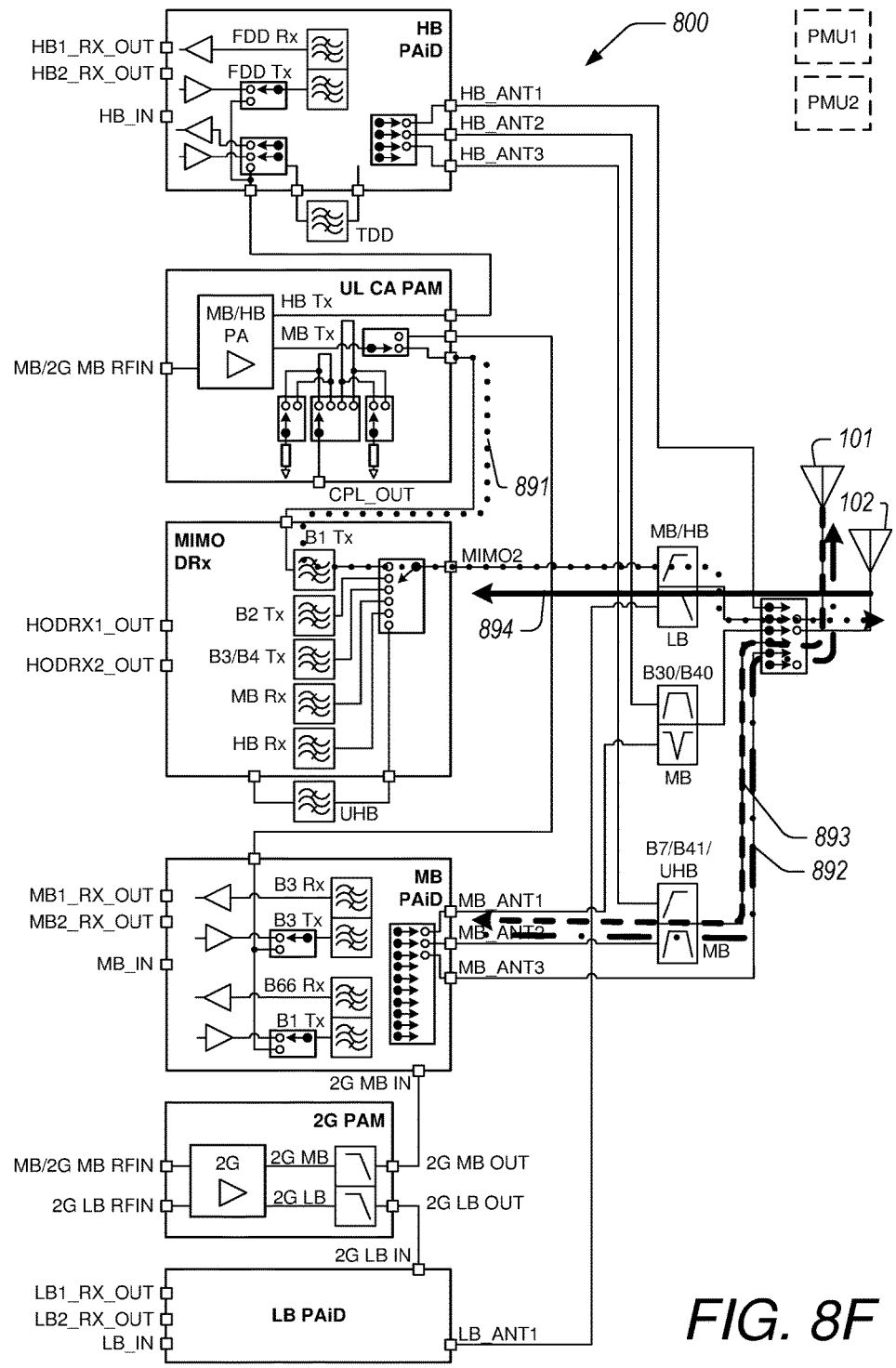

FIG. 8F illustrates a configuration that provides MM UL CA+MB MIMO. ANT1 101 is coupled to the Primary MB PAiD 840 that provides MB TX1 (e.g., signal path 892), MB RX1, MB RX2 (e.g., signal path 893). ANT2 102 is coupled to the MB/HB MIMO DRx 830 MB MIMO RX1 and RX2 (e.g., signal path 894), and is coupled to the UL CA Module 820 that provides MB TX2 (e.g., signal path 891). MB-MB switchplexing is used in the MIMO DRx module 830, and MB-MB switchplexing is used in the Primary MB PAiD 840.

Figure 8G:
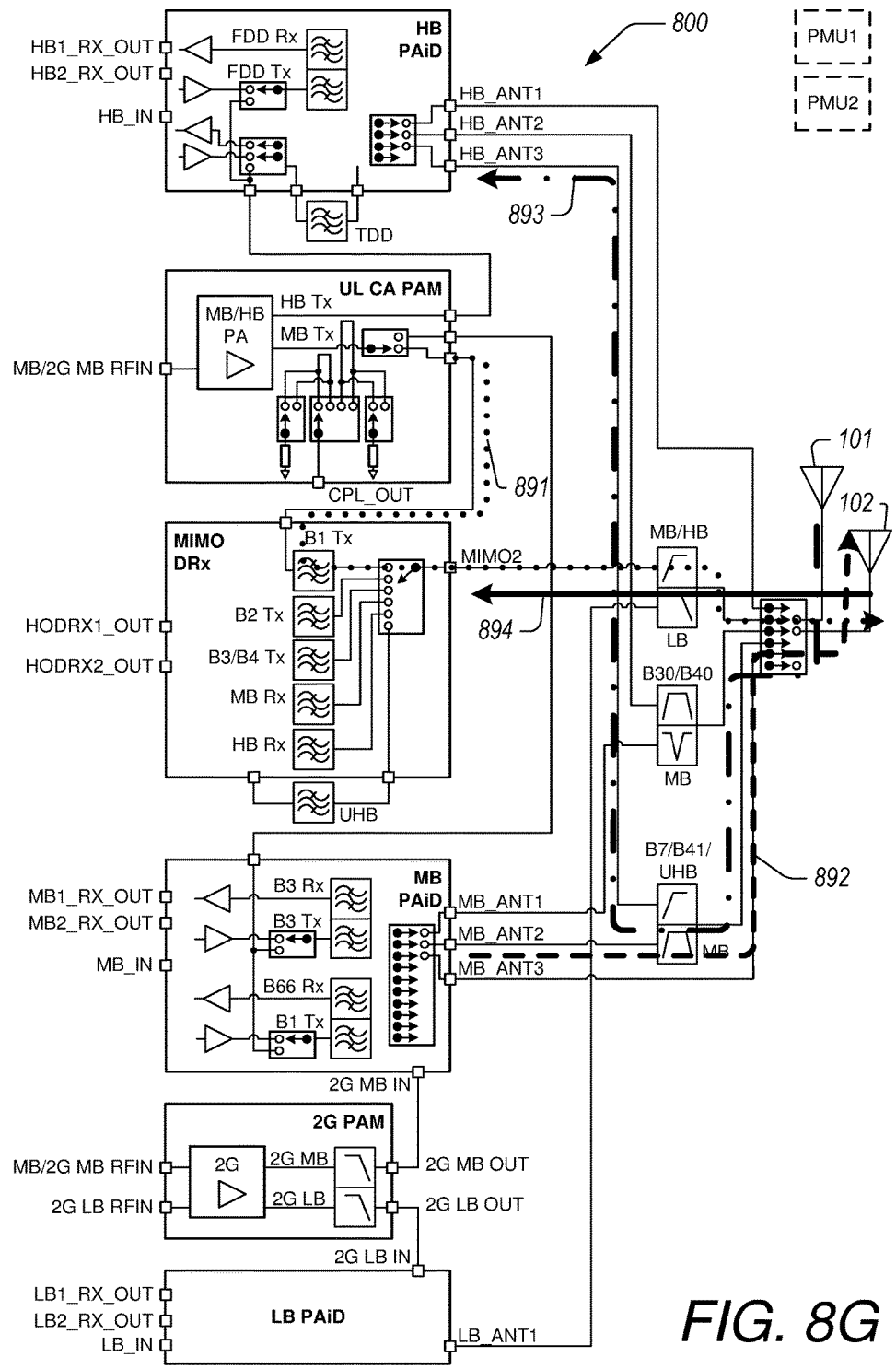

FIG. 8G illustrates a configuration that provides MM UL CA+HB MIMO. ANT1 101 is coupled to the Primary MB PAiD 840 that provides HB MIMO RX (e.g., signal path 892), and is coupled to the Primary HB PAiD 810 that provides MB TX1, MB RX1 and RX2 (e.g., signal path 893). ANT2 102 is coupled to the MB/HB MIMO DRx 830 that provides HB MIMO RX (e.g., signal path 894), and is coupled to the UL CA Module 820 that provides MB TX2 (e.g., signal path 891). MB-HB switchplexing is used in the MIMO DRx module 830, and MB-MB switchplexing is used in the Primary MB PAiD 840.

Figure 8H:
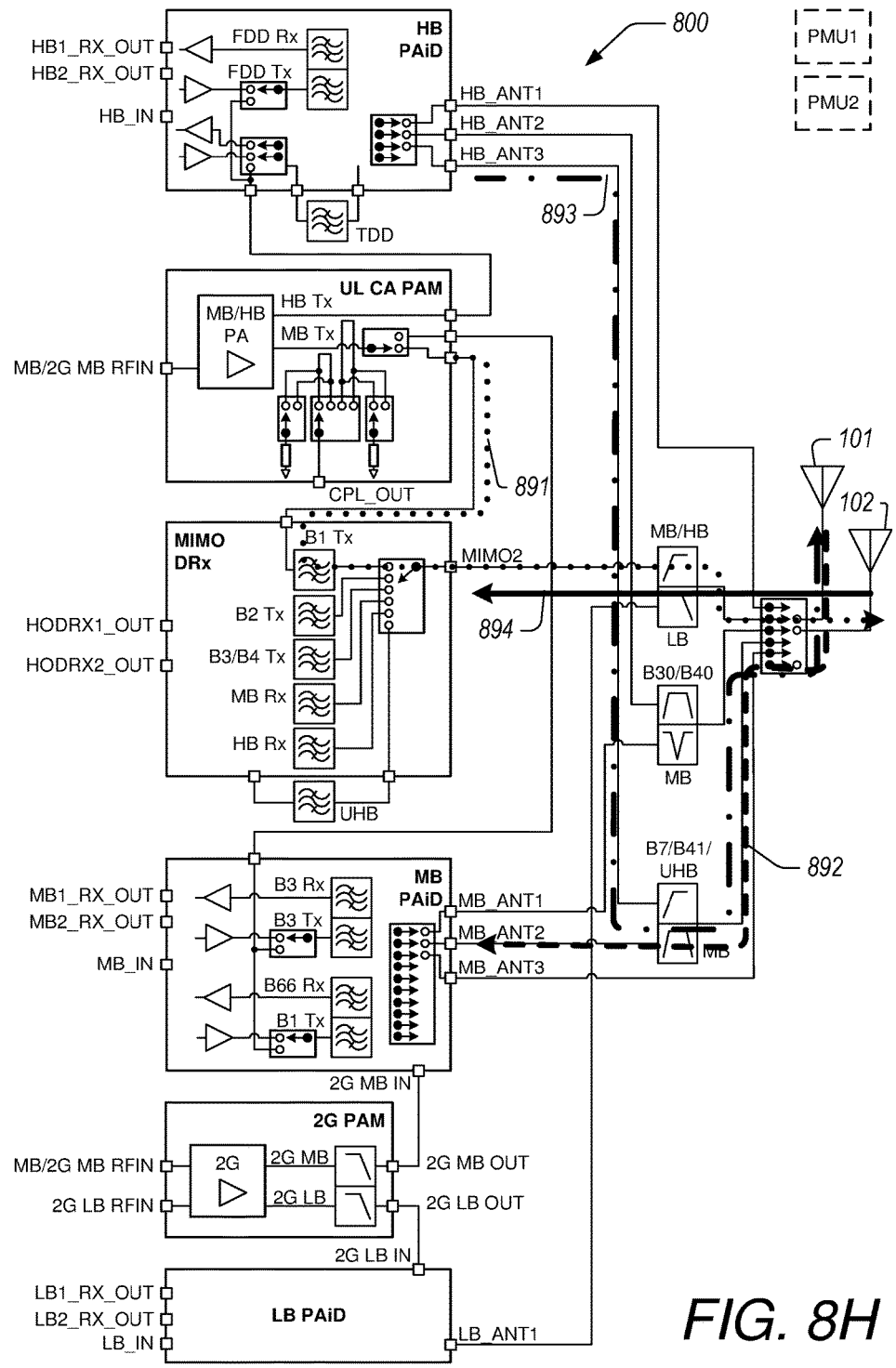

FIG. 8H illustrates a configuration that provides MH UL CA+MB MIMO. ANT1 101 is coupled to the Primary MB PAiD 840 that provides MB RX (e.g., signal path 892), and is coupled to the Primary HB PAiD 810 that provides HB TX1, HB RX (e.g., signal path 893). ANT2 102 is coupled to the MB/HB MIMO DRx 830 that provides MB MIMO RX (e.g., signal path 894), and is coupled to the UL CA Module 820 that provides MB TX2 (e.g., signal path 891).

Figure 8I:
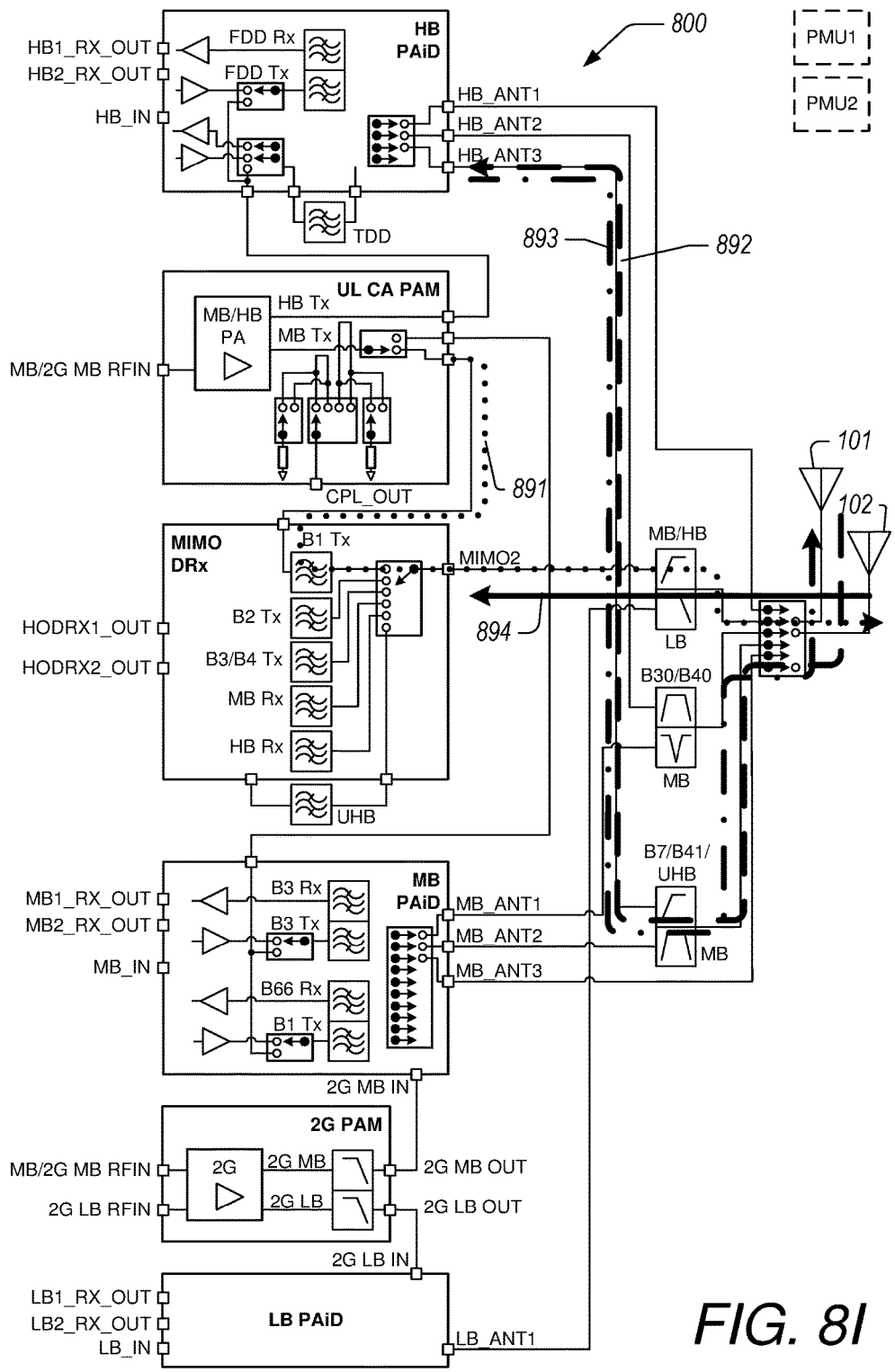

FIG. 8I illustrates a configuration that provides MH UL CA+HB MIMO. ANT1 101 is coupled to the Primary HB PAiD 810 that provides HB TX (e.g., signal path 893), HB RX (e.g., signal path 892). ANT2 102 is coupled to the MB/HB MIMO DRx 830 that provides HB MIMO RX and MB RX (e.g., signal path 894), and is coupled to the UL CA Module 820 that provides MB TX (e.g., signal path 891). MB-HB switchplexing is used in the MIMO DRx module 830.

Example 4 of a Front-End Architecture

Figure 9A:
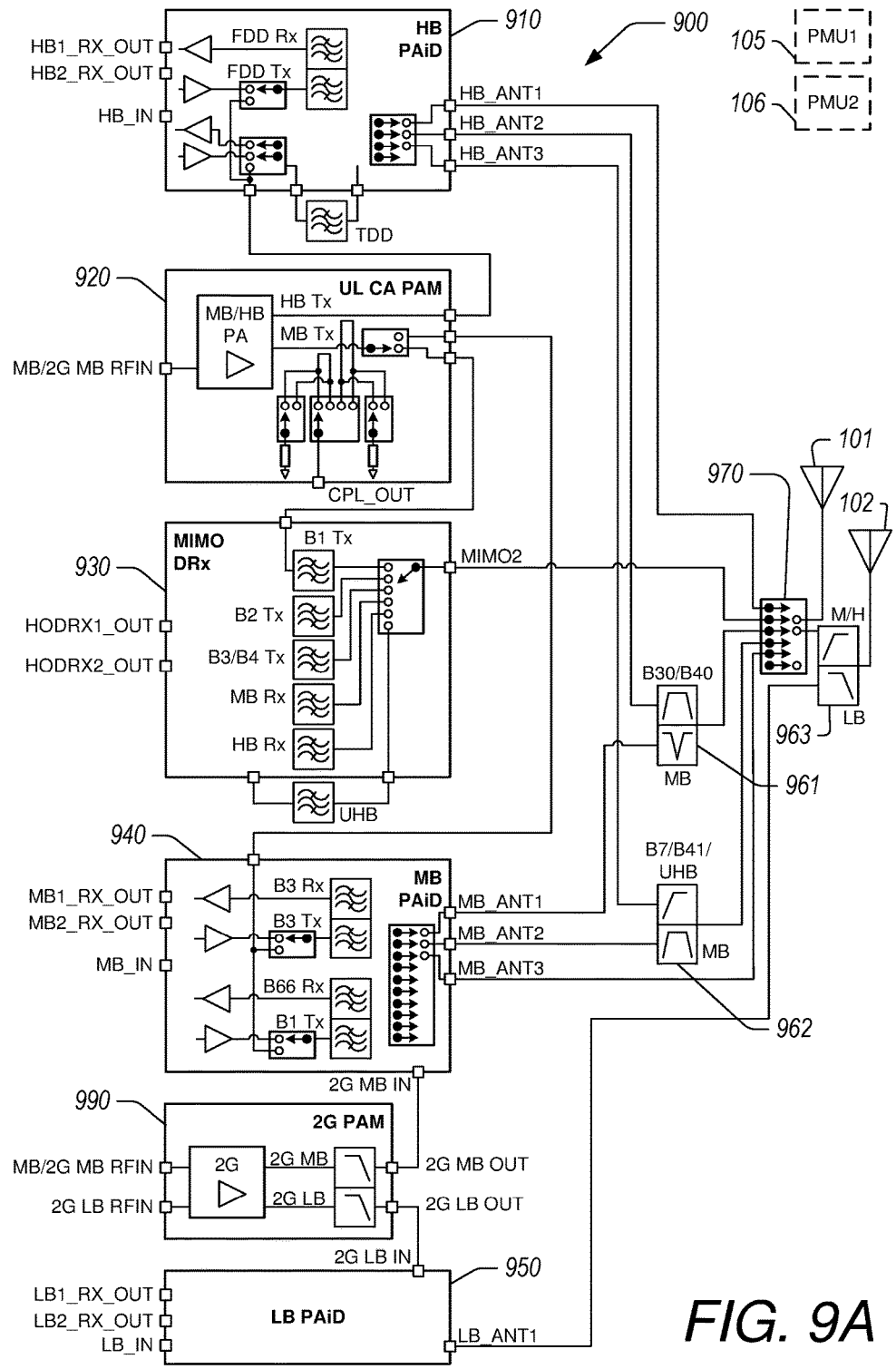
FIG. 9A illustrates another variation of a front-end architecture wherein there is MB/HB switch combining in a MIMO DRx module and where a LB diplexer is positioned after an antenna switch module.

FIG. 9A illustrates another variation of a front-end architecture 900, similar to the front-end architecture 800, wherein there is MB/HB switch combining in a MIMO DRx module and where a LB diplexer is positioned after an antenna switch module. FIGS. 9B-9I illustrate various operational modes of the front-end architecture 900 of FIG. 9A.

Figure 9B:
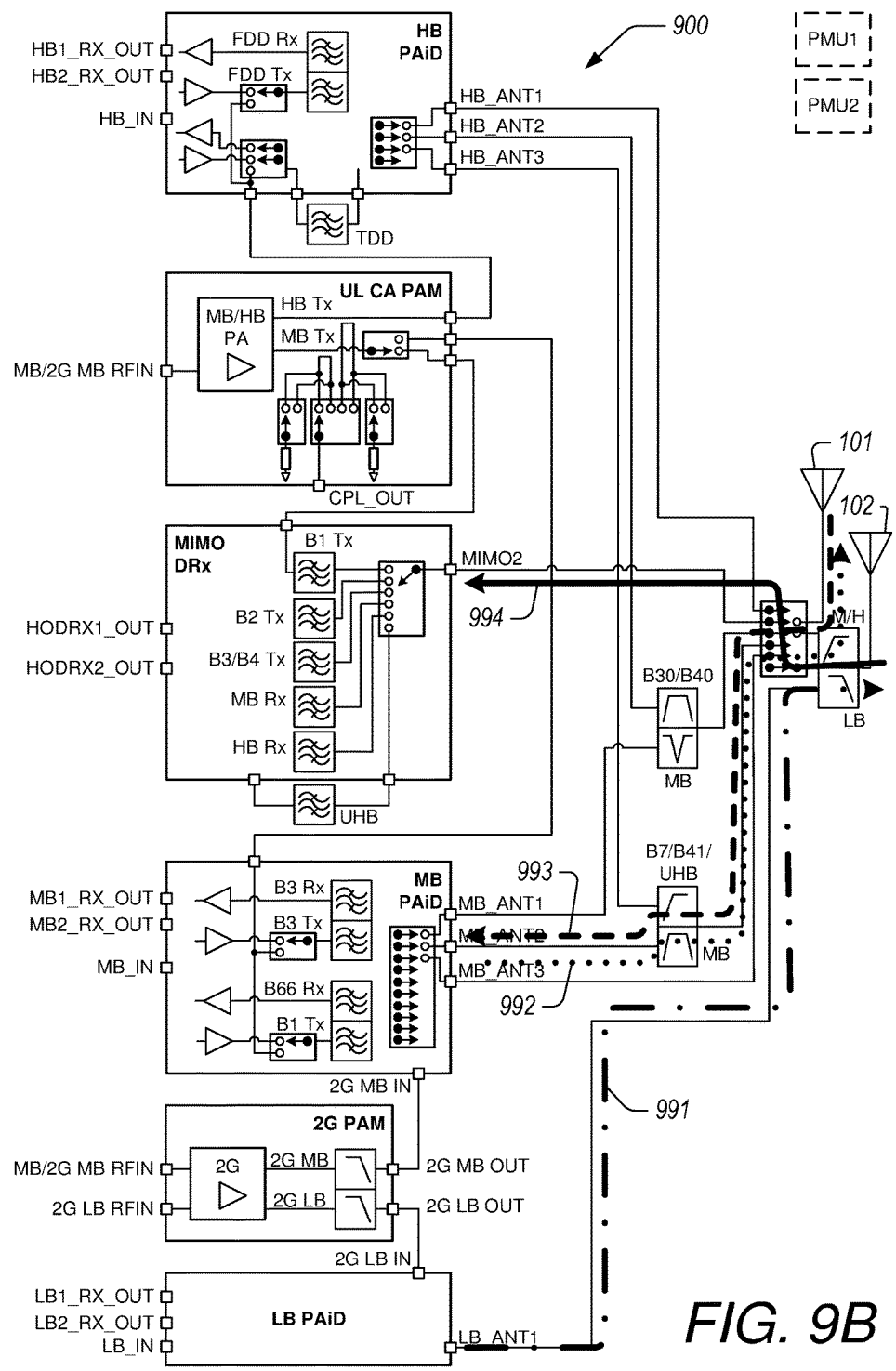
FIGS. 9B, 9C, 9D, 9E, 9F, 9G, 9H, and 9I illustrate various operational modes of the front-end architecture of FIG. 9A.
Figure 9C:
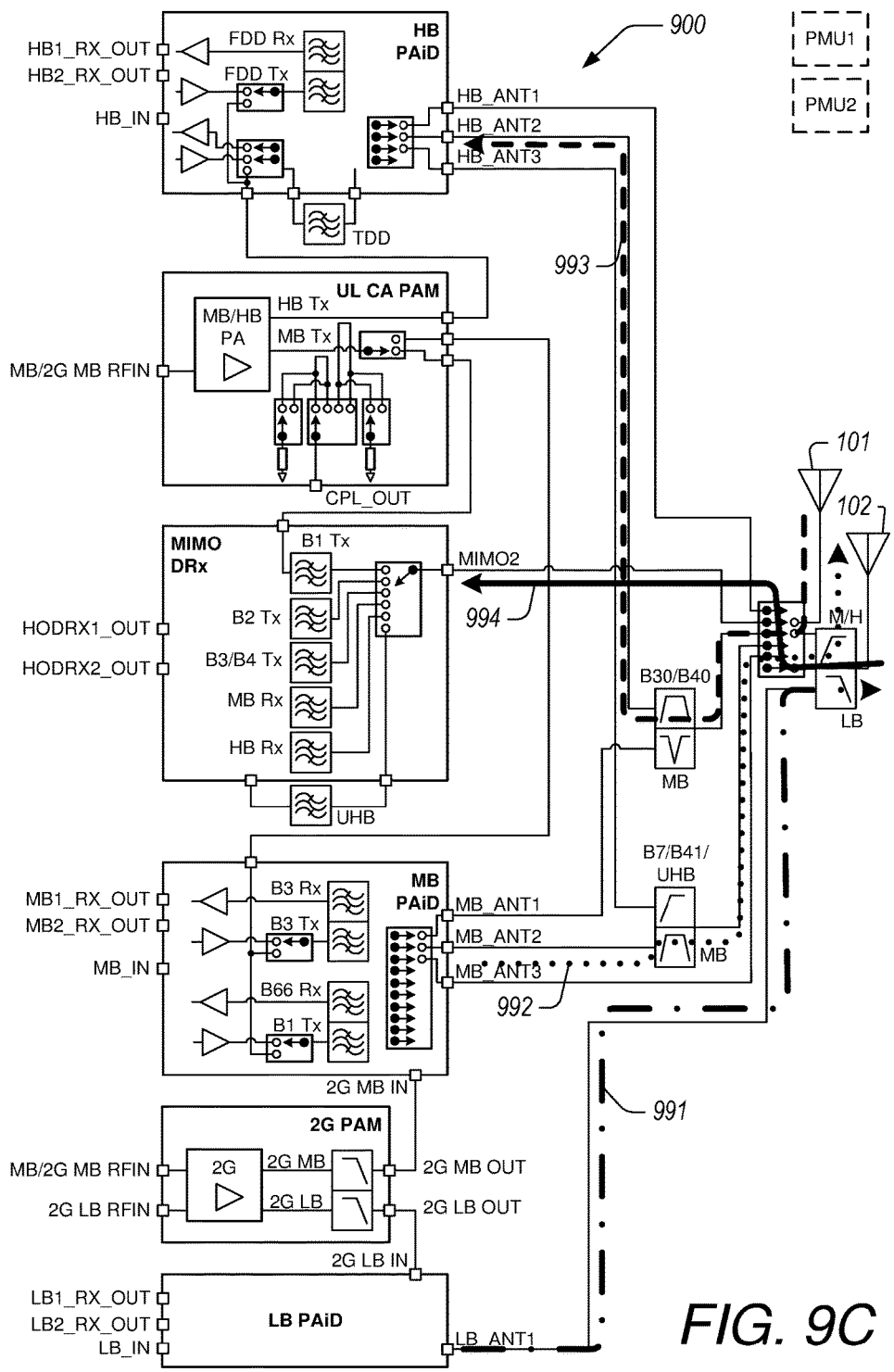
Figure 9D:
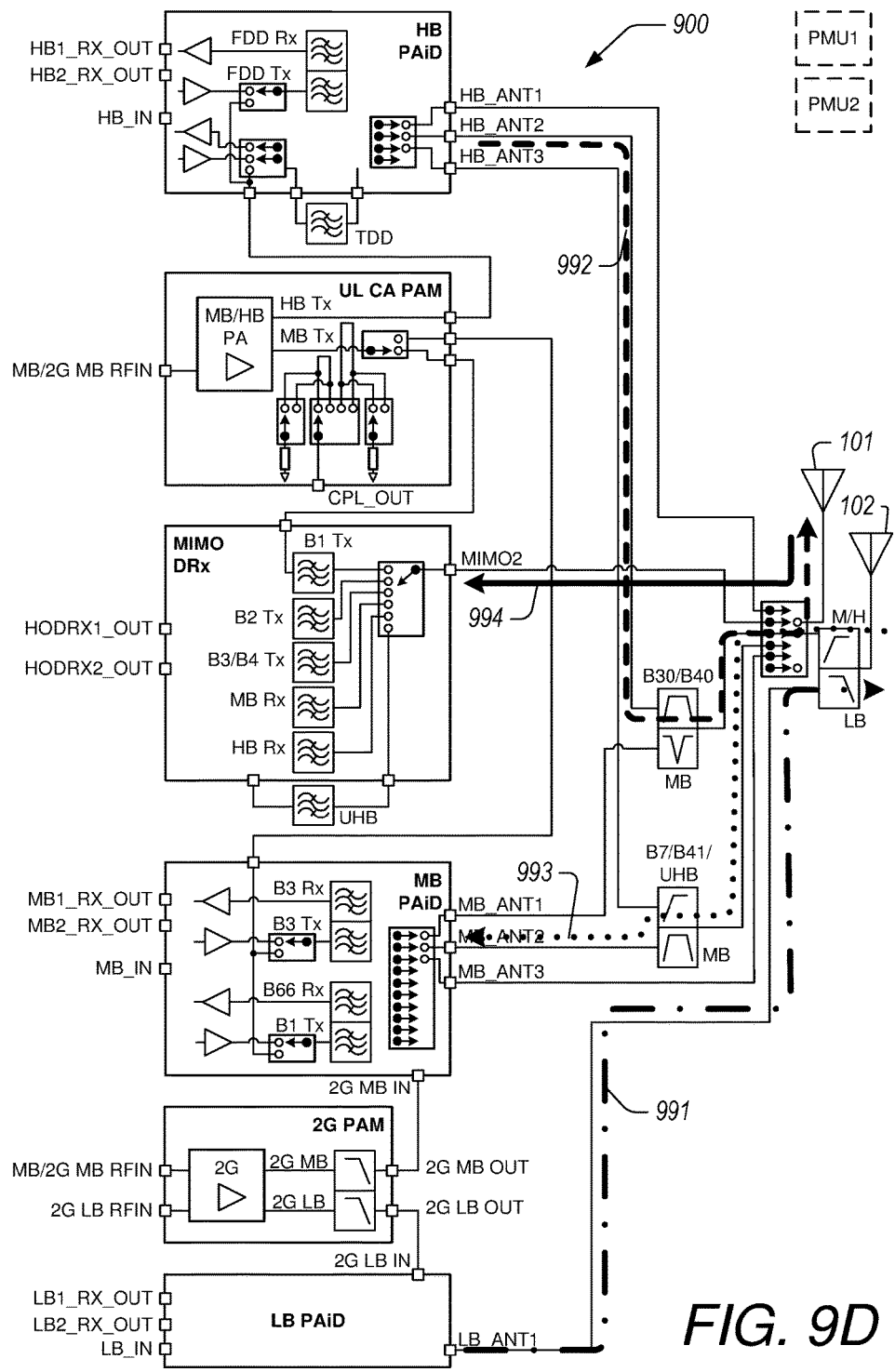
Figure 9E:
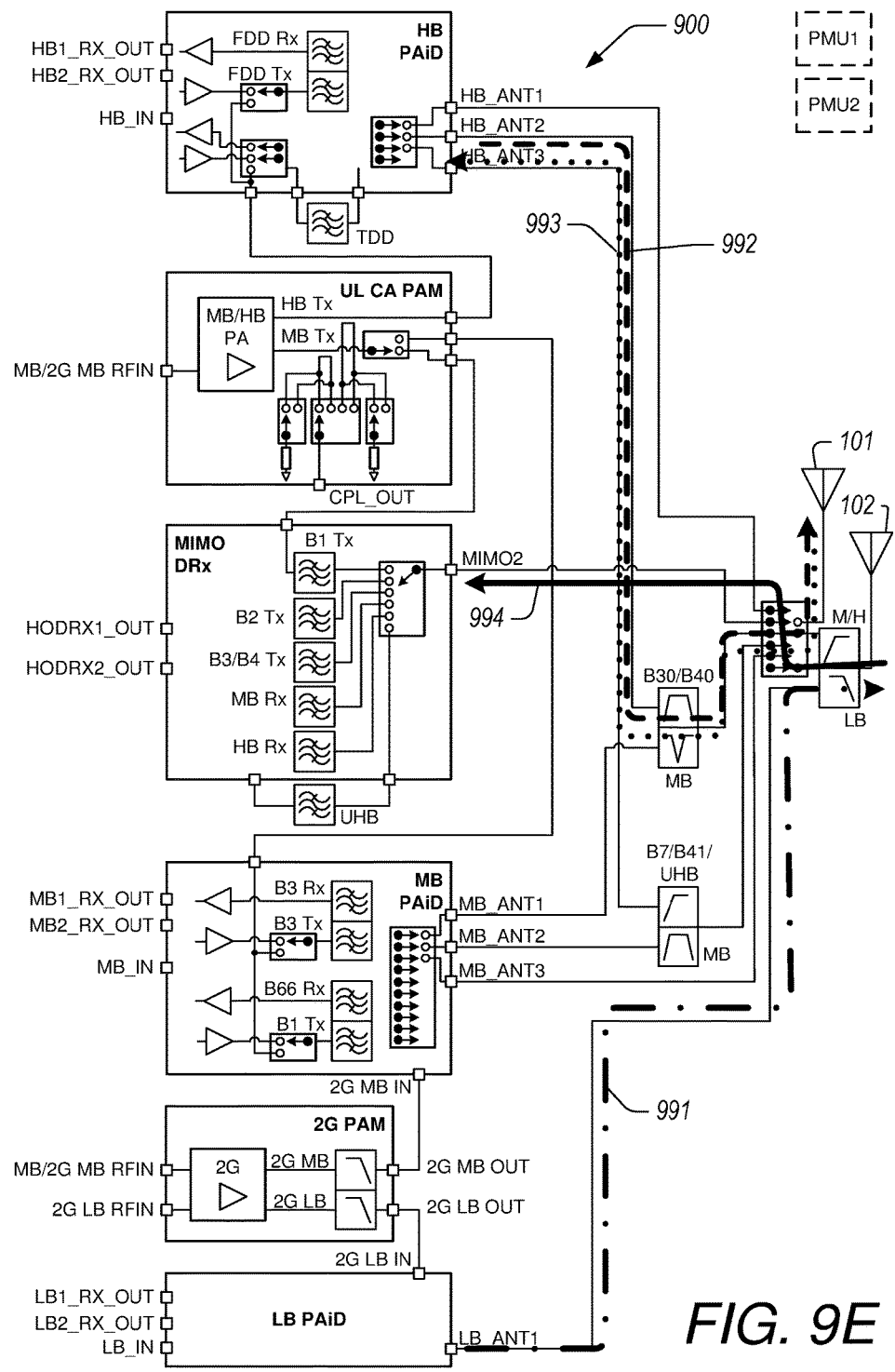
Figure 9F:
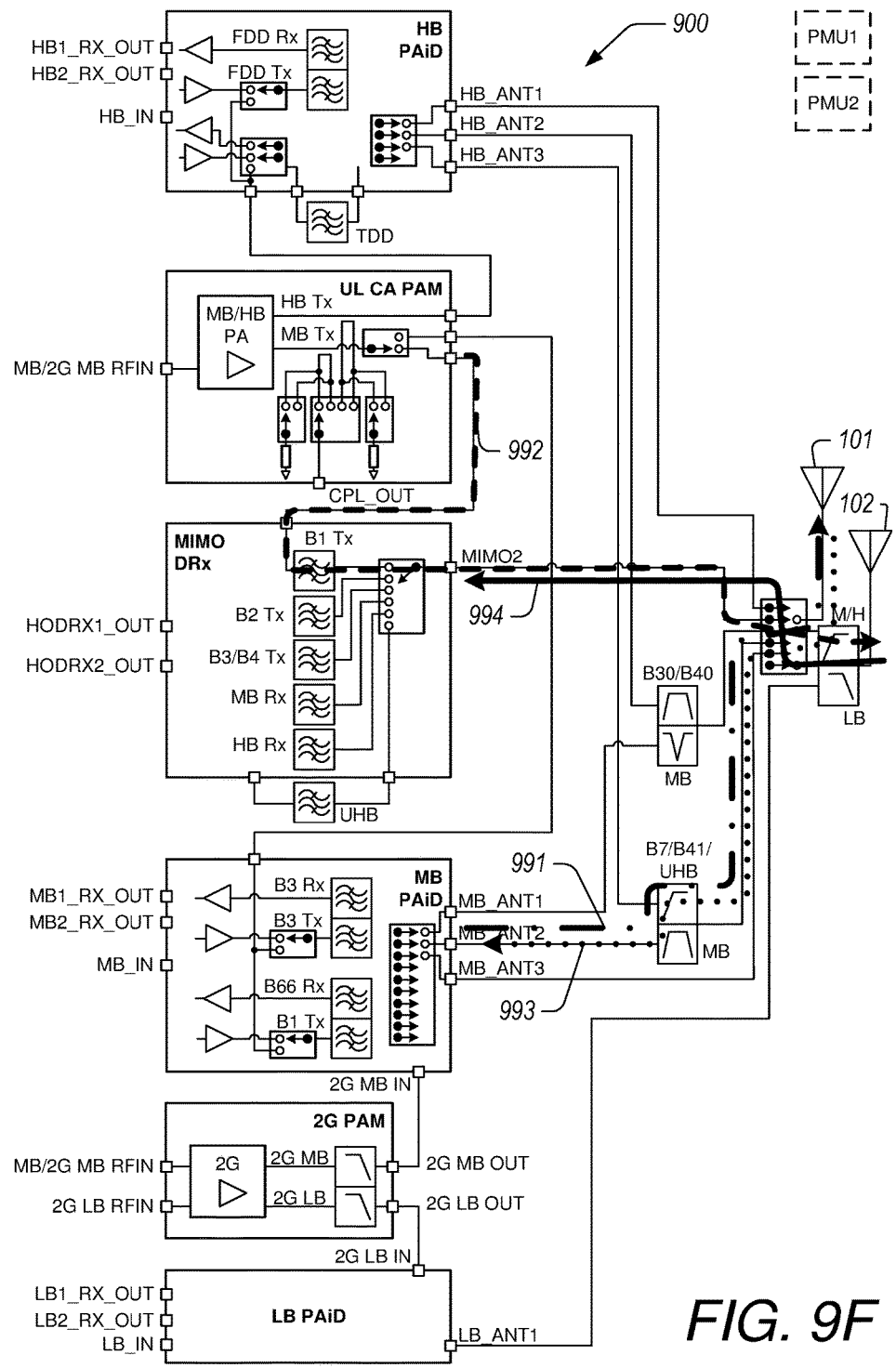
Figure 9G:
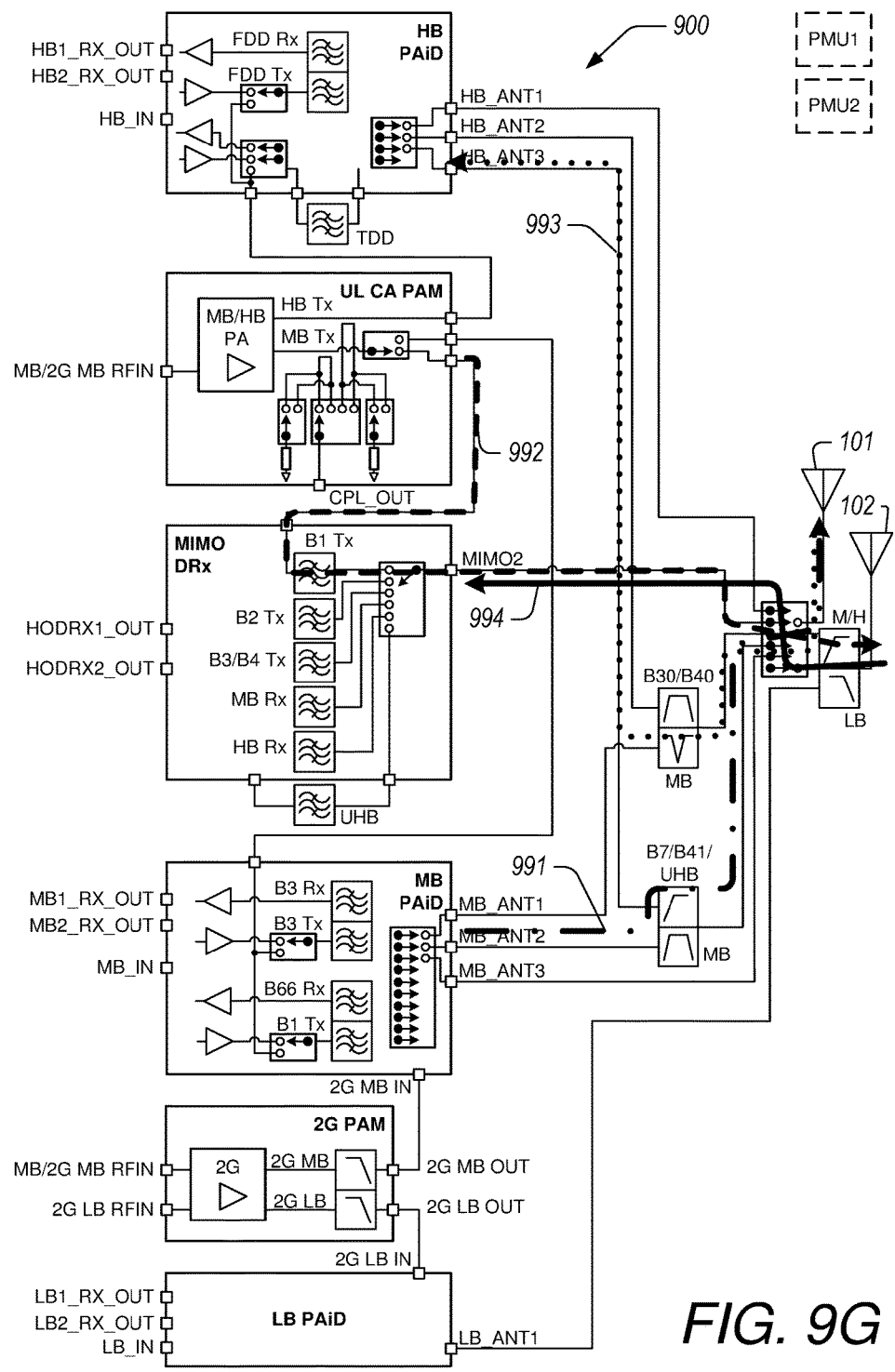
Figure 9H:
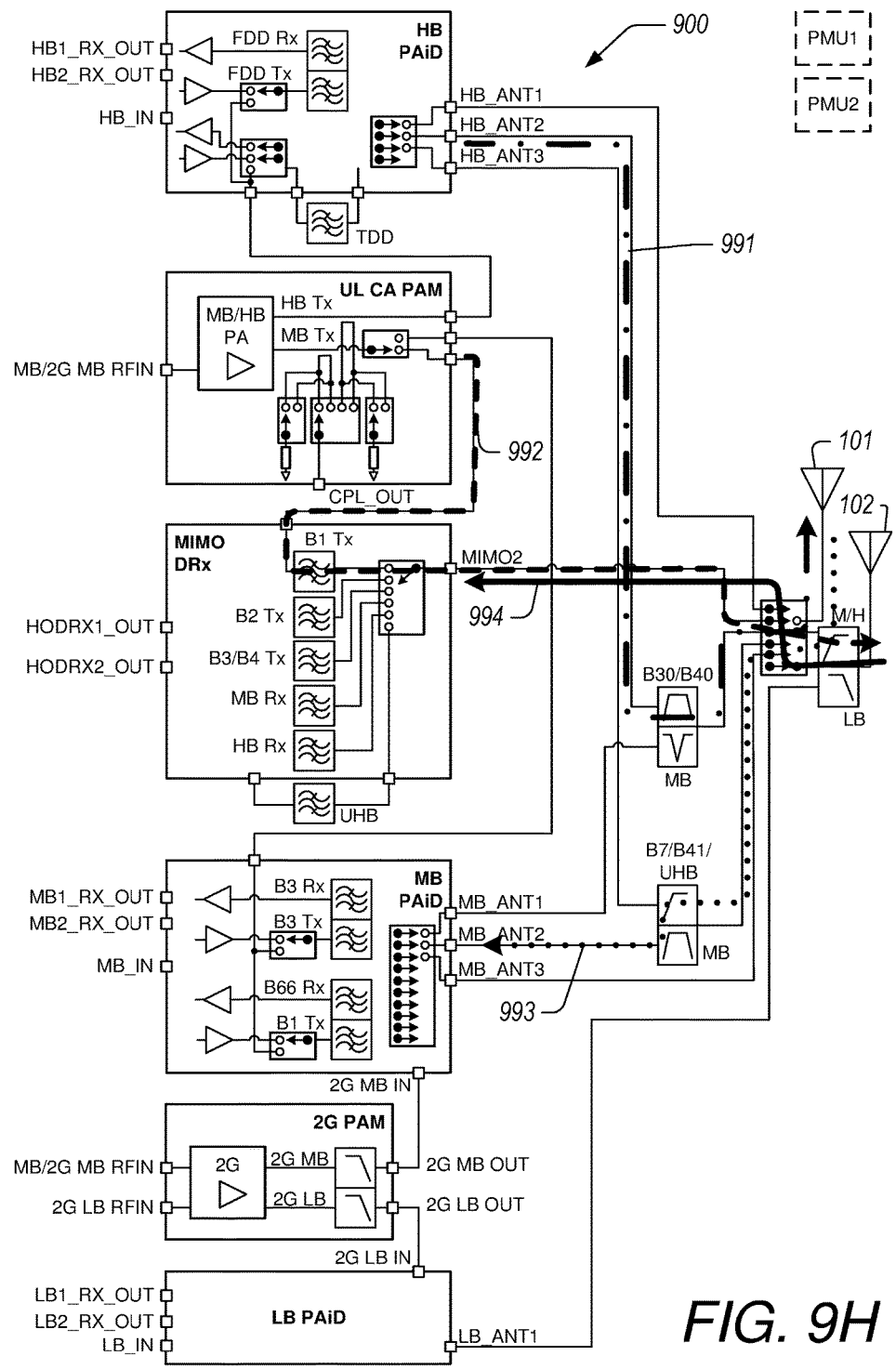
Figure 9I:
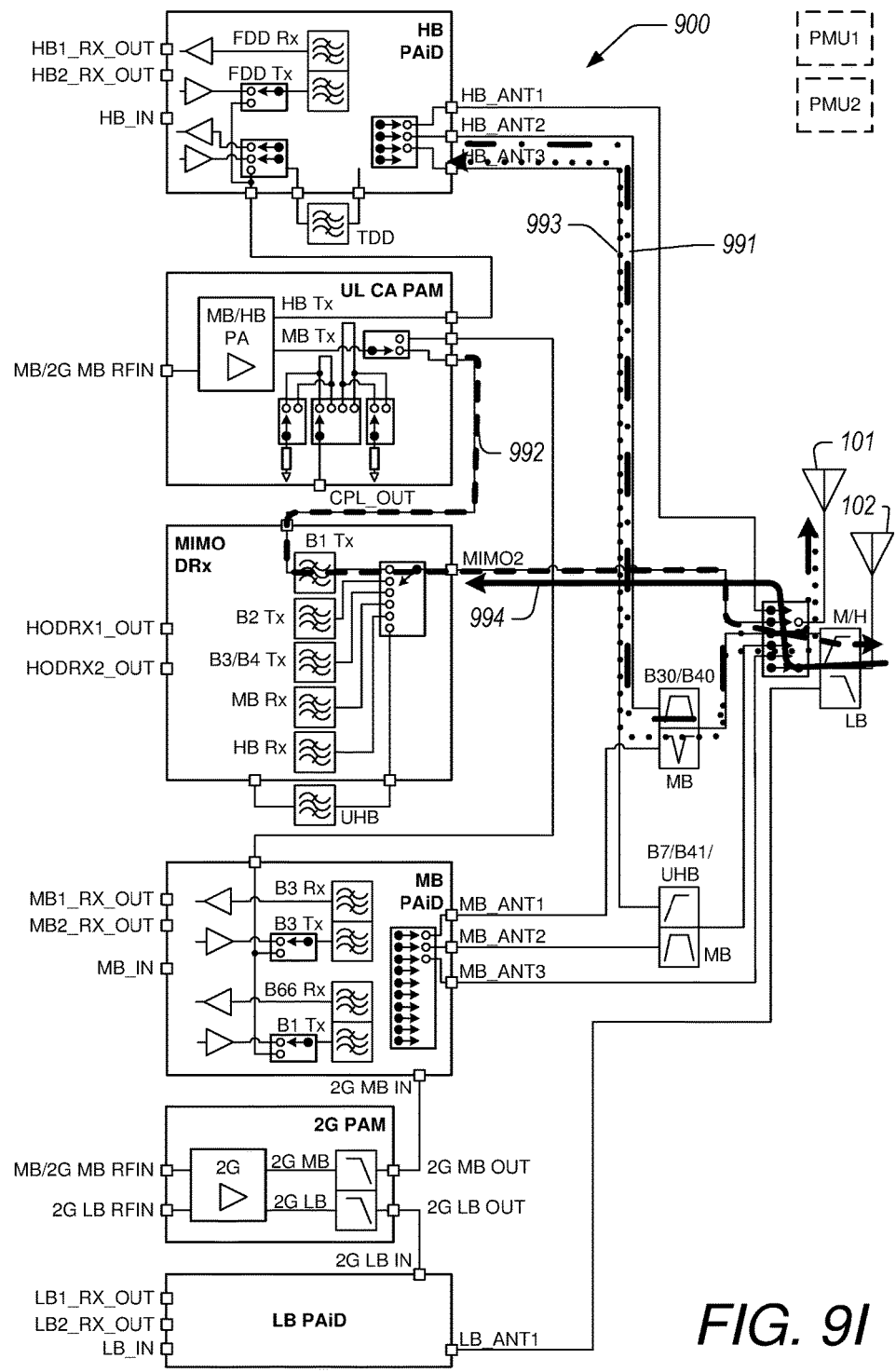

FIG. 9B illustrates a configuration that provides LM UL CA+MB MIMO where signal paths 992 and 993 represent MB TX/RX using the MB PAiD 940 and ANT1 101, signal path 991 represents LB TX/RX using the LB PAiD 950 and ANT2 102, and signal path 994 represents MB RX MIMO using the MIMO DRx 930 and ANT2 102. FIG. 9C illustrates a configuration that provides LM UL CA+HB MIMO where signal path 991 represents LB TX/RX using the LB PAiD 950 and ANT2 102, signal path 992 represents MB TX/RX using the MB PAiD 940 and ANT1 101, signal path 993 represents HB RX MIMO using the HB PAiD 910, and signal path 994 represents HB RX MIMO using the MIMO DRx 930 and ANT2 102. FIG. 9D illustrates a configuration that provides LH UL CA+MB MIMO where signal path 991 represents LB TX/RX using the LB PAiD 950 and ANT2 102, signal path 992 represents HB TX/RX using the HB PAiD 910 and ANT1 101, signal path 993 represents MB RX using the MB PAiD 940 and ANT2 102, and signal path 994 represents MB RX MIMO using the MIMO DRx 930 and ANT1 101. FIG. 9E illustrates a configuration that provides LH UL CA+HB MIMO where signal path 991 represents LB TX/RX using the LB PAiD 950 and ANT2 102, signal path 992 represents HB TX using the HB PAiD 910 and ANT1 101, signal path 993 represents HB MIMO RX using the HB PAiD 910 and ANT1 101, and signal path 994 represents HB MIMO RX using the MIMO DRx 930 and ANT2 102. FIG. 9F illustrates a configuration that provides MM UL CA+MB MIMO where signal path 991 represents MB TX1/RX1 using the MB PAiD 940 and ANT1 101, signal path 992 represents MB TX2 using the ULCA PAM 920 and ANT2 102, signal path 993 represents MB RX2 using the MB PAiD 940 and ANT1 101, and signal path 994 represents MB MIMO RX1 & RX2 using the MIMO Rx 930 and ANT2 102 (where MB-MB switchplexing is used in the MB PAiD 940 and MB-MB switchplexing is used in the MIMO DRx 930). FIG. 9G illustrates a configuration that provides MM UL CA+HB MIMO where signal path 991 represents MB TX1/RX1/RX2 using the MB PAiD 940 and ANT1 101, signal path 992 represents MB TX2 using the ULCA PAM 920 and ANT2 102, signal path 993 represents HB MIMO RX using the HB PAiD 910 and ANT1 101, and signal path 994 represents HB MIMO RX using the MIMO DRx 930 and ANT2 102 (where MB-MB switchplexing is used in the MB PAiD 940 and MB-HB switchplexing is used in the MIMO DRx 930). FIG. 9H illustrates a configuration that provides MH UL CA+MB MIMO where signal path 991 represents HB TX1/RX using the HB PAiD 910 and ANT1 101, signal path 992 represents MB TX using the ULCA PAM 920 and ANT2 102, signal path 993 represents MB MIMO RX using the MB PAiD 940 and ANT1 101, and signal path 994 represents MB MIMO RX using the MIMO DRx 930 and ANT2 102. FIG. 9I illustrates a configuration that provides MH UL CA+HB MIMO where signal path 991 represents HB TX1 using the HB PAiD 910 and ANT1 101, signal path 992 represents MB TX using the ULCA PAM 920 and ANT2 102, signal path 993 represents HB RX using the HB PAiD 910 and ANT1 101, and signal path 994 represents MB RX and HB MIMO RX using the MIMO DRx 930 and ANT2 102 (where MB-HB switchplexing is used in the MIMO DRx 930).

Example MIMO DRx Modules

Figure 10:
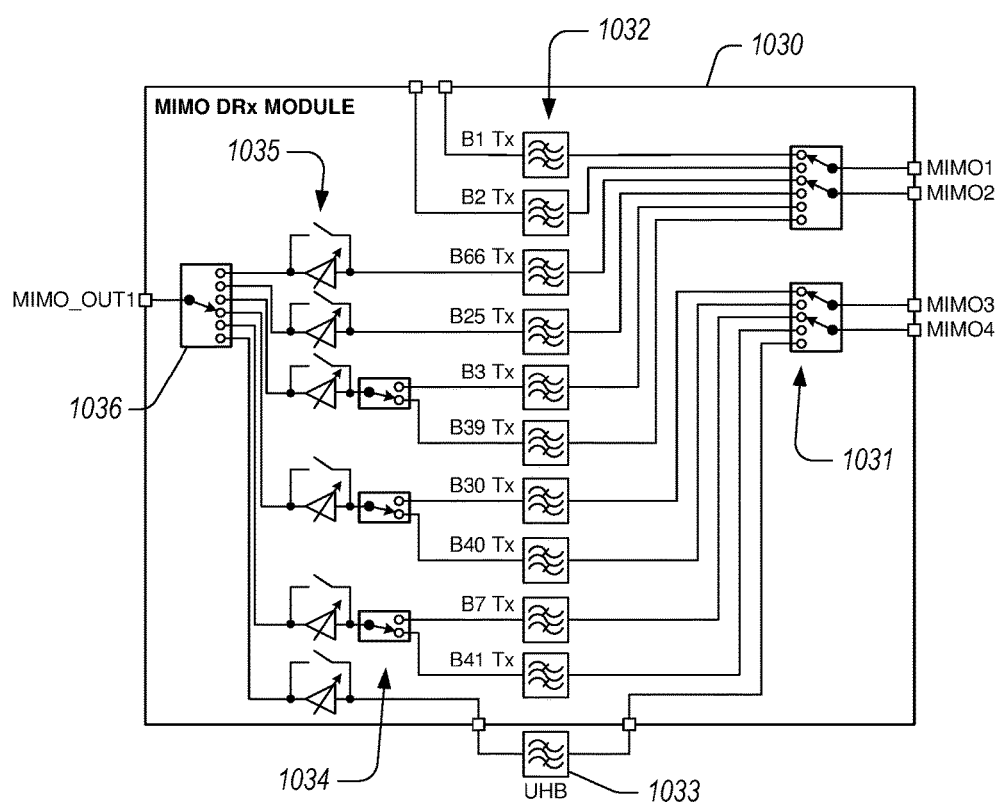
FIGS. 10, 11, and 12 illustrate example MIMO DRx modules that can be implemented in front-end architectures disclosed herein.

FIG. 10 illustrates an example MIMO DRx module 1030 that can be implemented in the front-end architectures disclosed herein with particular advantages being realized when implemented with the front-end architectures 500, 600, 700. The TX filters are used when in MM UL CA include, but are not limited to: B1-B3 ULCA+B3 MIMO–primary (B3 TX, B3 RX, B1 RX), UL CA (B1 TX, B3 RX); B1-B3 ULCA+B1 MIMO–primary (B3 TX, B3 RX, B1 RX), ULCA (B1 TX, B1 RX); B2-B4 ULCA+B4 MIMO–primary (B4 TX, B2 RX, B4 RX), ULCA (B2 TX, B4 RX); B2-B4 ULCA+B2 MIMO–primary (B4 TX, B2 RX, B4 RX), ULCA (B2 TX, B2 RX). Switch combining can be implemented in MM UL CA+M MIMO (e.g., using B1 TX and B66 RX/B3 RX; B2 TX and B2 RX/B66 RX). In some embodiments, no switch combining is used between MB and HB because duplexing is done outside of the module. The existing DRx HB filters can be re-used. A single MIMO Rx output indicates that the module provides MIMO in one band. MIMO 1 and 2 provide MB in. MIMO 3 and 4 provide HB signals. A disadvantage is that HH UL CA+B7/B41 MIMO is not supported.

Figure 11:
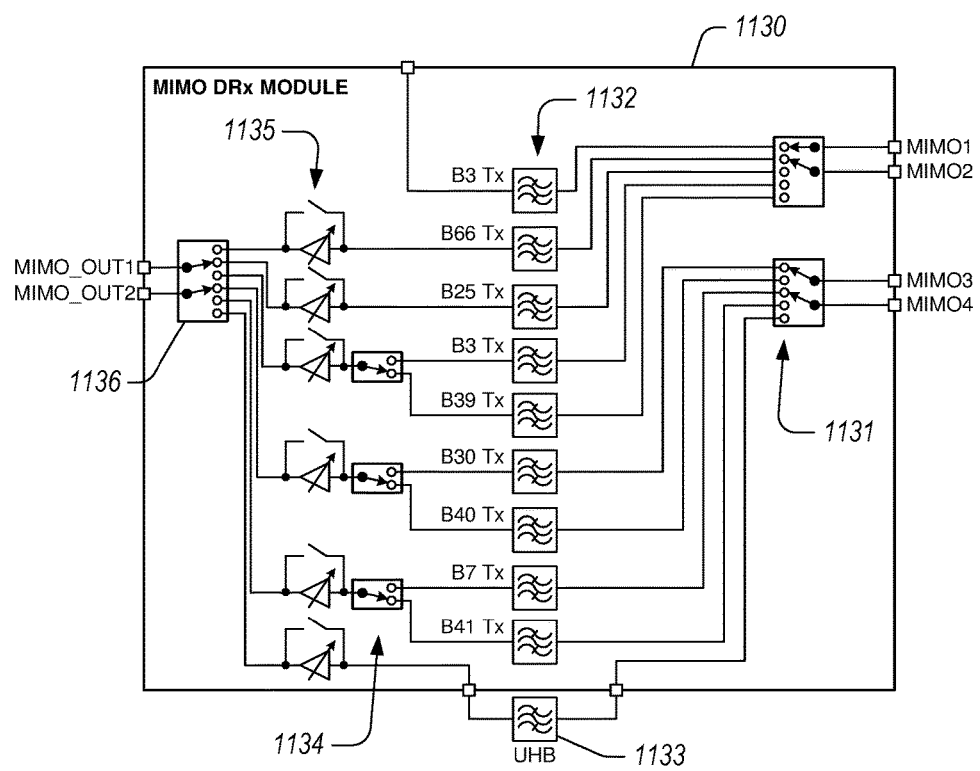

FIG. 11 illustrates an example MIMO DRx module 1130 that can be implemented in the front-end architectures disclosed herein with particular advantages being realized when implemented with the front-end architectures 500, 600, 700. The Tx filters are used when in MM UL CA include but are not limited to: B1-B3 ULCA+B3 MIMO–primary (B1 B3 RX), UL CA (B3 TX, B3 RX, B1 RX); B1-B3 ULCA+B1 MIMO–primary (B1 TX, B1 RX), ULCA (B3 TX, B3 RX, B1 RX); B2-B4 ULCA+B4 MIMO–primary (B2 TX, B4 RX), ULCA (B4 TX, B4 RX, B2 RX); B2-B4 ULCA+B2 MIMO–primary (B2 TX, B2 RX), ULCA (B4 TX, B4 RX, B2 RX). This embodiment eliminates one Tx filter. The B3 Tx filter covers both B3 and B4. The scheme can use transceiver support due to 2 Rx outputs from the MIMO module.

Figure 12:
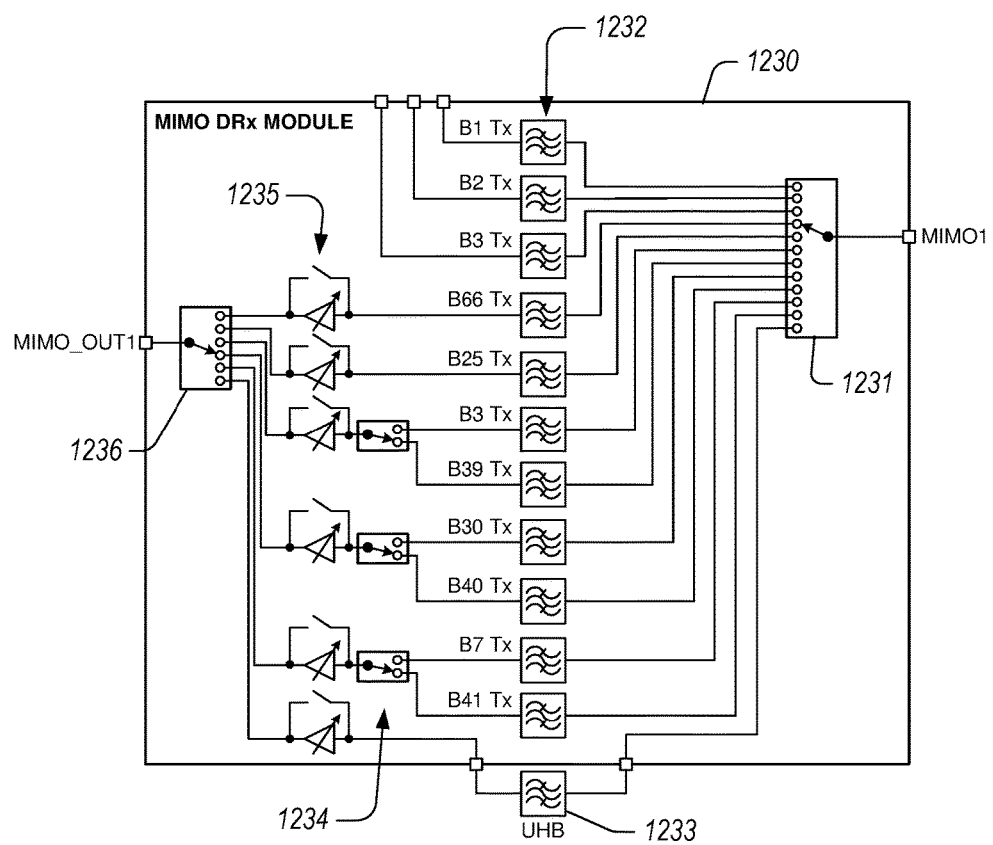

FIG. 12 illustrates an example MIMO DRx module 1230 that can be implemented in the front-end architectures disclosed herein with particular advantages being realized when implemented with the front-end architectures 800, 900. Switch combining can be utilized in MM UL CA+M MIMO: B1 TX and B66 RX/B3 RX; B2 TX and B2 RX/B66 RX. Switch combining can be utilized in MM UL CA+H MIMO: B1 TX and B7/B40/B41 RX; B2 TX and B7/B30 RX; B3 TX and B7/B40/B41 RX; B66 TX and B7/B30 RX. A single MIMO Rx output indicates that this module provides MIMO in one band.

Example 5 of a Front-End Architecture

Figure 13A:
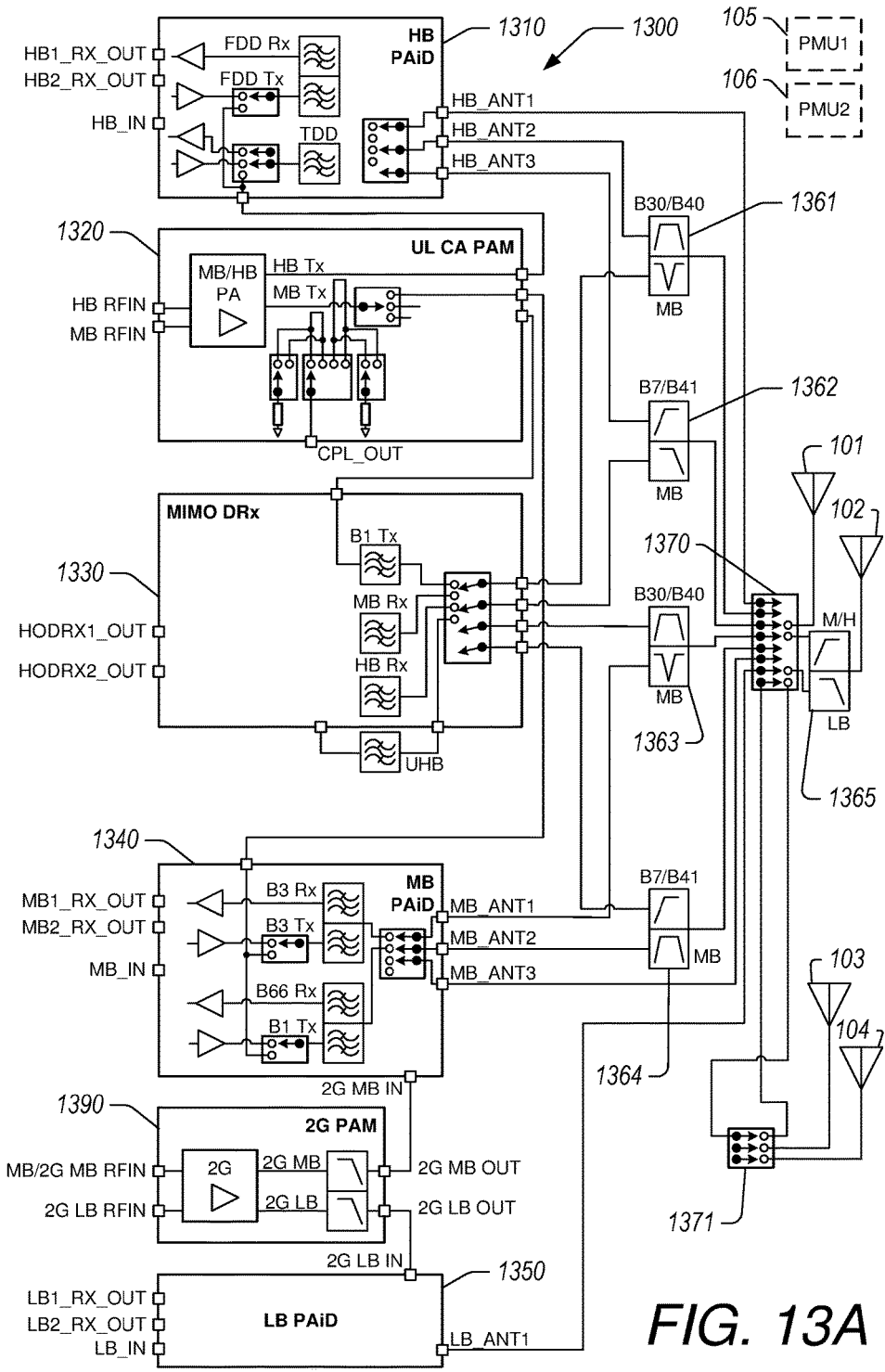
FIG. 13A illustrates another example front-end architecture that includes an antenna diversity switch providing antenna swap implementation and connectivity of a diplexer after the antenna swap switch.
Figure 13B:
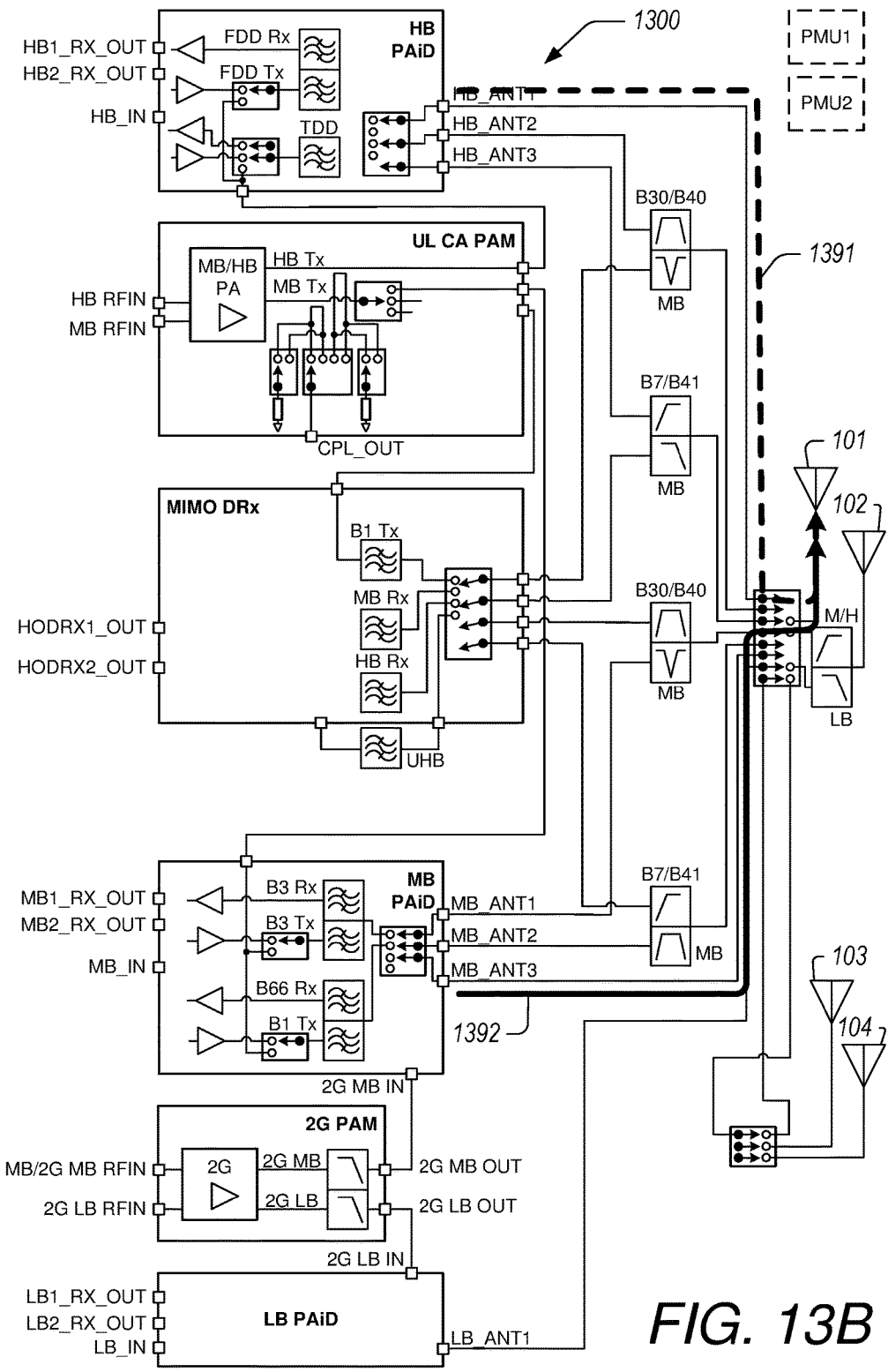
FIGS. 13B, 13C, 13D, 13E, 13F, 13G, 13H, and 13I illustrate various operational modes of the front-end architecture of FIG. 13A.
Figure 13C:
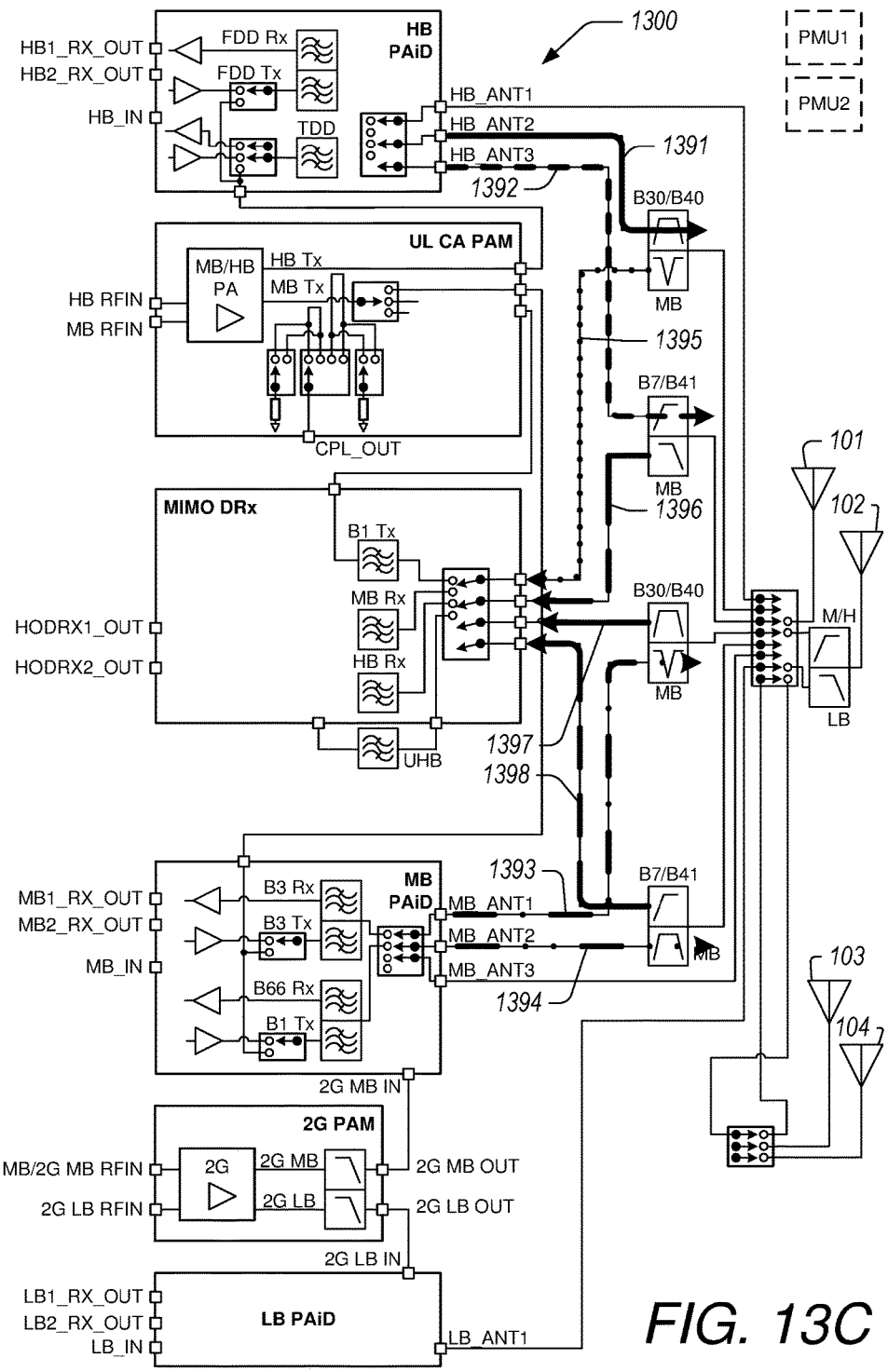
Figure 13D:
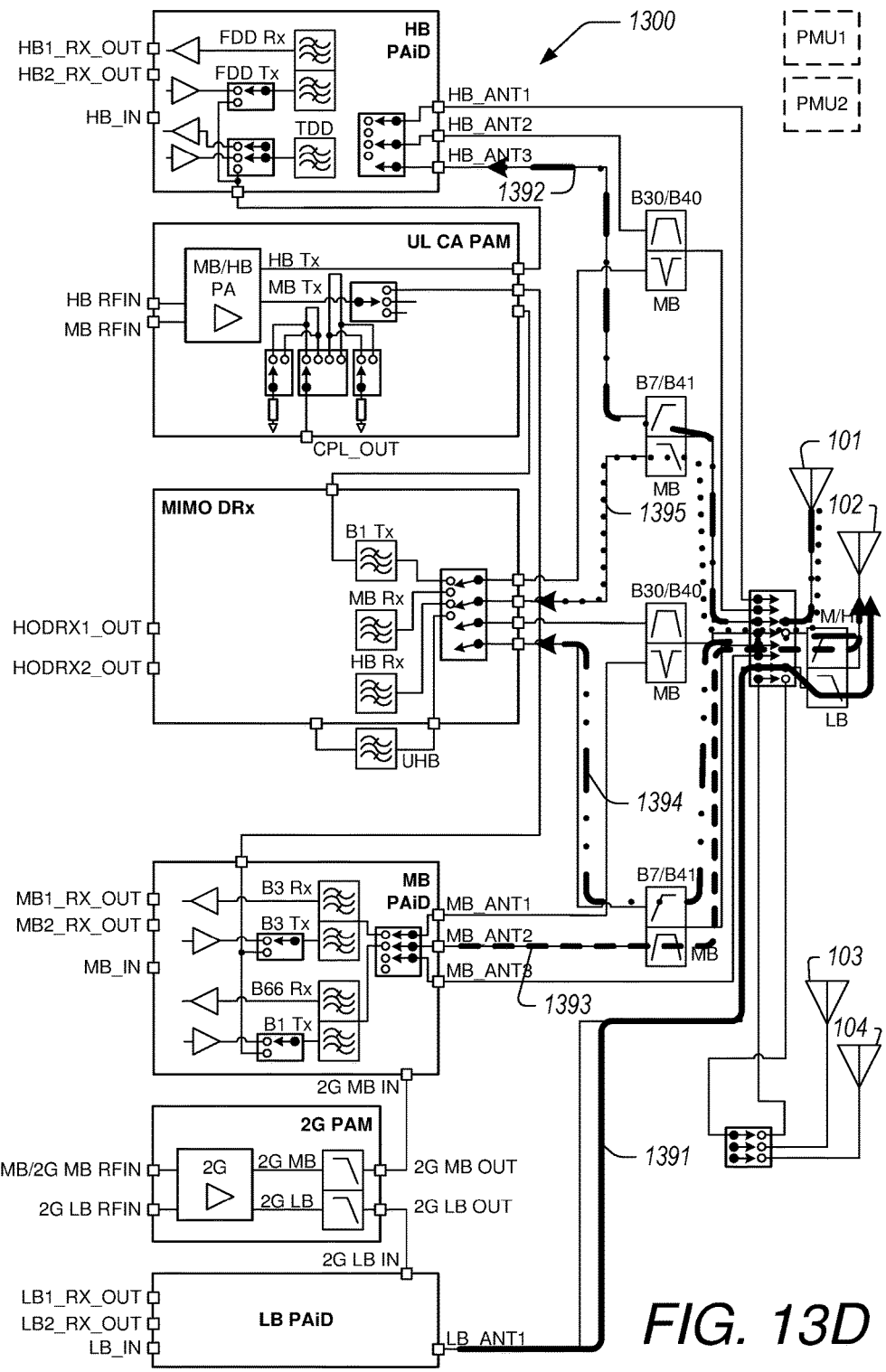
Figure 13E:
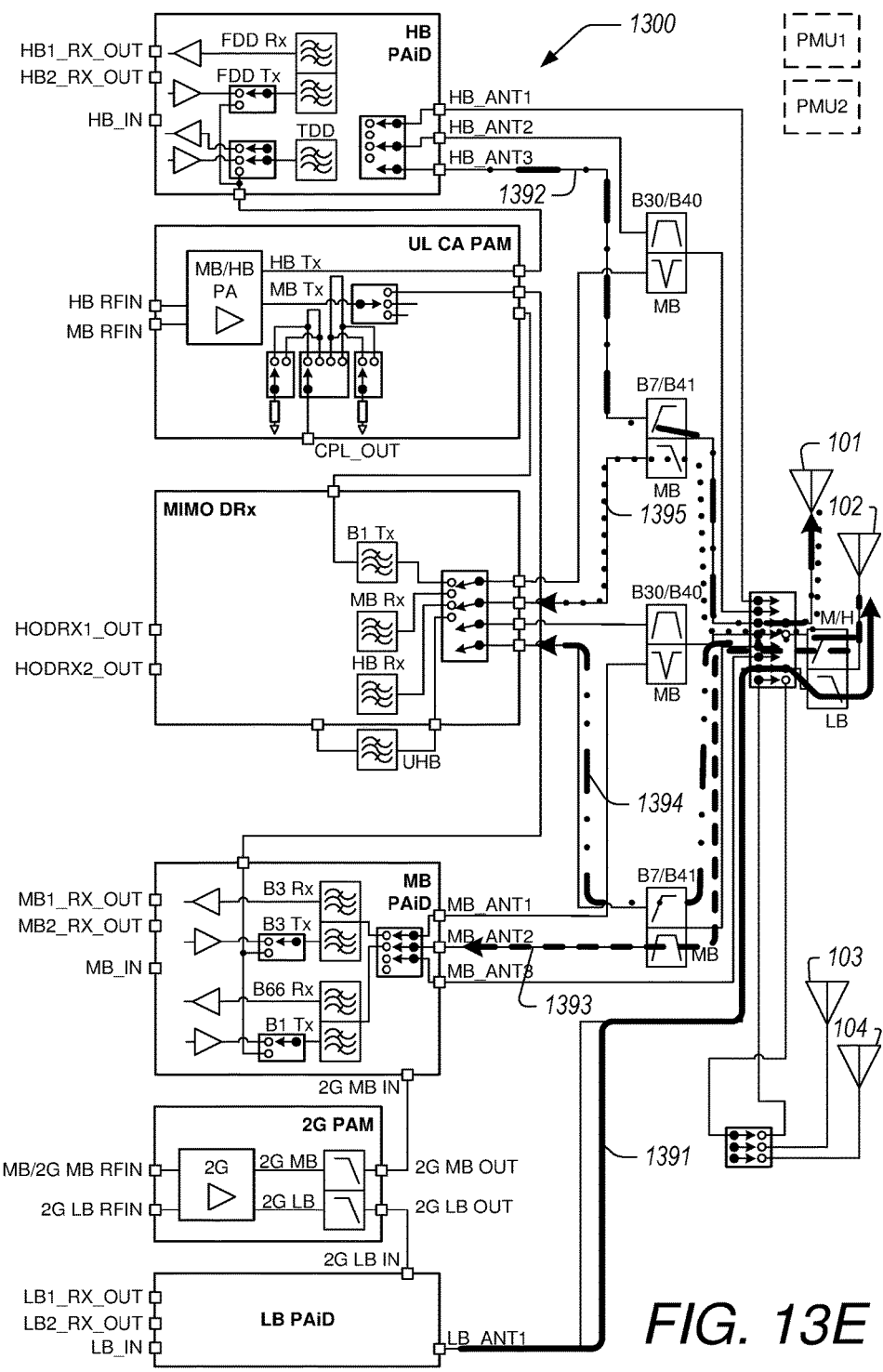
Figure 13F:
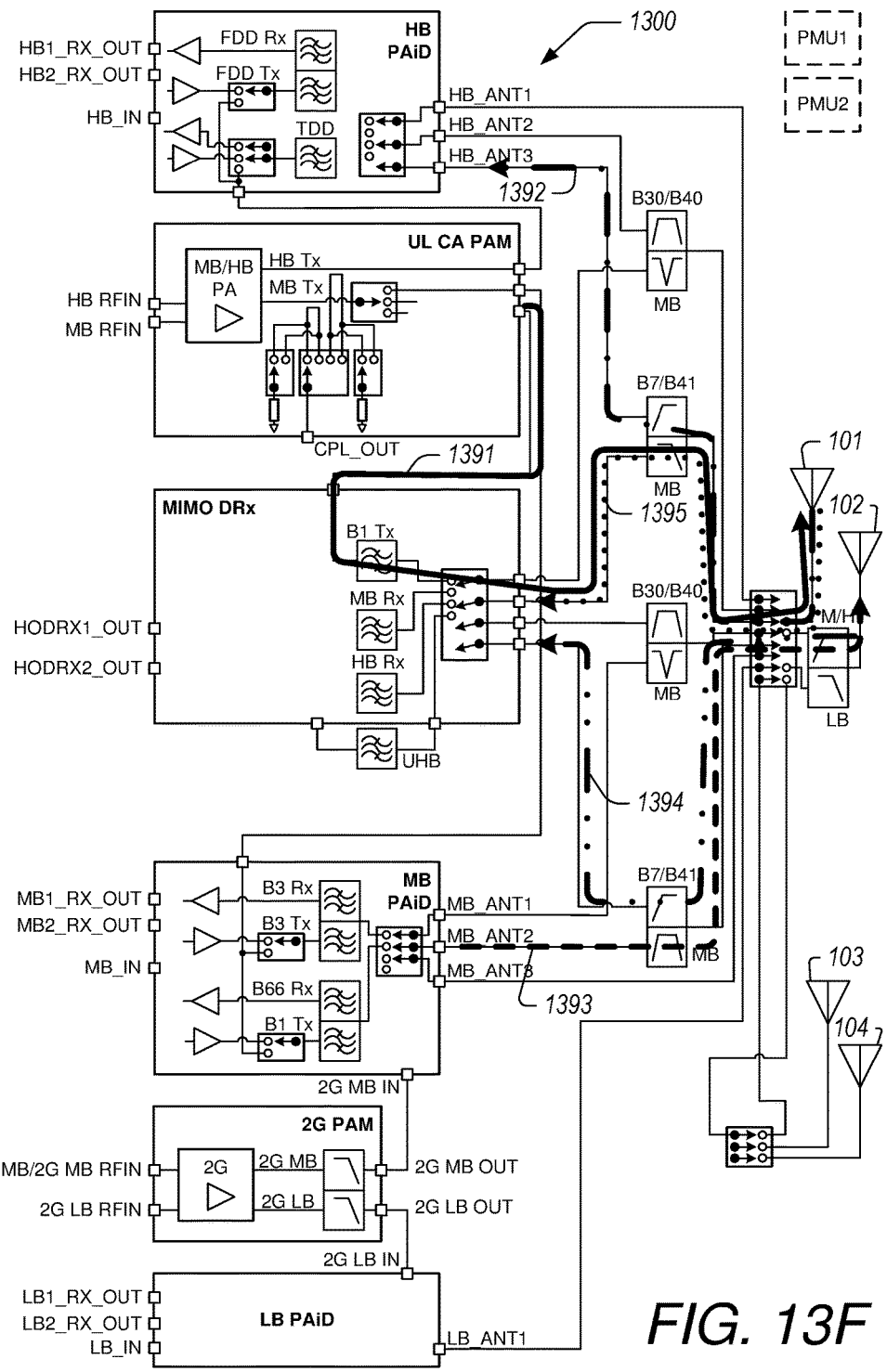
Figure 13G:
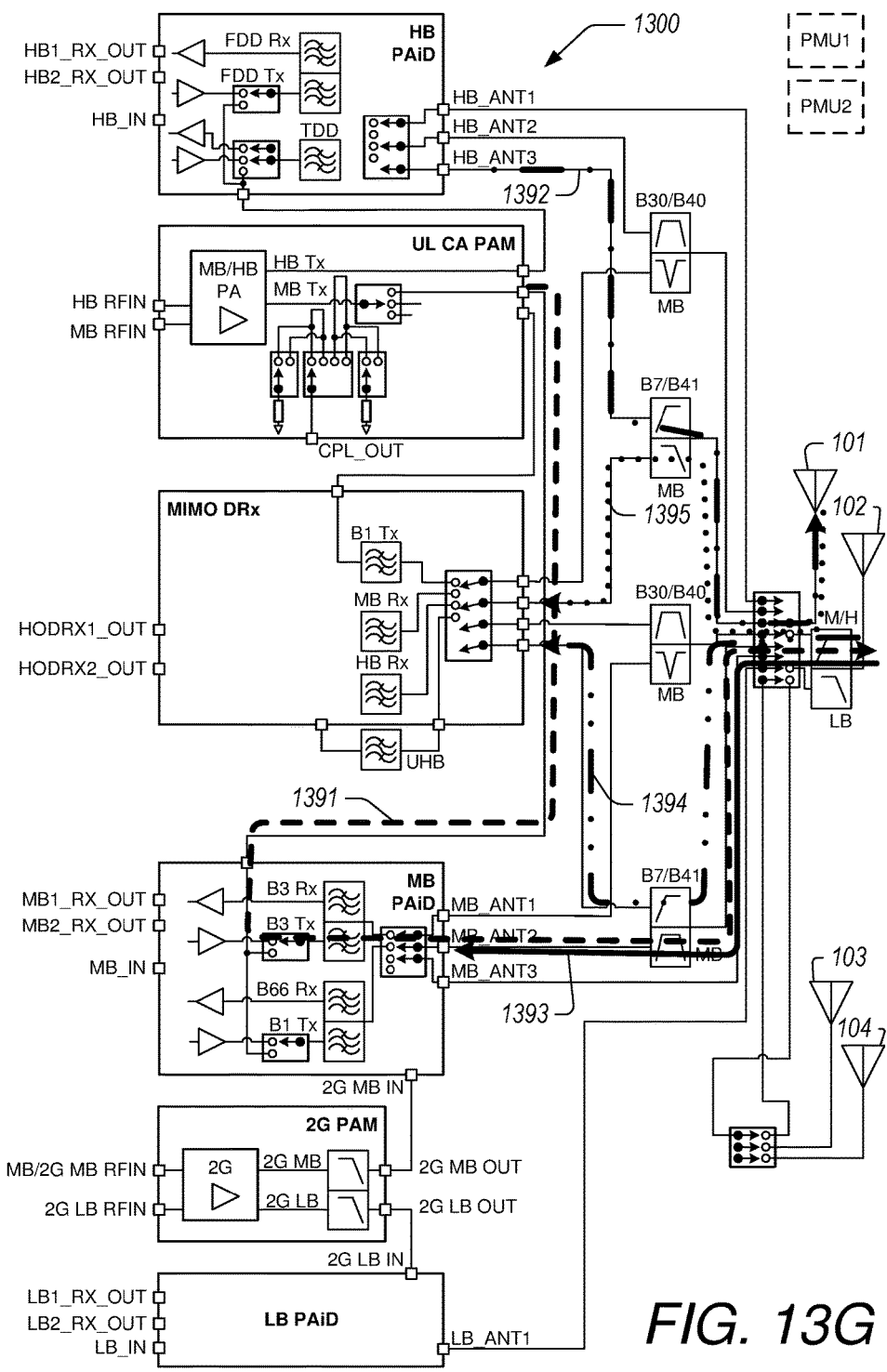
Figure 13H:
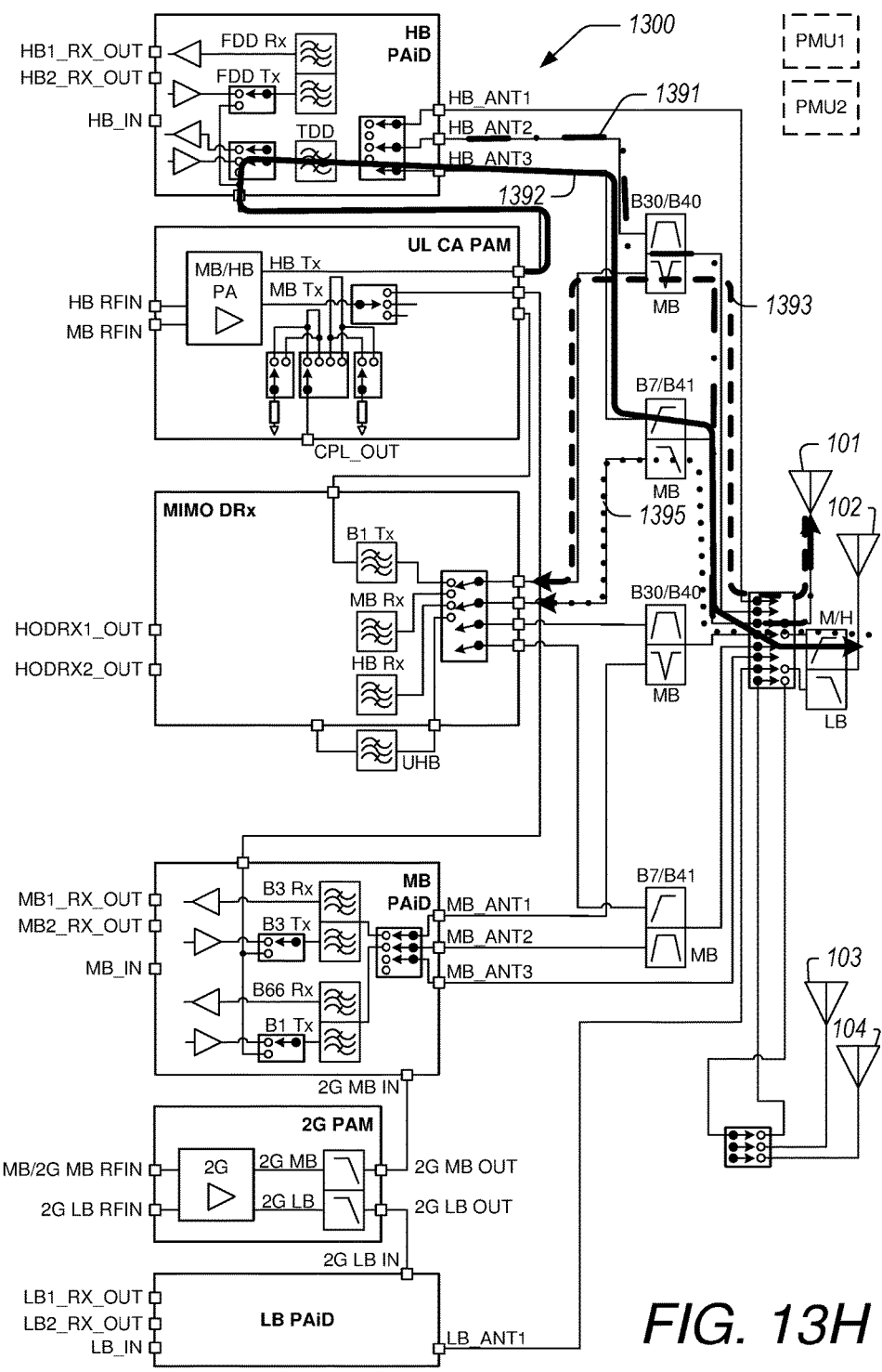

FIG. 13A illustrates another example front-end architecture 1300 that includes an antenna diversity switch providing antenna swap implementation and connectivity of a diplexer 1365 after the antenna swap switch. The 8P4T switch includes 2 ports for MB and HB bypass, 4 ports for CA diplexers and extractors, 1 port for LB TRX, and 1 port for swapping with 1 DRX antenna (e.g., when the primary antenna performance is poor, swap with DRX antenna 103 or 104 to maintain connection). The LB TRX goes to either the diplexer 1365 or to the DRX antenna for minimal loss. FIGS. 13B-13I illustrate various operational modes of the front-end architecture 1300 of FIG. 13A. FIG. 13B illustrates a bypass mode where signal path 1391 represents HB TRX bypass and signal path 1392 represents MB TRX bypass, with the bypass mode bypassing the diplexers 1361-1364. FIG. 13C illustrates MB and HB MIMO support where the B30/B40 extractor supports B30/B40 TRX and MB MIMO (e.g., signal paths 1391 and 1395), the B7/B41 CA diplexer supports B7/B41 TRX and MB MIMO (e.g., signal paths 1392 and 1396), the B30/B40 extractor supports MB TRX and B30/B40 MIMO (e.g., signal paths 1393 and 1397), and the B7/B41 CA diplexer support MB TRX and B7/B41 MIMO (e.g., signal paths 1394 and 1398). FIG. 13D illustrates LM ULCA and MB and HB 4×4 MIMO where signal path 1391 represents LB TX/RX using the LB module 1350 and ANT2 102, signal path 1392 represents HB RX using the HB module 1310 and ANT1 101, signal path 1393 represents MB TX/RX using the MB module 1340 and ANT2 102, signal path 1394 represents HB RX MIMO using the MIMO DRx 1330 and ANT2 102, and signal path 1395 represents MB RX MIMO using the MIMO DRx 1330 and ANT1 101. FIG. 13E illustrates LH ULCA and MB and HB 4×4 MIMO where signal path 1391 represents LB TX/RX using the LB module 1350 and ANT2 102, signal path 1392 represents HB TX/RX using the HB module 1310 and ANT1 101, signal path 1393 represents MB RX using the MB module 1340 and ANT2 102, signal path 1394 represents HB RX MIMO using the MIMO DRx 1330 and ANT2 102, and signal path 1395 represents MB RX MIMO using the MIMO DRx 1330 and ANT1 101. FIG. 13F illustrates MM ULCA and MB and HB 4×4 MIMO where signal path 1391 represents MB TX2 using the ULCA module 1320 and ANT1 101, signal path 1392 represents HB RX using the HB module 1310 and ANT1 101, signal path 1393 represents MB TX1/RX1/RX2 using the MB module 1340 and ANT2 102, signal path 1394 represents HB RX MIMO using the MIMO DRx 1330 and ANT2 102, and signal path 1395 represents MB RX using the MIMO DRx 1330 and ANT1 101. FIG. 13G illustrates MH ULCA and MB and HB 4×4 MIMO where signal path 1391 represents MB TX using the ULCA module 1320 and ANT2 102, signal path 1392 represents HB TX/RX using the HB module 1310 and ANT1 101, signal path 1393 represents MB RX using the MB module 1340 and ANT2 102, signal path 1394 represents HB RX MIMO using the MIMO DRx 1330 and ANT2 102, and signal path 1395 represents MB RX MIMO using the MIMO DRx 1330 and ANT1 101. FIG. 13H illustrates HH ULCA and MB 4×4 MIMO where signal path 1391 represents B40 TX/RX and B7 Rx using the HB module 1310 and ANT1 101, signal path 1392 represents B7

Figure 13I:
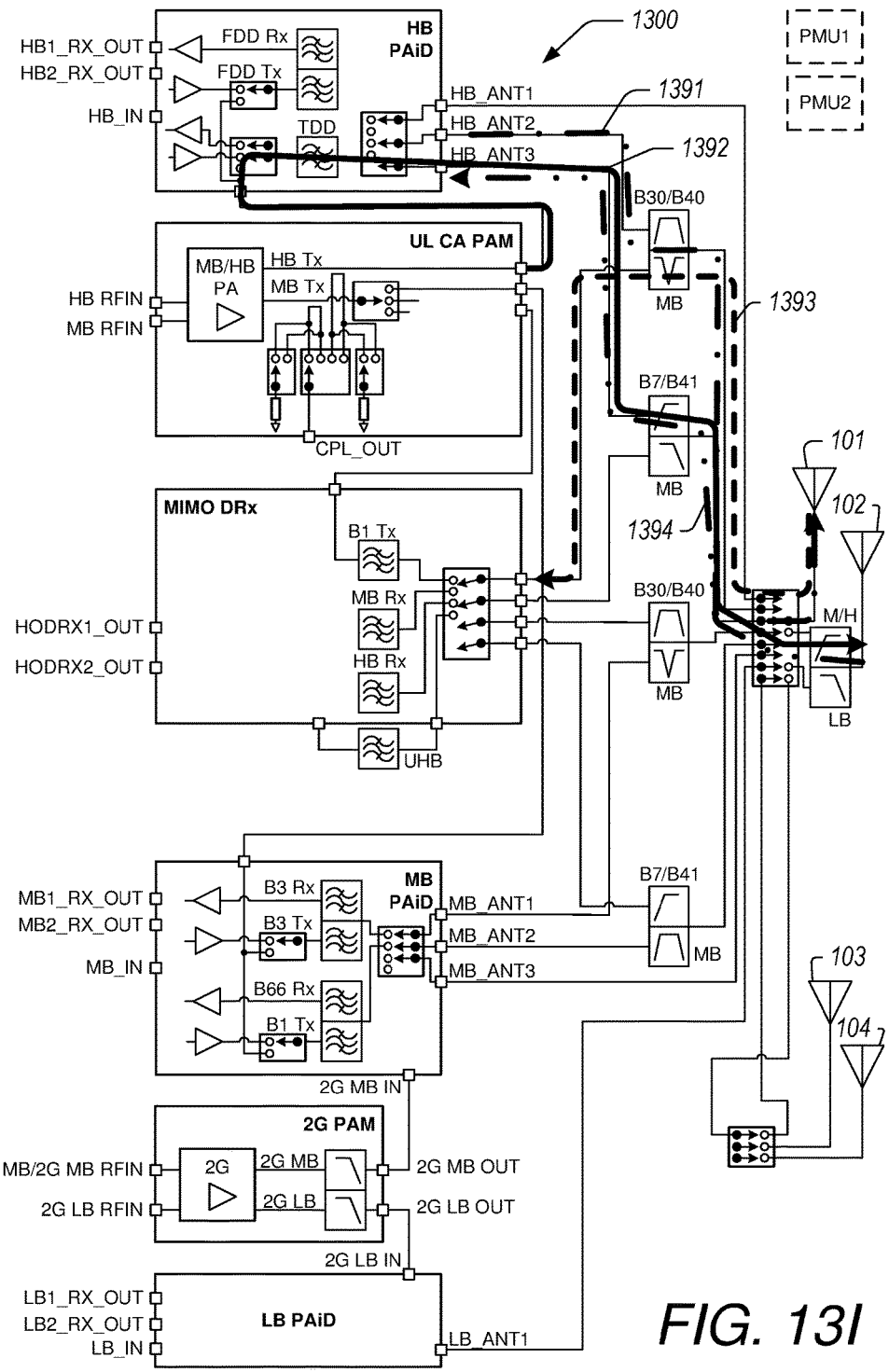

TX using the ULCA module 1320 and ANT2 102, signal path 1393 represents MB RX MIMO using the MIMO DRx 1330 and ANT1 101, and signal path 1395 represents MB RX MIMO using the MIMO DRx 1330 and ANT2 102. FIG. 13I illustrates HH ULCA and MB and HB 4×4 MIMO where signal path 1391 represents B40 TX/RX using the HB module 1310 and ANT1 101, signal path 1392 represents B7 TX using the ULCA module 1320 and ANT2 102, signal path 1393 represents B7 RX MIMO using the MIMO DRx 1330 and ANT1 101, and signal path 1394 represents B7 RX using the HB module 1310 and ANT2 102.

Figure 14:
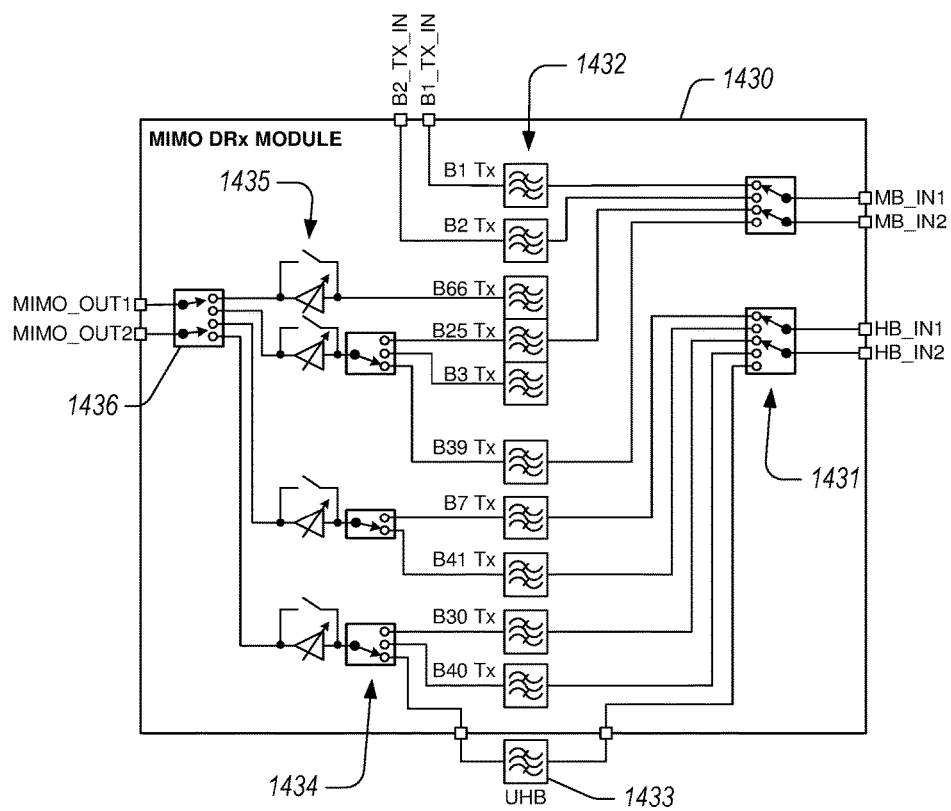
FIG. 14 illustrates an example MIMO DRx module that can be implemented in front-end architectures disclosed herein.

FIG. 14 illustrates an example MIMO DRx module 1430 that can be implemented in front-end architectures disclosed herein with particular advantages being realized when implemented in the front-end architecture 1300. The MIMO DRx module 1430 includes switch combining MB TX and RX filters to deliver the optimal performance in MM ULCA+MB 4×4 MIMO. With the MIMO DRx module 1430, no switch combining is required in UL CA only without 4×4 MIMO which results in optimal TX performance with no RX filter loading loss. With the MIMO DRx module 1430, MB-HB diplexing via CA diplexer/extractor results in support for all MB-HB CA cases and enables the re-use of existing DRX HB filters. The MIMO DRx module 1430 includes two MIMO RX outputs to support MIMO in 2 bands, MB-MB, MB-HB, and HB-HB.

Example 6 of a Front-End Architecture

Figure 15A:
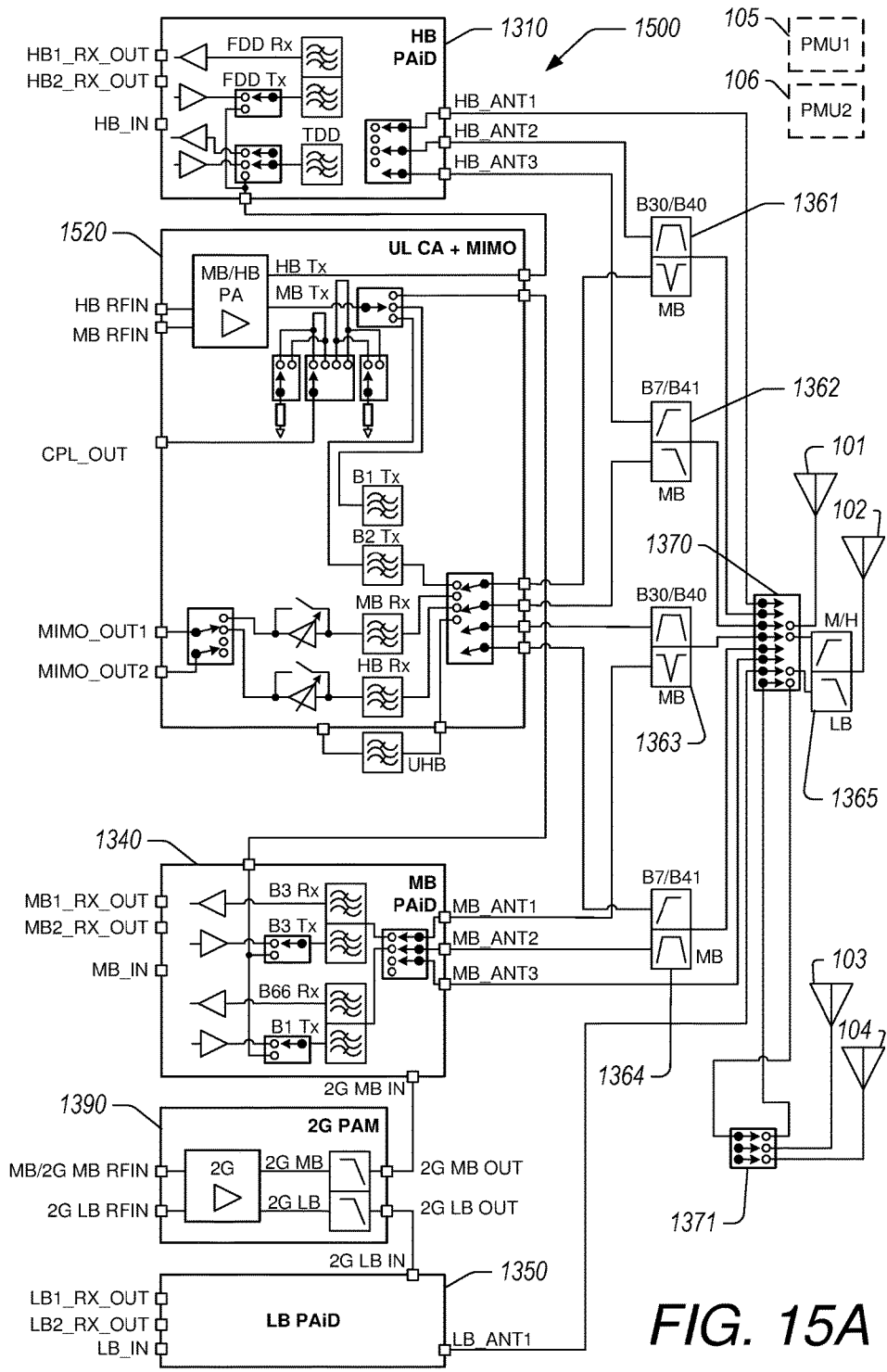
FIG. 15A illustrates another example front-end architecture that includes an antenna diversity switch providing antenna swap implementation, connectivity of a diplexer after the antenna swap switch, and an integrated UL CA power amplifier module and MIMO DRx module.
Figure 15B:
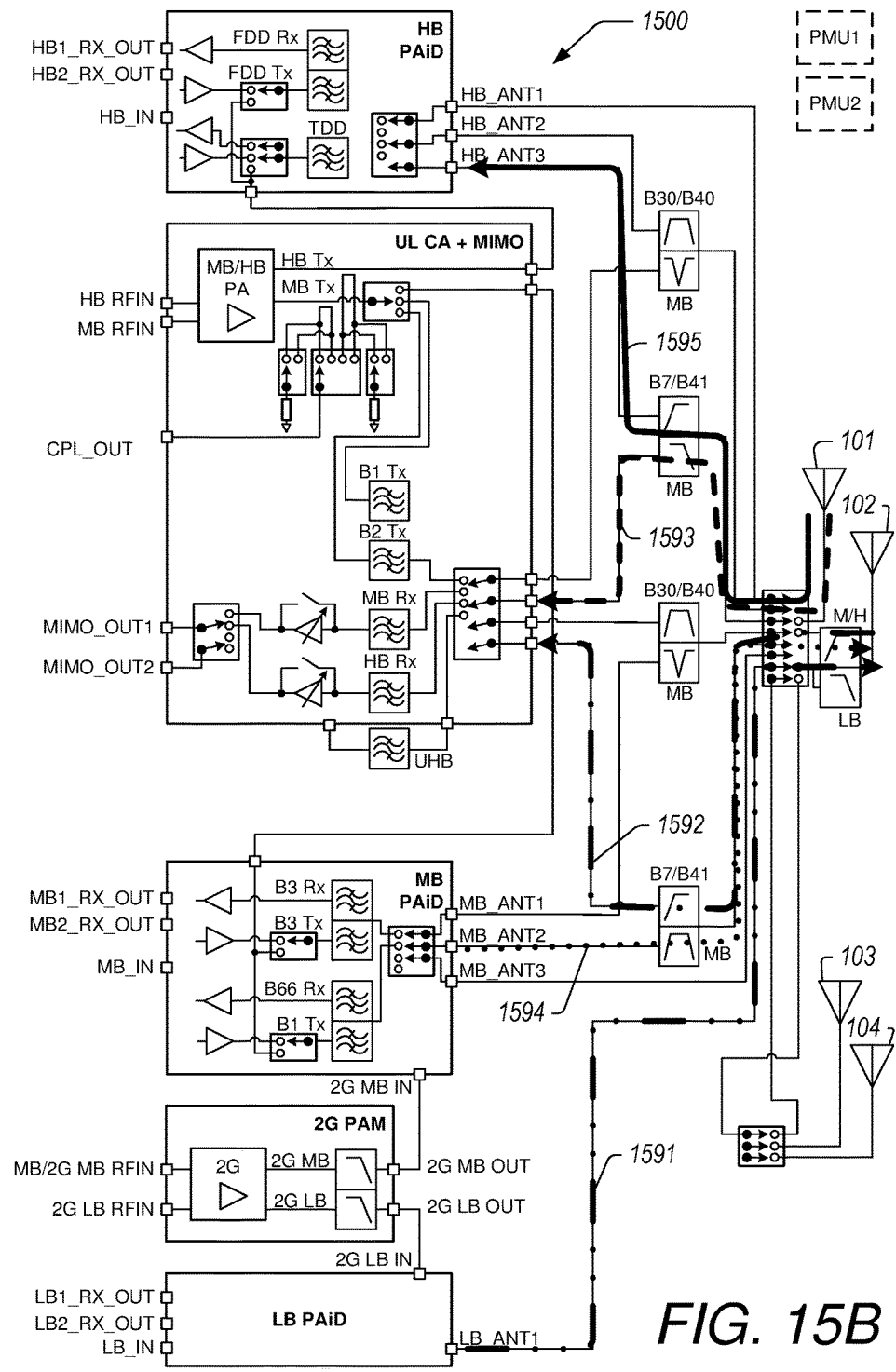
FIGS. 15B, 15C, 15D, 15E, 15F, and 15G illustrate various operational modes of the front-end architecture of FIG. 15A.
Figure 15C:
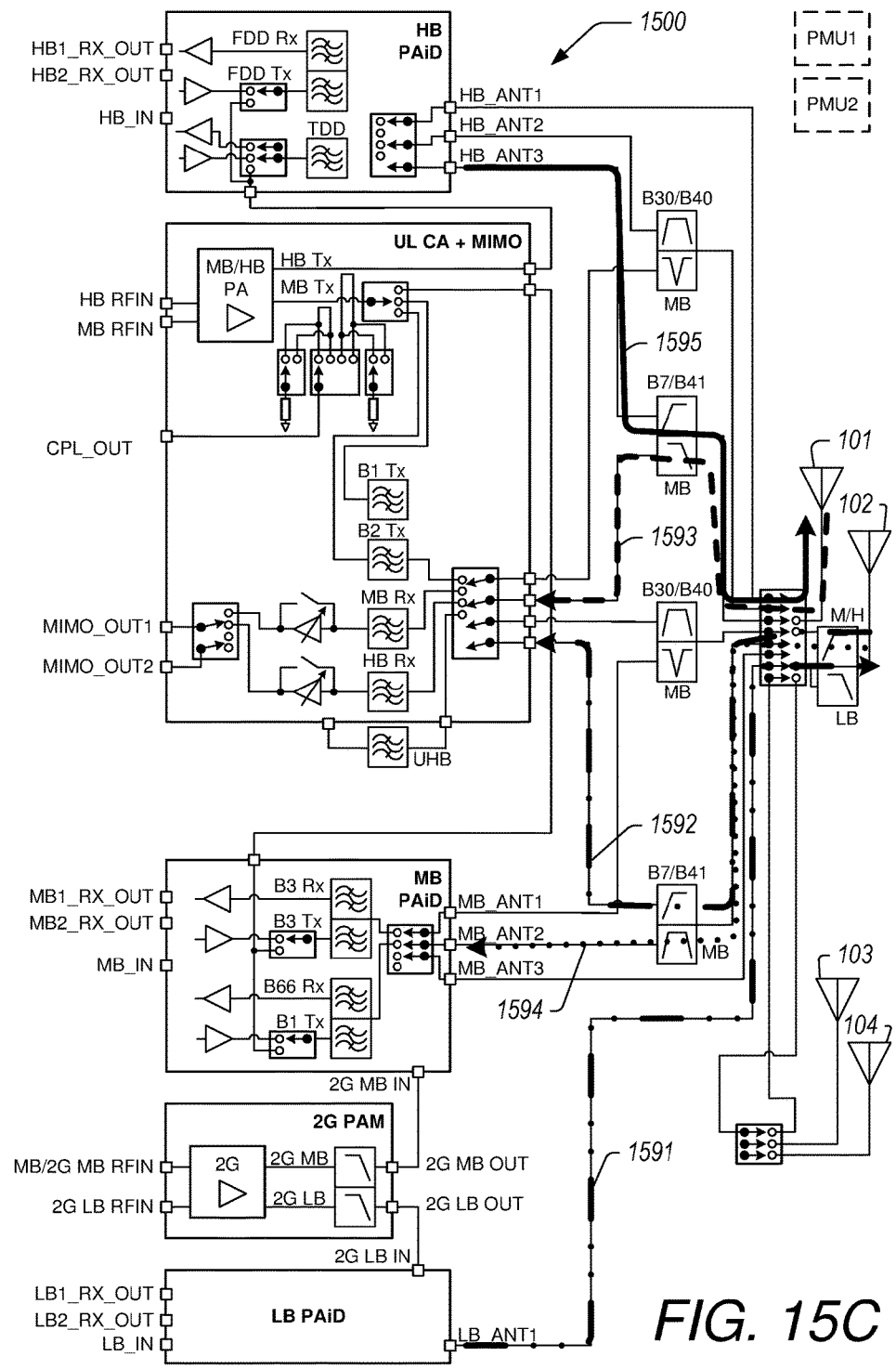
Figure 15D:
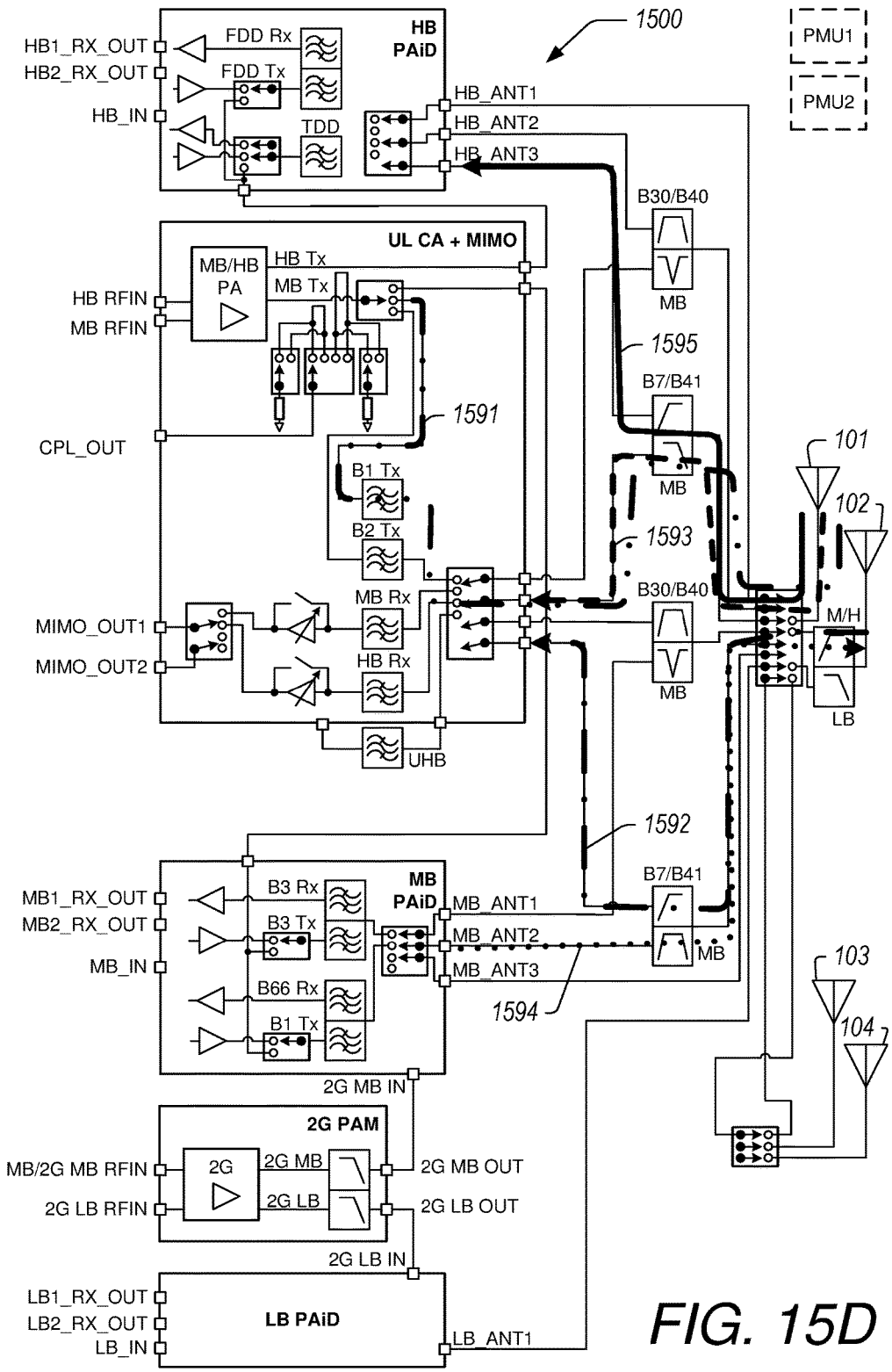
Figure 15E:
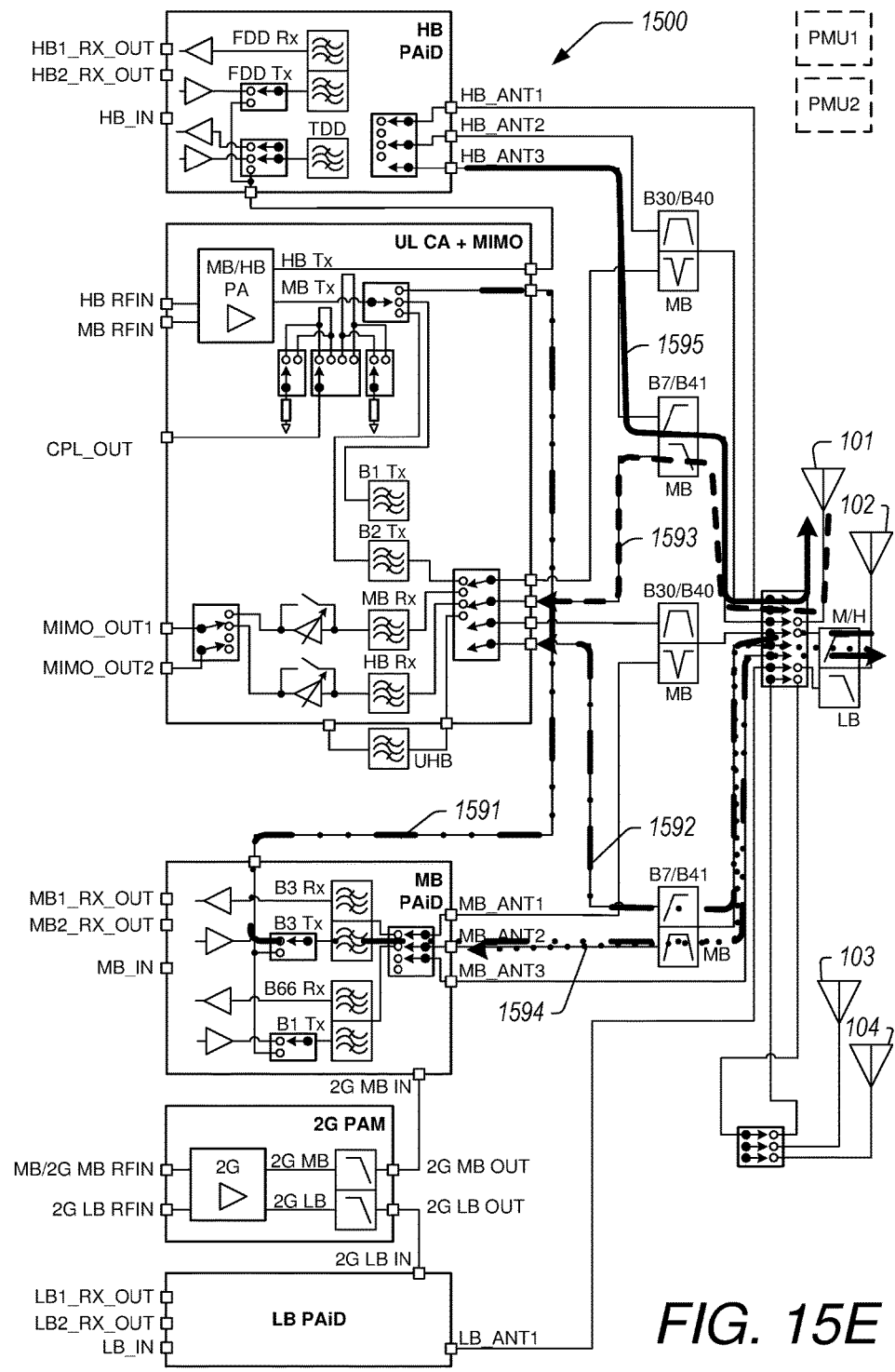
Figure 15F:
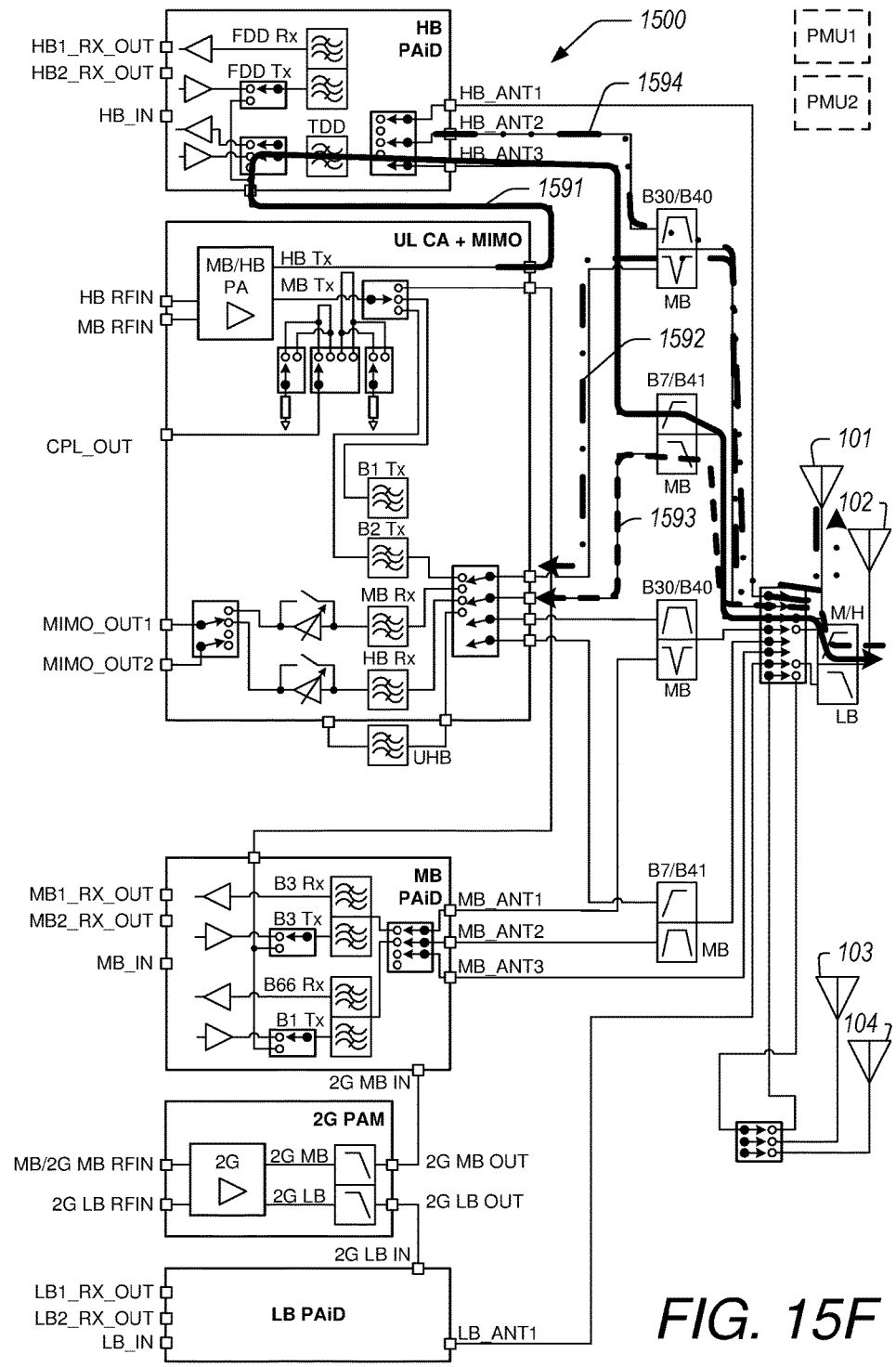
Figure 15G:
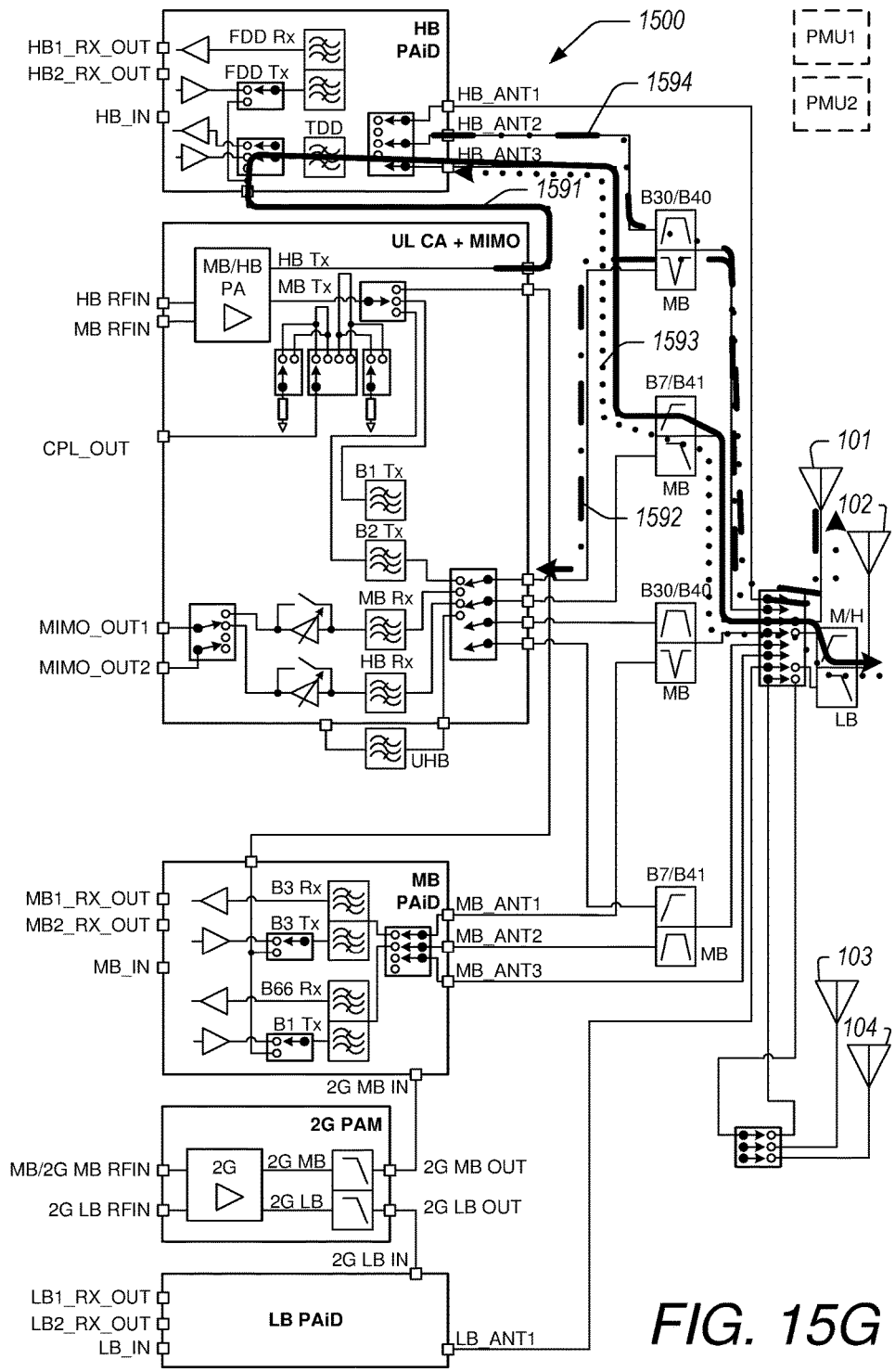

FIG. 15A illustrates another example front-end architecture 1500 that includes an antenna diversity switch providing antenna swap implementation, connectivity of a diplexer after the antenna swap switch, and an integrated UL CA power amplifier module and MIMO DRx module 1520 (or the combination module 1520). The architecture 1500 is similar to the architecture 1300 where the ULCA module 1320 and the MIMO DRx 1330 are combined to form the combination module 1520. FIGS. 15B-15G illustrate various operational modes of the front-end architecture 1500 of FIG. 15A. FIG. 15B illustrates LM ULCA and MB and HB 4×4 MIMO where signal path 1591 represents LB TX/RX using the LB module 1350 and ANT2 102, signal path 1592 represents HB RX MIMO using the combination module 1520 and ANT2 102, signal path 1593 represents MB RX MIMO using the combination module 1520 and ANT1 101, signal path 1594 represents MB TX/RX using the MB module 1340 and ANT2 102, and signal path 1595 represents HB RX using the HB module 1310 and ANT1 101. FIG. 15C illustrates LH ULCA and MB and HB 4×4 MIMO where signal path 1591 represents LB TX/RX using the LB module 1350 and ANT2 102, signal path 1592 represents HB RX MIMO using the combination module 1520 and ANT2 102, signal path 1593 represents MB RX MIMO using the combination module 1520 and ANT1 101, signal path 1594 represents MB RX using the MB module 1340 and ANT2 102, and signal path 1595 represents HB TX/RX using the HB module 1310 and ANT1 101. FIG. 15D illustrates MM ULCA and MB and HB 4×4 MIMO where signal path 1591 represents MB TX2 using the combination module 1520 and ANT1 101, signal path 1592 represents HB RX MIMO using the combination module 1520 and ANT1 101, signal path 1593 represents MB RX using the combination module 1520 and ANT1 101, signal path 1594 represents MB TX1/RX1/RX2 using the MB module 1340 and ANT2 102, and signal path 1595 represents HB RX using the HB module 1310 and ANT1 101. FIG. 15E illustrates MH ULCA and MB and HB 4×4 MIMO where signal path 1591 represents MB TX using the combination module 1520 and ANT2 102, signal path 1592 represents HB RX MIMO using the combination module 1520 and ANT2 102, signal path 1593 represents MB RX MIMO using the combination module 1520 and ANT1 101, signal path 1594 represents MB RX using the MB module 1340 and ANT2 102, and signal path 1595 represents HB TX/RX using the HB module 1310 and ANT1 101. FIG. 15F illustrates HH ULCA and MB 4×4 MIMO where signal path 1594 represents B40 TX/RX and B7 Rx using the HB module 1310 and ANT1 101, signal path 1591 represents B7 TX using the combination module 1520 and ANT2 102, signal path 1592 represents MB RX MIMO using the combination module 1520 and ANT1 101, and signal path 1593 represents MB RX MIMO using the combination module 1520 and ANT2 102. FIG. 15G illustrates HH ULCA and HB 4×4 MIMO where signal path 1594 represents B40 TX/RX using the HB module 1310 and ANT1 101, signal path 1591 represents B7 TX using the combination module 1520 and ANT2 102, signal path 1592 represents B7 RX MIMO using the combination module 1520 and ANT1 101, and signal path 1593 represents B7 RX using the HB module 1310 and ANT2 102.

Figure 16:
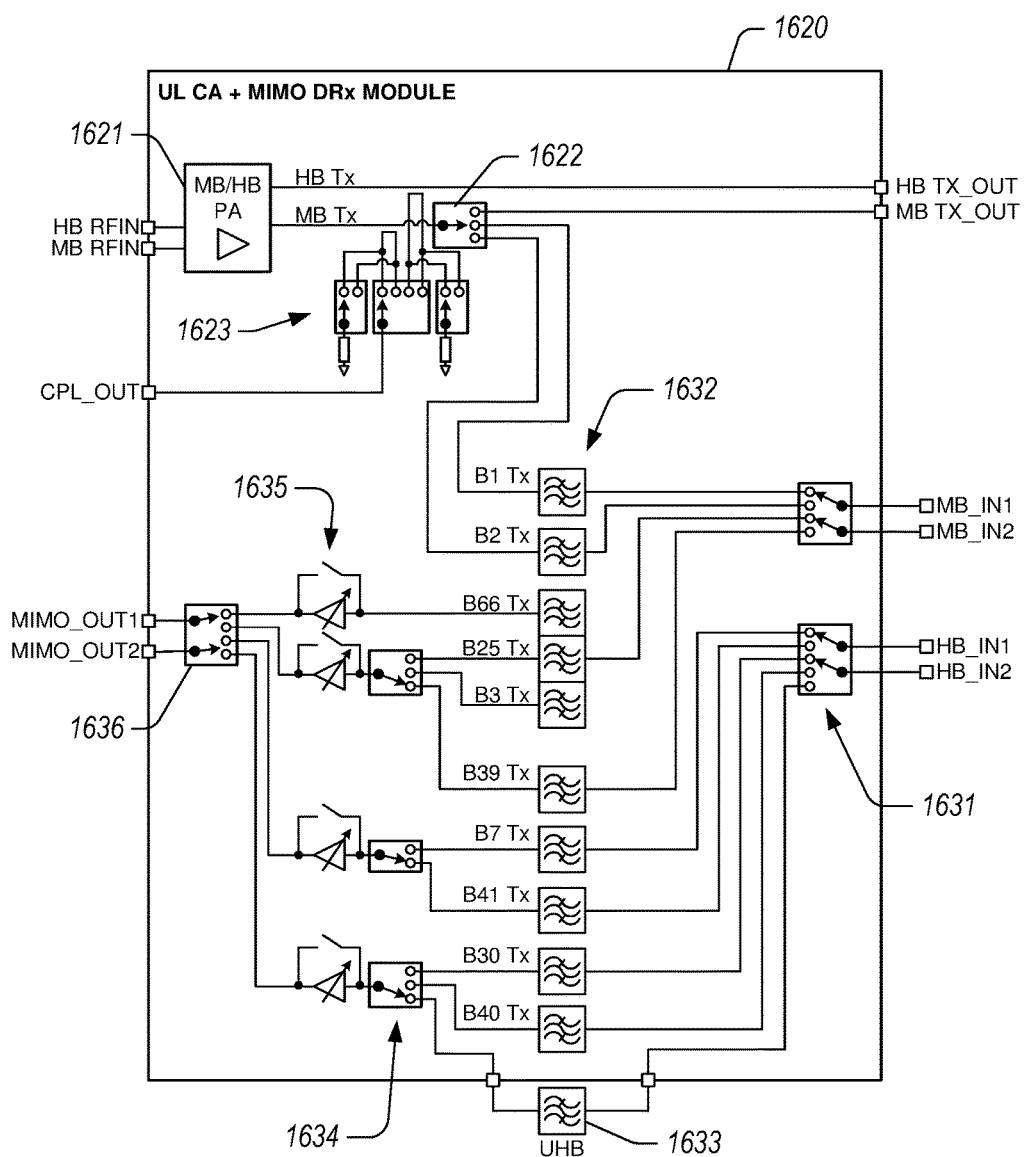
FIG. 16 illustrates an example combination module that combines functionality of a MIMO DRx module and an UL CA PA module, the combination module capable of implementation in one or more of the front-end architectures disclosed herein.
Figure 17:
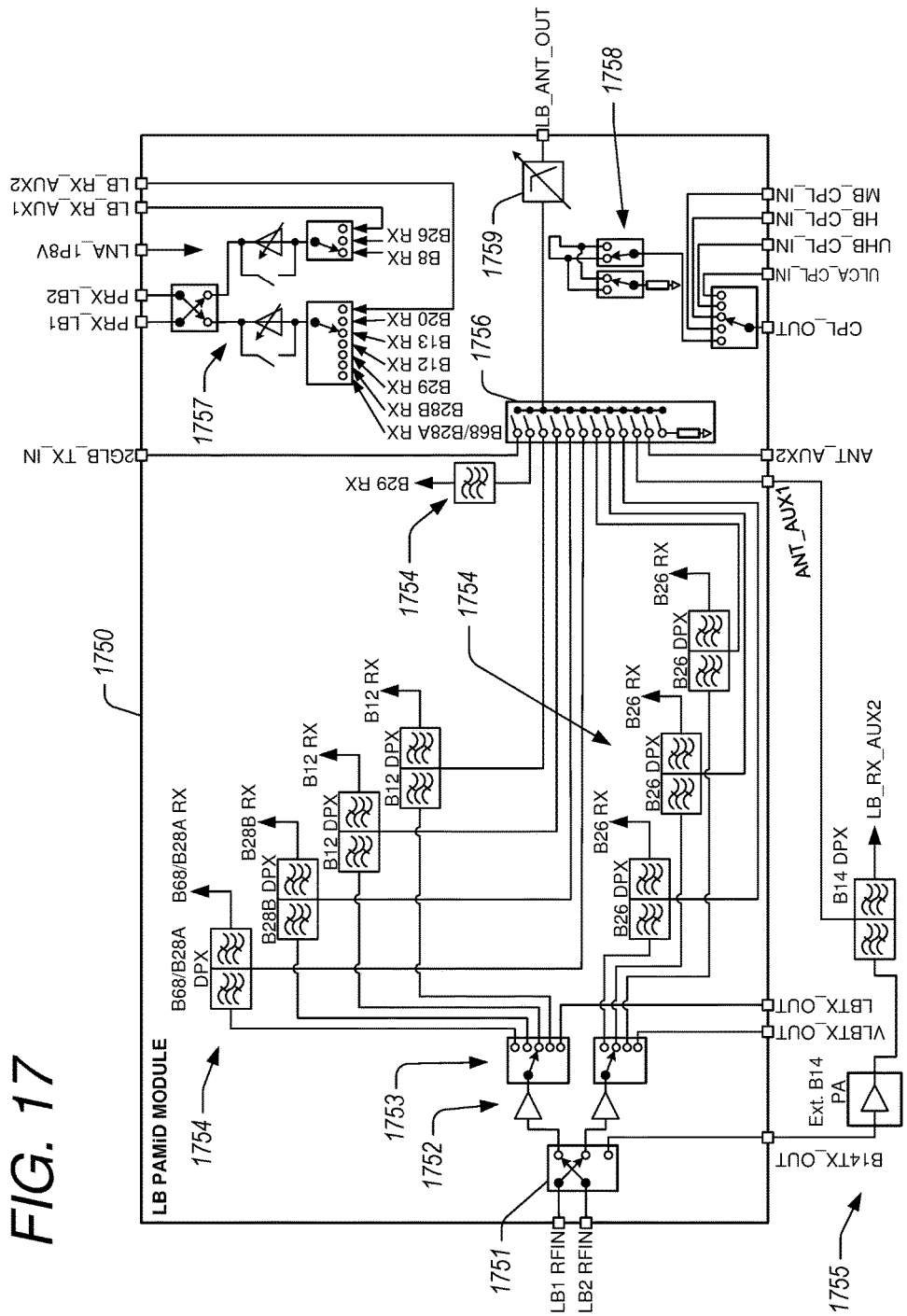
FIG. 17 illustrates an example LB PAMiD that can be used with one or more of the front-end architectures disclosed herein.

FIG. 16 illustrates an example combination module 1620 that combines functionality of a MIMO DRx module and an UL CA PA module, the combination module 1620 capable of implementation in one or more of the front-end architectures disclosed herein and may be particularly beneficial implemented in the front-end architecture 1500. The combination module 1620 includes 1 MB TX output to MB PAiD to enable MB duplexer re-use in MH ULCA. The combination module 1620 includes 1 HB TX output where the HB TX is needed only if HH ULCA is required. The combination module 1620 includes an integrated coupler that enables forward and backward power sampling. The combination module 1620 includes switch combining MB TX and RX filters to deliver the optimal performance in MM ULCA+ MB 4×4 MIMO. With the combination module 1620, no switch combining is required in UL CA only without 4×4 MIMO which results in optimal TX performance with no RX filter loading loss. With the combination module 1620, MB-HB diplexing via CA diplexer/extractor results in support for all MB-HB CA cases and enables the re-use of existing DRX HB filters. The combination module 1620 includes two MIMO RX outputs to support MIMO in 2 bands, MB-MB, MB-HB, and HB-HB. FIG. 17 illustrates an example LB PAMiD 1750 that can be used with one or more of the front-end architectures disclosed herein.

Example of a Wireless Device

In some implementations, an architecture, device and/or circuit having one or more features described herein can be included in a wireless device. Such an architecture, device and/or circuit can be implemented directly in the wireless device, in one or more modular forms as described herein, or in some combination thereof. In some embodiments, such a wireless device can include, for example, a cellular phone, a smart-phone, a hand-held wireless device with or without phone functionality, a wireless tablet, a wireless router, a wireless modem configured to support machine type communications, a wireless access point, a wireless base station, etc. Although described in the context of wireless devices, it will be understood that one or more features of the present disclosure can also be implemented in other RF systems such as base stations.

Figure 18:
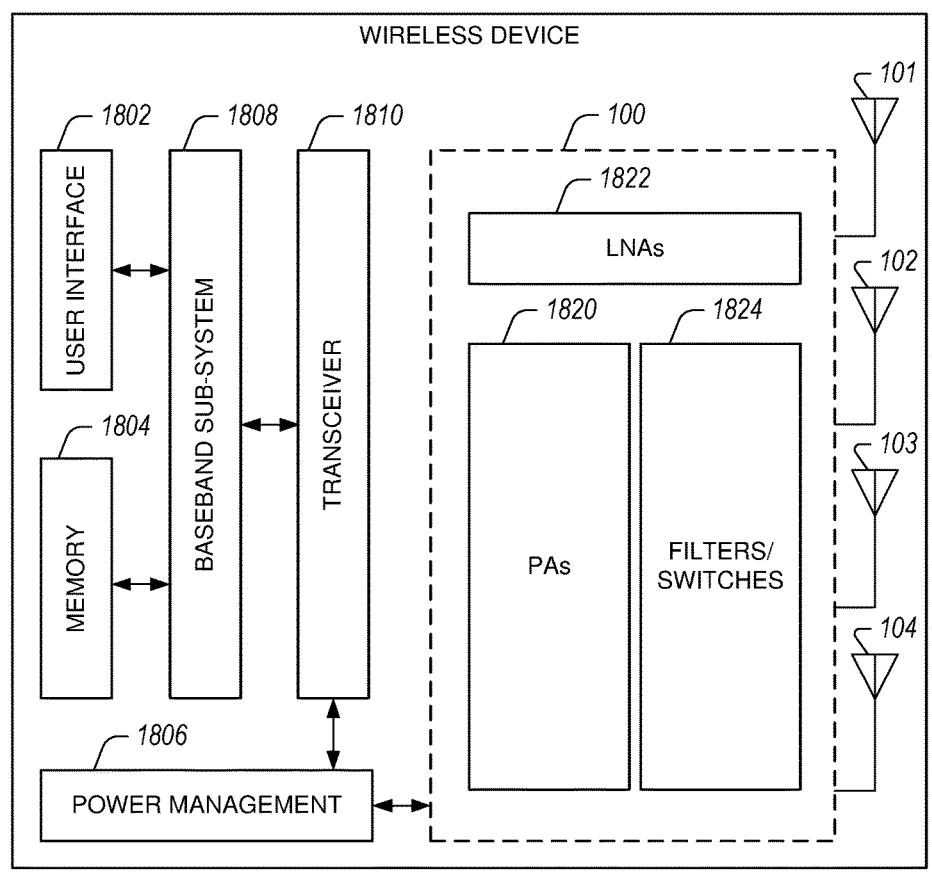
FIG. 18 illustrates a wireless device having one or more features as described herein.

FIG. 18 depicts an example wireless device 1800 having one or more advantageous features described herein. In some embodiments, such advantageous features can be implemented in a front-end (FE) architecture, generally indicated as 100. In some embodiments, such a front-end architecture 100 can be implemented one or more modules. It is to be understood that the front-end architecture 100 can be any of the front-end architectures disclosed herein.

As described herein, such a front-end architecture can include, for example, an assembly of PAs 1820 for amplifying signals to be transmitted, an assembly of LNAs 1822 for amplification of received signals, and an assembly of filters and switches 1824 for filtering of signals and routing of signals. As described herein, such a front-end architecture can provide support for multiple antennas, such as four antennas 101, 102, 103, 104.

PAs in the PA assembly 1820 can receive their respective RF signals from a transceiver 1810 that can be configured and operated to generate RF signals to be amplified and transmitted, and to process received signals. The transceiver 1810 is shown to interact with a baseband sub-system 1808 that is configured to provide conversion between data and/or voice signals suitable for a user and RF signals suitable for the transceiver 1810. The transceiver 1810 is also shown to be connected to a power management component 1806 that is configured to manage power for the operation of the wireless device 1800. Such power management can also control operations of the front-end architecture 100 and other components of the wireless device 1800.

The baseband sub-system 1808 is shown to be connected to a user interface 1802 to facilitate various input and output of voice and/or data provided to and received from the user. The baseband sub-system 1808 can also be connected to a memory 1804 that is configured to store data and/or instructions to facilitate the operation of the wireless device, and/or to provide storage of information for the user.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

One or more features of the present disclosure can be implemented with various cellular frequency bands as described herein. Examples of such bands are listed in Table 3. It will be understood that at least some of the bands can be divided into sub-bands. It will also be understood that one or more features of the present disclosure can be implemented with frequency ranges that do not have designations such as the examples of Table 3.

TABLE 3

| Band | Mode | Tx Frequency Range (MHz) | Rx Frequency Range (MHz) |
| --- | --- | --- | --- |
| B1  | FDD | 1,920-1,980     | 2,110-2,170     |
| B2  | FDD | 1,850-1,910     | 1,930-1,990     |
| B3  | FDD | 1,710-1,785     | 1,805-1,880     |
| B4  | FDD | 1,710-1,755     | 2,110-2,155     |
| B5  | FDD | 824-849         | 869-894         |
| B6  | FDD | 830-840         | 875-885         |
| B7  | FDD | 2,500-2,570     | 2,620-2,690     |
| B8  | FDD | 880-915         | 925-960         |
| B9  | FDD | 1,749.9-1,784.9 | 1,844.9-1,879.9 |
| B10 | FDD | 1,710-1,770     | 2,110-2,170     |
| B11 | FDD | 1,427.9-1,447.9 | 1,475.9-1,495.9 |
| B12 | FDD | 699-716         | 729-746         |
| B13 | FDD | 777-787         | 746-756         |
| B14 | FDD | 788-798         | 758-768         |
| B15 | FDD | 1,900-1,920     | 2,600-2,620     |
| B16 | FDD | 2,010-2,025     | 2,585-2,600     |
| B17 | FDD | 704-716         | 734-746         |

TABLE 3-continued

| Band | Mode | Tx Frequency Range (MHz) | Rx Frequency Range (MHz) |
| --- | --- | --- | --- |
| B18 | FDD | 815-830         | 860-875         |
| B19 | FDD | 830-845         | 875-890         |
| B20 | FDD | 832-862         | 791-821         |
| B21 | FDD | 1,447.9-1,462.9 | 1,495.9-1,510.9 |
| B22 | FDD | 3,410-3,490     | 3,510-3,590     |
| B23 | FDD | 2,000-2,020     | 2,180-2,200     |
| B24 | FDD | 1,626.5-1,660.5 | 1,525-1,559     |
| B25 | FDD | 1,850-1,915     | 1,930-1,995     |
| B26 | FDD | 814-849         | 859-894         |
| B27 | FDD | 807-824         | 852-869         |
| B28 | FDD | 703-748         | 758-803         |
| B29 | FDD | N/A             | 716-728         |
| B30 | FDD | 2,305-2,315     | 2,350-2,360     |
| B31 | FDD | 452.5-457.5     | 462.5-467.5     |
| B32 | FDD | N/A             | 1,452-1,496     |
| B33 | TDD | 1,900-1,920     | 1,900-1,920     |
| B34 | TDD | 2,010-2,025     | 2,010-2,025     |
| B35 | TDD | 1,850-1,910     | 1,850-1,910     |
| B36 | TDD | 1,930-1,990     | 1,930-1,990     |
| B37 | TDD | 1,910-1,930     | 1,910-1,930     |
| B38 | TDD | 2,570-2,620     | 2,570-2,620     |
| B39 | TDD | 1,880-1,920     | 1,880-1,920     |
| B40 | TDD | 2,300-2,400     | 2,300-2,400     |
| B41 | TDD | 2,496-2,690     | 2,496-2,690     |
| B42 | TDD | 3,400-3,600     | 3,400-3,600     |
| B43 | TDD | 3,600-3,800     | 3,600-3,800     |
| B44 | TDD | 703-803         | 703-803         |
| B45 | TDD | 1,447-1,467     | 1,447-1,467     |
| B46 | TDD | 5,150-5,925     | 5,150-5,925     |
| B65 | FDD | 1,920-2,010     | 2,110-2,200     |
| B66 | FDD | 1,710-1,780     | 2,110-2,200     |
| B67 | FDD | N/A             | 738-758         |
| B68 | FDD | 698-728         | 753-783         |

General Comments:

For the purpose of description, it will be understood that a module can be a physical module and/or a functional block configured to provide a desired modular functionality with one or more devices and/or circuits. For example, a physical module can be a packaged module implemented on a packaging substrate, a packaged die configured to be mounted on a circuit board, or any other physical device configured to provide RF functionality. It will also be understood that a module can include one or more physical devices, including a plurality of physical devices with each sometimes being referred to as a module itself.

Also for the purpose of description, it will be understood that a component can be physical device and/or an assembly of one or more devices and/or circuits configured to provide a functionality. In some situations, a component can also be referred to as a module, and vice versa.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A front-end architecture for wireless communication comprising:
    a plurality of diplexers coupled to an antenna switch module having a first throw configured to be coupled to a first antenna and a second throw configured to be coupled to a second antenna;
    a first module having a low-band power amplifier with integrated duplexer, an output of the first module coupled to a low-pass filter of a first diplexer of the plurality of diplexers;
    a second module having a mid-band power amplifier with integrated duplexer, a first output of the second module coupled to the antenna switch module bypassing the plurality of diplexers, a second output of the second module coupled to a notch filter of a second diplexer of the plurality of diplexers, and a third output of the second module coupled to a bandpass filter of a third diplexer of the plurality of diplexers;
    a third module having a high-band power amplifier with integrated duplexer, a first output of the third module coupled to the antenna switch module bypassing the plurality of diplexers, a second output of the third module coupled to a bandpass filter of the second diplexer of the plurality of diplexers, and a third output of the third module coupled to a high-pass filter of the third diplexer of the plurality of diplexers;
    a fourth module having a plurality of filters that includes a mid-band receive filter, a high-band receive filter, a plurality of transmit filters, and an output coupled to a high-pass filter of the first diplexer; and
    a fifth module having a power amplifier configured for uplink carrier aggregation, the fifth module configured to selectively couple to the fourth module, to the third module, and to the second module to utilize filters within these modules in one or more uplink carrier aggregation operating modes.

2. The front-end architecture of claim 1 wherein the high-pass filter of the first diplexer is configured to pass mid-band signals and high-band signals.

3. The front-end architecture of claim 2 wherein the low-pass filter of the first diplexer is configured to pass low-band signals.

4. The front-end architecture of claim 1 wherein the bandpass filter of the second diplexer is configured to pass signals in cellular frequency bands B30 and B40.

5. The front-end architecture of claim 4 wherein the notch filter of the second diplexer is configured to pass mid-band signals.

6. The front-end architecture of claim 1 wherein the high-pass filter of the third diplexer is configured to pass ultrahigh-band signals and signals in cellular frequency bands B7 and B41.

7. The front-end architecture of claim 6 wherein the bandpass filter of the third diplexer is configured to pass mid-band signals.

8. The front-end architecture of claim 1 wherein the antenna switch module includes a first port to couple to the second module, and a second port to couple to the third module such that the first port and the second port are configured to bypass the plurality of diplexers in coupling to the second module and the third module.

9. The front-end architecture of claim 1 wherein the antenna switch module further includes a third port to couple to the first diplexer, a fourth port to couple to the second diplexer, and a fifth port to couple to the third diplexer.

10. The front-end architecture of claim 1 further comprising a first power management unit configured to provide power to the first module and to the fifth module and a second power management unit configured to provide power to the second module and the third module.

11. The front-end architecture of claim 1 wherein the front-end architecture is configured to provide uplink carrier aggregation simultaneously with multiple input multiple output operation.

12. The front-end architecture of claim 11 wherein, in an operating mode that provides low-band and mid-band uplink carrier aggregation simultaneously with mid-band multiple input multiple output operation, the first module transmits low-band signals to the first diplexer, the second module transmits signals and receives mid-band signals through the antenna switch module, and the fourth module receives mid-band signals through the first diplexer.

13. The front-end architecture of claim 11 wherein, in an operating mode that provides low-band and mid-band uplink carrier aggregation simultaneously with high-band multiple input multiple output operation, the first module transmits low-band signals to the first diplexer, the second module transmits mid-band signals through the antenna switch module, the third module receives signals through the third diplexer, and the fourth module receives mid-band signals through the first diplexer.

14. The front-end architecture of claim 11 wherein, in an operating mode that provides low-band and high-band uplink carrier aggregation simultaneously with mid-band multiple input multiple output operation, the first module transmits low-band signals to the first diplexer, the second module receives mid-band signals from the antenna switch module, the third module transmits signals to the third diplexer, and the fourth module receives mid-band signals through the first diplexer.

15. The front-end architecture of claim 11 wherein, in an operating mode that provides low-band and high-band uplink carrier aggregation simultaneously with high-band multiple input multiple output operation, the first module transmits low-band signals to the first diplexer, the third module transmits and receives signals through the third diplexer, and the fourth module receives mid-band signals through the first diplexer.

16. The front-end architecture of claim 11 wherein, in an operating mode that provides mid-band uplink carrier aggregation simultaneously with mid-band multiple input multiple output operation, the second module transmits and receives mid-band signals through the third diplexer using MB-MB switchplexing, the fourth module receives mid-band signals through the first diplexer, and the fifth module routes carrier aggregation signals through a filter in the fourth module to transmit the carrier aggregation signals through the first diplexer, the fourth module configured to use MB-MB switchplexing.

17. The front-end architecture of claim 11 wherein, in an operating mode that provides mid-band uplink carrier aggregation simultaneously with high-band multiple input multiple output operation, the second module transmits mid-band signals through the third diplexer using MB-MB switchplexing, the third module receives high-band signals through the third diplexer, the fourth module receives mid-band signals through the first diplexer, and the fifth module routes carrier aggregation signals through a filter in the fourth module to transmit the carrier aggregation signals through the first diplexer, the fourth module configured to use MB-HB switchplexing.

18. The front-end architecture of claim 11 wherein, in an operating mode that provides mid-band and high-band uplink carrier aggregation simultaneously with mid-band multiple input multiple output operation, the second module receives mid-band signals through the third diplexer, the third module transmits high-band signals through the third diplexer, the fourth module receives mid-band signals through the first diplexer, and the fifth module routes carrier aggregation signals through a filter in the fourth module to transmit the carrier aggregation signals through the first diplexer.

19. The front-end architecture of claim 11 wherein, in an operating mode that provides mid-band and high-band uplink carrier aggregation simultaneously with high-band multiple input multiple output operation, the third module transmits and receives high-band signals through the third diplexer, the fourth module receives mid-band signals through the first diplexer, and the fifth module routes carrier aggregation signals through a filter in the fourth module to transmit the carrier aggregation signals through the first diplexer, the fourth module configured to use MB-HB switchplexing.

20. A wireless device comprising:
a transceiver configured to generate a plurality of transmit signals and process a plurality of received signals;
a plurality of antennas configured to facilitate transmission of the transmit signals and reception of the received signals; and
a front-end system implemented between the transceiver and the plurality of antennas, the front-end system including a plurality of diplexers coupled to an antenna switch module having a first throw configured to be coupled to a first antenna and a second throw configured to be coupled to a second antenna; the front-end system also including a first module having a low-band power amplifier with integrated duplexer, an output of the first module coupled to a low-pass filter of a first diplexer of the plurality of diplexers; the front-end system also including a second module having a mid-band power amplifier with integrated duplexer, a first output of the second module coupled to the antenna switch module bypassing the plurality of diplexers, a second output of the second module coupled to a notch filter of a second diplexer of the plurality of diplexers, and a third output of the second module coupled to a bandpass filter of a third diplexer of the plurality of diplexers; the front-end system also including a third module having a high-band power amplifier with integrated duplexer, a first output of the third module coupled to the antenna switch module bypassing the plurality of diplexers, a second output of the third module coupled to a bandpass filter of the second diplexer of the plurality of diplexers, and a third output of the third module coupled to a high-pass filter of the third diplexer of the plurality of diplexers; the front-end system also including a fourth module having a plurality of filters that includes a mid-band receive filter, a high-band receive filter, a plurality of transmit filters, and an output coupled to a high-pass filter of the first diplexer; and the front-end system also including a fifth module having a power amplifier configured for uplink carrier aggregation, the fifth module configured to selectively couple to the fourth module, to the third module, and to the second module to utilize filters within these modules in one or more uplink carrier aggregation operating modes.

* * * * *